United States Patent
Bryant

(10) Patent No.: US 7,191,438 B2
(45) Date of Patent: Mar. 13, 2007

(54) COMPUTER FUNCTIONAL ARCHITECTURE AND A LOCKED DOWN ENVIRONMENT IN A CLIENT-SERVER ARCHITECTURE

(75) Inventor: Guy R Bryant, Maroubra (AU)

(73) Assignee: Lenovo (Singapore) Pte, Ltd., Singapore (SG)

(*) Notice: Subject to any disclaimer, the term of this patent is extended or adjusted under 35 U.S.C. 154(b) by 788 days.

(21) Appl. No.: 09/791,978

(22) Filed: Feb. 23, 2001

(65) Prior Publication Data
US 2003/0079132 A1 Apr. 24, 2003

(51) Int. Cl.
G06F 9/445 (2006.01)

(52) U.S. Cl. ............... 717/176; 709/225; 709/228; 709/229

(58) Field of Classification Search ........ 717/167–178, 717/126–127; 713/183–184, 151–179; 709/201–233
See application file for complete search history.

(56) References Cited

U.S. PATENT DOCUMENTS

| | | | | |
|---|---|---|---|---|
| 5,138,712 A | * | 8/1992 | Corbin | 713/200 |
| 5,478,956 A | * | 12/1995 | Ottow et al. | 552/510 |
| 5,701,491 A | * | 12/1997 | Dunn et al. | 717/167 |
| 5,884,312 A | * | 3/1999 | Dustan et al. | 707/10 |
| 5,893,116 A | * | 4/1999 | Simmonds et al. | 707/201 |
| 5,991,543 A | * | 11/1999 | Amberg et al. | 717/175 |
| 6,047,312 A | * | 4/2000 | Brooks et al. | 709/203 |
| 6,074,342 A | * | 6/2000 | Odanaka et al. | 600/164 |
| 6,212,635 B1 | * | 4/2001 | Reardon | 713/165 |
| 6,317,836 B1 | * | 11/2001 | Goren et al. | 713/200 |
| 6,513,052 B1 | * | 1/2003 | Binder | 707/204 |
| 2002/0053044 A1 | * | 5/2002 | Gold et al. | 714/38 |

* cited by examiner

Primary Examiner—Tuan Dam
Assistant Examiner—Chuck Kendall
(74) Attorney, Agent, or Firm—Schmeiser, Olsen & Watts; William H. Steinberg; Scott Reid

(57) ABSTRACT

A method, an apparatus and a computer program product are disclosed for providing a lockeddown client environment in a client-server architecture of a computer network. In the method, an asset database is checked via the computer network to validate settings for configuration of the personal computer. The personal computer is booted using a personalized network boot disk for a user. The asset database contains information about the configuration of one or more personal computers. If the settings are validated, a lockeddown environment is built for the personal computer. The operating system and hardware drivers installed on the personal computer are dependent upon the asset database. The operating system prevents unauthorised modification and bypassing of the operating system. Preconfigured application software is installed on the personal computer dependent upon the asset database. User data can only be stored remotely at a server via the computer network.

72 Claims, 58 Drawing Sheets

13/12/97 16:43:08 Machine Number M24299 has been built by Andrew
13/12/97 16:46:34 Machine Number M24282 has been built by Nick
.
.
30/04/98 11:26:25 Machine Number M28828 has been built by gAzzi
30/04/98 13:30:20 Machine Number M24271 has been built by jalp
30/04/98 13:31:29 Machine Number M28744 has been built by jalp
30/04/98 16:48:31 Machine Number M28720 has been built by sgaut
30/04/98 16:49:01 Machine Number M28775 has been built by tcarman
01/05/98 08:07:21 Machine Number M28772 has been built by tcarman
01/05/98 08:08:14 Machine Number M28637 has been built by sgaut
01/05/98 11:34:08 Machine Number M28589 has been built by jalp
01/05/98 12:22:20 Machine Number M29595 has been built by jalp
01/05/98 14:04:05 Machine Number M29316 has been built by mBorgefjord
04/05/98 12:36:20 Machine Number M29310 has been built by sgaut
04/05/98 13:31:03 Machine Number M28722 has been built by sgaut

18/03/98 10:03:00  * iandevl created a v1.9 (IBMTOK5/NETBEUI) boot disk for rmitchel.

18/03/98 11:49:49  * mBorgefjord created a v1.9 (IBMTOK5/NETBEUI) boot disk for jalp.

20/03/98 15:18:33  * ORG\0mBorgefjord created a v1.9 (IBMTOK5/NETBEUI) boot disk for gbentlin.

30/03/98 14:37:57  * tcarman created a v1.9 (IBMTOK5/NETBEUI) boot disk for sgaut.

01/04/98 12:05:45  * jlenton created a v1.9 (IBMTOK5/NETBEUI) boot disk for SGAUT.

21/04/98 12:21:18  * ORG\0mborgefjord created a v1.9 (T16PCM/NETBEUI) boot disk for RBinnie.

29/04/98 15:04:47  * ORG\0mborgefjord created a v1.9 (IBMTOK5/NETBEUI) boot disk for gAzzi.

29/04/98 16:14:27  * ORG\gazzi created a v1.9 (IBMTOK5/NETBEUI) boot disk for gazzi.

*FIG. 9B*

```
..............................................................
                BARCODE: M29602
..............................................................
24/04/98 11:22:05  * Boot disk owner is: jalp
24/04/98 11:22:06  * Boot disk protocol is: NETBEUI
24/04/98 11:22:07  * Boot disk version is: 1.9
24/04/98 11:22:07  * Time has been synchronised between client and server:
24/04/98 11:22:08  * Client was showing: 24/04/98 11:21:45
24/04/98 11:22:09  * Waiting for operator to enter the barcode...
24/04/98 11:22:36  * Barcode (M29602) aquired from user input.
24/04/98 11:22:37  * Checking contents of [barcode].bat:
24/04/98 11:22:38  * Brand: IBM
24/04/98 11:22:39  * Category: Laptop
24/04/98 11:22:40  * Model:
24/04/98 11:22:40  * Type Number: 9546-A9H
24/04/98 11:22:41  * Serial: 97-GP1NH
24/04/98 11:22:42  * Display: IBM9385
24/04/98 11:22:42  * Nic: T16PCM
24/04/98 11:22:43  * IP Address: DHCP
24/04/98 11:22:43  * Application set: LAPTOP
24/04/98 11:22:44  * Department:
24/04/98 11:22:45  * Location:
24/04/98 11:22:45  * Security: ACLS
24/04/98 11:27:49  SECOND FLOPPY BOOT:
24/04/98 11:27:51  * Deleting the c:\TEMP directory.
```

24/04/98 11:27:54   * Deleting the c:\config.sys file.
24/04/98 11:28:02   * Loading Smartdrive.
24/04/98 11:28:02   * SYS'ing the C: drive.
24/04/98 11:28:04   * Copying DOS-level NETWORK files...
24/04/98 11:28:09   * DOS-level NETWORK files copied.
24/04/98 11:28:09   * Modifying network files to suit C:.
24/04/98 11:28:11   * Network files modified to suit C:.
24/04/98 11:28:14   * Creating UNATTEND.TXT.
24/04/98 11:28:17   * M29602.TXT has been created.
24/04/98 11:28:19   * Prompting user to remove floppy disk...
24/04/98 11:28:31   * Floppy has been removed as requested.
24/04/98 11:28:34   * Initiating automatic reboot.
------------------------------------------------------------
24/04/98 11:28:58   BOOTING FROM HARDDRIVE:
24/04/98 11:28:58   * LOCK'ing drive C:
24/04/98 11:28:59   * Checking network traffic...
24/04/98 11:28:59   * Clearance to proceed obtained.
24/04/98 11:29:00   * Unattended WINNT SETUP started.
------------------------------------------------------------
MB 24/04/98 11:45:56   THE NT WORKSTATION HAS BEEN REBOOTED:
24/04/98 11:45:58   * Drive I: connected.
24/04/98 11:45:59   * System PATH reset to initial default.
24/04/98 11:46:01   * Drive D: has been formatted as NTFS.
24/04/98 11:46:03   * NTFS security has been implemented on D:.
------------------------------------------------------------
```

*FIG. 10A-2*

```
24/04/98 11:46:04   STARTING APPLICATION INSTALLATION:
24/04/98 11:46:04   * Pcomm installation started...
24/04/98 11:49:08   * Pcomm installation completed.
24/04/98 11:49:09   * Lotus Notes installation started...
24/04/98 11:49:09   * (Using the Laptop Configuration).
24/04/98 11:49:10   * (Virtual H: drive mapped.)
24/04/98 11:51:25   * Lotus Notes installation complete.
24/04/98 11:51:26   * Lotus Smartsuite installation started...
24/04/98 11:59:31   * Lotus Smartsuite installation complete.
24/04/98 11:59:33   * Lotus Organiser97 GS installation started...
24/04/98 12:00:24   * Lotus Organiser97 GS installation complete.
24/04/98 12:00:26   * IBM Antivirus installation started...
24/04/98 12:01:39   * IBM Antivirus installation completed.
24/04/98 12:01:41   * MS Internet Explorer 3.02 installation started...
24/04/98 12:02:08   * MS Internet Explorer 3.02 installation completed.
24/04/98 12:02:10   * GUI-400 Installation started...
24/04/98 12:03:04   * GUI-400 Installation completed.
24/04/98 12:03:06   * Trim Installation started...
24/04/98 12:03:46   * Trim Installation completed.
24/04/98 12:03:47   * DB2 Installation started...
24/04/98 12:03:49   * Custom .RSP file created.
24/04/98 12:03:51   * Starting unattended DB2 install.
24/04/98 12:07:04   * Unattended DB2 install completed.
24/04/98 12:07:06   * Creating DB2 odbc.ini files.
24/04/98 12:07:08   * Odbc.ini files created.
```

*FIG. 10B-1*

```
24/04/98 12:07:10  * Copying SQL config files.
24/04/98 12:07:12  * SQL config files copied.
24/04/98 12:07:14  * DB2 Installation completed.
24/04/98 12:07:16  * Adobe Acrobat Reader v3.0 installation started...
24/04/98 12:07:31  * Adobe Acrobat Reader v3.0 installation completed.
24/04/98 12:07:33  * IP Dialler installation started.
24/04/98 12:07:42  * IP Dialler installation completed.
24/04/98 12:07:43  * WinZip Installation started...
24/04/98 12:07:45  * WinZip Installation completed.
24/04/98 12:07:47  * Xerox Textbridge OCR Installation started...
24/04/98 12:08:17  * Xerox Textbridge OCR Installation completed.
24/04/98 12:08:18  * SureTrack Installation started...
24/04/98 12:09:48  * SureTrack Installation completed.
24/04/98 12:09:50  * Preparing for Virtual H: drive...
24/04/98 12:09:52  * Virtual H: drive ready.
24/04/98 12:09:54  * Copying S: drive to local drive...
24/04/98 12:12:47  * S: drive copied.
24/04/98 12:12:50  * Copying I386 directory to local drive...
24/04/98 12:22:03  * I386 directory copied.
24/04/98 12:22:09  * ORG\LAPTOPGROUP added to local admin group.
24/04/98 12:22:12  * Mwave Installation started...
24/04/98 12:22:57  * Mwave completed.
24/04/98 12:23:00  * Tivoli Installation started...
24/04/98 13:55:52  * Tivoli Installation completed.
```

*FIG. 10B-2*

```
24/04/98 13:55:53  CUSTOMISING SETTINGS:
24/04/98 13:55:55  * Proxy Settings done.
24/04/98 13:55:57  * Start Page set.
24/04/98 13:55:58  * Autologon disabled.
24/04/98 13:56:00  * Caching of profiles disabled.
24/04/98 13:56:01  * Admin Password changed.
24/04/98 13:56:03  * Tip-of-the-day messages modified.
24/04/98 13:56:04  * Welcome tips re-enabled.
24/04/98 13:56:05  * Logon bitmap changed.
24/04/98 13:56:07  * Desktop wallpaper changed.
24/04/98 13:56:09  * Persistant drive connections disabled.
24/04/98 13:56:10  * Default domain set to ORG.
24/04/98 13:56:12  * Hiding previous username.
24/04/98 13:56:13  * Windows Explorer configuration changed.
24/04/98 13:56:15  * NetBeui Parameter changed from 0 to 1.
24/04/98 13:56:17  * Resource Kit executables added.
24/04/98 13:56:18  * IDRIVE.BAT copied.
24/04/98 13:56:20  * HELPDESK.BAT added.
24/04/98 13:56:21  * Screensaver configured.
24/04/98 13:56:23  * Bypassing Desktop clean up.
24/04/98 13:56:25  * Associations for .TXT and .LOG files fixed.
24/04/98 13:56:27  * PC has been hidden from network browse.
24/04/98 13:56:29  * Program Menus cleaned up.
-----------------------------------------------------------------
24/04/98 13:56:32  PROCESSING SYSTEM MODIFICATIONS:
```

*FIG. 10C-1*

```
24/04/98 13:56:35  * BOOT.INI (timeout) modified.
24/04/98 13:56:37  * OEMINFO.INI modified.
24/04/98 13:56:40  * Local drives labeled.
24/04/98 13:56:44  * Floppy Locker Service Installed.
24/04/98 13:56:47  * Additional Groups Added.
24/04/98 13:56:49  * Pagefile Configured.
24/04/98 13:56:52  * System cache Configured.
24/04/98 13:56:55  * Installing Service Pack...
24/04/98 13:59:20  * Service Pack installed.
24/04/98 13:59:22  * Help file replaced with custom version.
24/04/98 13:59:28  * Build version info updated in the registry.
24/04/98 13:59:32  * Build version info updated in version.BAT.
24/04/98 13:59:36  * Finalising security settings (if any):
24/04/98 14:00:04  * D: Drive set up for conversion to NTFS.
24/04/98 14:00:06  * Restricting access to files.
24/04/98 14:00:08  * Setting of BASE security started.
24/04/98 14:03:10  * Setting of BASE security completed.
24/04/98 14:03:12  * Restrictions done.
24/04/98 14:03:14  * Everyone granted the right to set time.
24/04/98 14:03:16  * Removed domain install account from local admins.
-------------------------------------------------------------
24/04/98 14:03:19  The queue channel has cleared so another build can start.
24/04/98 14:03:20  Performing post-installation cleanup.
24/04/98 14:03:21  Updating Master log file.
24/04/98 14:03:23  Telling the boss...
24/04/98 14:04:05  Installation complete - initiating shutdown.
```

M24350 had Adobe Photoshop installed by ORG\Install at 15:30:33 on 08/04/98.
M28672 had Adobe Photoshop installed by ORG\Install at 17:15:54 on 08/04/98.
M28672 had Adobe Photoshop installed by ORG\Install at 09:10:58 on 09/04/98.
M28546 had Adobe Photoshop installed by ORG\Install at 10:53:50 on 14/04/98.

| Type Number | Brand | Category | Description | Processor | Mhz | Std RAM | Std Harddisk size | Std NIC |
|---|---|---|---|---|---|---|---|---|
| 6543-304 | IBM | Monitor | 20 inch CAD Monitor | | 0 | 0 | | |
| 6555-774 | IBM | Monitor | 20 inch Monitor | | 0 | 0 | | |
| 6521-004 | IBM | Switch | Hub Switch Gear | | 0 | 0 | | |
| 8260 A17 | IBM | | | | | | | |
| Pr4317 | IBM | Printer | IBM 4317 Printer | | 0 | 0 | | |
| 4039-16L | Lexmark | Printer | Lexmark 4039-16L | | 0 | 0 | | |
| 4049-12R | Lexmark | Printer | Lexmark 4049-12R | | 0 | 0 | | |
| 4049-LM0 | Lexmark | Printer | Lexmark 4049-LM0 | | 0 | 0 | | |
| 4049-16L | Lexmark | Printer | Lexmark 4049-16L | | 0 | 0 | | |
| 6577-59J | IBM | Desktop | P100 | Pentium | 100 | 0 | | |
| 6282-67A | IBM | Desktop | Personal Computer 300GL (with CD-ROM) | Pentium MMX | 200 | 32 | 2500 | IBMT0K5 |
| 6282-94A | IBM | Desktop | Personal Computer 300GL (without CD-ROM) | Pentium MMX | 200 | 32 | 2500 | IBMT0K5 |
| 6562-20A | IBM | Desktop | Personal Computer 300PL | Pentium MMX | 200 | 32 | 4200 | IBMT0K5 |
| 6587-ETX | IBM | Desktop | Personal Computer 350 | Pentium MMX | 200 | 32 | 4200 | IBMT0K4 |
| 6587-GAV | IBM | Desktop | Personal Computer 350 | Pentium | 200 | 64 | 1600 | IBMT0K4 |
| 6589-15A | IBM | Desktop | Personal Computer 365 | Pentium Pro | 200 | 32 | 4200 | IBMT0K5 |
| 6589-14A | IBM | Desktop | Personal Computer 365 (with SCSI) | Pentium Pro | 200 | 32 | 2100 | IBMT0K5 |
| 6576-37H | IBM | Desktop | Personal Computer P75 | Pentium | 75 | 16 | 850 | IBMT0K4 |
| 7030 | IBM | Desktop | Personal Computer RISC 2000 | | 0 | 0 | | |
| 26353AA | IBM | Laptop | Thinkpad 380D | Pentium MMX | 150 | 16 | 2100 | A16PCM |
| 2640-5NA | IBM | Laptop | Thinkpad 560 | Pentium | 100 | 8 | 810 | A16PCM |
| 9545-9NE | IBM | Laptop | Thinkpad 755CD | | 0 | 0 | | |
| 9545-KZE | IBM | Laptop | Thinkpad 755CS | | 0 | 0 | | |
| 9545-6ND | IBM | Laptop | Thinkpad 755CSE | | 0 | 0 | | |
| 9546-A9B | IBM | Laptop | Thinkpad 760E | Pentium | 150 | 16 | 2100 | A16PCM |
| 9546-A9A | IBM | Laptop | Thinkpad 760ED (XGA) | Pentium | 133 | 16 | 2100 | A16PCM |
| 9547-A3F | IBM | Laptop | Thinkpad 760ELD | Pentium | 100 | 8 | 810 | A16PCM |
| 9545-A9E | IBM | Laptop | Thinkpad 760XD | Pentium MMX | 166 | 32 | 3000 | A16PCM |
| 9546-ASH | IBM | Laptop | Thinkpad 765D | Pentium MMX | 166 | 48 | 3000 | T16PCM |
| 9549-1AA | IBM | Laptop | Thinkpad 770 | Pentium MMX | 233 | 32 | 5100 | T16PCM |
| 9548-30U | IBM | Laptop | Thinkpad 770 | Pentium MMX | 233 | 32 | 4000 | T16PCM |

Record: 14 of 31

| [Display Adapters: Table] | | | | | | |
|---|---|---|---|---|---|---|
| File Edit View Insert Format Records Tools Window Help | | | | | | |
| Brand | Display Code | Description | Bus type | Resolution | Color Depth | Refresh Rate |
| Matrox | 1164SG3D | Matrox Mystique 220 (2MB) | ONBOARD | 1280 X 1024 | 256 | 0 |
| Cirrus Logic | CLGD54XX | Cirrus Logic CLGD54XX (2MB) | PCI | 1280 X 1024 | 256 | 75 |
| Trident | IBM9320 | Trident Cyber 9320 (Thinkpad) | ONBOARD | 800 X 600 | 65536 | 0 |
| Trident | IBM9382 | Trident Cyber 9382 (Thinkpad) | ONBOARD | 800 X 600 | 256 | 0 |
| Trident | IBM9385 | Trident Cyber 9385 (Thinkpad) | ONBOARD | 1024 X 768 | 65536 | 0 |
| Trident | IBM9397 | Trident Cyber 9397 (Thinkpad) | ONBOARD | 1024 X 768 | 65536 | 0 |
| Matrox | MGA2064W | Matrox MGA Millennium | PCI | 1600 X 1200 | 16777216 | 0 |
| Neomagic | NM2093 | NeoMagic MagicGraph 128ZV | ONBOARD | 800 X 600 | | 0 |
| S3 | S3-965 | | | 800 X 600 | | 0 |
| S3 | S3T64V+ | Trio 64 V plus | PCI | 1280 X 1024 | 16 | 0 |

Record: 1 of 10

Datasheet View

| Code | Description | Bus type | Topology | Brand |
|---|---|---|---|---|
| A16PCM | IBM Auto 16/4 PCMCIA-card | PCMCIA | Token Ring | IBM |
| IBMTOK4 | IBM Auto 16/4 | ISA | Token Ring | IBM |
| IBMTOK5 | IBM Autowake | ISA | Token Ring | IBM |
| NONE | Not Applicable | | | |
| T16PCM | IBM Turbo 16/4 PCMCIA-card | PCMCIA | Token Ring | IBM |

FIG. 14

| Build | Build Description | Build Details |
|---|---|---|
| ABC | Desktop Standard plus Flowcharter | Includes Standard set plus Flowcharter v7.0. |
| ACCESS | Desktop Standard plus MS Access | Includes Standard set plus Microsoft Access 97. |
| BASE | Desktop Standard | Includes only Standard software (eg Notes, Smartsuite, JDE etc). |
| CAD | Computer Aided Design | Includes Microstation, Photoshop. |
| DTP | Desktop Publishing | Includes Photoshop, Illustrator, Quark (manually), ATM & custom fonts. |
| LAPTOP | Laptop Standard | Includes IPDial, Textbridge, Suretrak. |
| NONE | No Applications | Includes NONE of the applications: Only operating system (incl. Tivoli). |
| NTIMAGE | Test build only | Do NOT use this. It's only for MichaelB and AnnChu's Testing! |
| PAYROLL | Payroll | Includes Standard set plus payroll software. |
| SUPPORT | Help Desk | Includes Standard set plus Server Tools, DPU, IP-dial, VM-session & Tech |
| TRAINING | Training Room | Includes Standard software plus Pace training software. |

*FIG. 15*

| Directory & Location: | Accounts: | Directory Rights | File Rights |
|---|---|---|---|
| \\ntshare01\ntimage$\ | ORG\PC Install Team | R X | R X |
| | ORG\Helpdeskstaff | R X | R X |
| | ORG\Domain Admins | All | all |
| | ORG\Install | R X | R X |
| \\ntshare01\ntimage$\Apps\Suretrak\keydisk\ | ORG\PC Install Team | R X | R X |
| | ORG\Helpdeskstaff | R X | R X |
| | ORG\Domain Admins | All | all |
| | ORG\Install | RWXD | RWXD |
| \\ntshare01\ntimage$\logfiles | ORG\PC Install Team | RWXD | RWXD |
| | ORG\Helpdeskstaff | RWXD | RWXD |
| | ORG\Domain Admins | all | all |
| | ORG\Install | RWXD | RWXD |
| \\ntshare01\ntimage$\notes | ORG\PC Install Team | R X | R X |
| | ORG\Helpdeskstaff | R X | R X |
| | ORG\Domain Admins | all | all |
| | ORG\Install | RWXD | RWXD |
| \\ntshare01\ntimage$\scripts | ORG\PC Install Team | R X | R X |
| | ORG\Helpdeskstaff | R X | R X |
| | ORG\Domain Admins | all | all |
| | ORG\Install | R X | R X |
| | ORG\DB2Install | R X | R X |
| \\ntshare01\ntimage$\scripts\apps | ORG\PC Install Team | R X | R X |
| | ORG\Helpdeskstaff | R X | R X |
| | ORG\Domain Admins | all | all |
| | ORG\Install | R X | R X |
| | ORG\DB2Install | R X | R X |
| | ORG\0wrichards | RWXD | RWXD |
| \\ntshare01\ntimage$\scripts\bootdisk | ORG\PC Install Team | R X | R X |
| | ORG\Helpdeskstaff | R X | R X |
| | ORG\Domain Admins | all | all |
| | ORG\Install | R X | R X |
| | ORG\DB2Install | R X | R X |
| | ORG\Bootdisk | R X | R X |

| | | | |
|---|---|---|---|
| \\ntshare01\ntimage$\scripts\image\machines | ORG\PC Install Team | R X | R X |
| | ORG\Helpdeskstaff | RWXD | RWXD |
| | ORG\Domain Admins | all | all |
| | ORG\Install | all | all |
| | ORG\DB2Install | R X | R X |
| | ORG\rewen | RWXD | RWXD |
| \\ntshare01\ntimage$\system\ | ORG\PC Install Team | R X | R X |
| | ORG\Helpdeskstaff | R X | R X |
| | ORG\Domain Admins | all | all |
| | ORG\Install | R X | R X |
| | ORG\DB2Install | R X | R X |
| \\ntshare01\ntimage$\system\tools | ORG\PC Install Team | R X | R X |
| | ORG\Helpdeskstaff | R X | R X |
| | ORG\Domain Admins | all | all |
| | ORG\Install | R X | R X |
| | ORG\DB2Install | R X | R X |
| | ORG\BootDisk | R X | R X |

*FIG. 16B*

```
                                                common.cmd
@ECHO OFF
REM ****************************************************
REM
REM SOCOG common logon script
REM
REM Date        Version  Who            What
REM 05/02/99    2.6      Tim Carman     Updated IBM Antivirus Signature Location
REM 11/03/99    2.7      Robert Kettles added connection to FXDOC2M_02J7 (Docutech Printer)
REM 09/04/99    2.8      Mick McKean    removed ref to \\NTUSER02\%USERNAME%$ (user drives moved to
NTUSER01
REM 1/06/99     2.9      Robert Kettles added connection to Acrobat for pdf Distiller
REM 18/06/99    3.0      Robert Kettles Added X: drive for DTPstore users
REM 26/06/99    3.1      Robert Kettles Added tivoli update
REM 09/09/99    3.2      Tim Carman     Modified font updates for new Sydney 2000 font
REM 13/09/99    3.3      Tim Carman     Added R: drive for Peoplesoft users
REM 08/10/99    3.4      Tim Carman     Added U: drive for Picture Perfect users
REM 26/03/00    3.5      Robert Kettles Changed Fuji printers
REM 05/05/00    3.6      Tim Carman     New Sydney 2000 font install
REM 29/06/00    3.7      Tim Carman     Added Build$3 Section
REM ****************************************************

REM Call version.bat Check if dialin laptop
REM ================================ call c:\version.bat

REM Setting user variables
REM================== set ALL_USERS=%SYSTEMROOT%\profiles\"all users"\"start menu"
set DEFAULT_USER=%SYSTEMROOT%\profiles\"default user"\"start menu"
set PATH=%PATH%;H:\NOTES REM Do not remove the below ... its a special for Peter Black
IF "%BARCODE%"=="M70105" GOTO notime REM set the local PC time
REM ================
net time /domain:socog /set /y 2> NUL
```

FIG. 17A-1

```
REM Check for Build53 PC
REM ======================
IF "%LOADAPPS%"=="BUILD53" GOTO Build53

:notime

REM LMHostsFile To C: Drive - Problem Fix 130700(GThomson)
REM ====================================
REM net use y: \\%BARCODE%\c$ /user:SOCOG\OAVupdate avupdate 2> NUL
REM \\ntshare01\shared\lmhosts\logincopy.cmd 2> NUL
REM net use y: /d 2> NUL REM Common SOCOG Drive Mappings
REM ===========================
net use p: \\ntapps01\applications /PERSISTENT:NO
net use s: \\ntshare01\shared /PERSISTENT:NO call c:\version.bat REM Setup Tivoli Files
REM ================== c:
cd\tivoli\tmeagent\invtest
windroid invtest
cd\

REM AntiVirus Signature Files Update
REM ================================
IF NOT EXIST C:\IBMAVNT GOTO NoUpdate
REM call c:\version.bat
net use y: \\%BARCODE%\c$ /user:SOCOG\OAVupdate avupdate 2> NUL
XCOPY s:\IBMAV\SIGNATURES\*.* y:\IBMAVNT /D 2> NUL
net use y: /d 2> NUL :NoUpdate REM Connecting docutech printers publications centre
rem con2prt /c \\ntprt04\fxdoc1_12J5
```

*FIG. 17A-2*

```
                                                        common.cmd
rem con2prt /c \\ntprt04\fxdoc2m_12k5

REM connecting acrobat for Acrobat Distiller
con2prt /c \\ntprtpdf01\acrobat ifmember Hyperion
if %ERRORLEVEL% EQU 1 net use k: \\ntfin01\hyperion$ /PERSISTENT:NO call c:\version.bat
if "%CATEGORY%" == "Laptop" %LOGONSERVER%\netlogon\laptop.cmd ifmember PRIMAV
if %ERRORLEVEL% EQU 1 net use v: \\ntgroup01\primav$ /PERSISTENT:NO ifmember DTPGROUP
if %ERRORLEVEL% EQU 1 net use l: \\ntdtp01\dtpdata$ /PERSISTENT:NO ifmember DTPSTORE
if %ERRORLEVEL% EQU 1 net use x: \\ntdtp01\dtpstore$ /PERSISTENT:NO ifmember PEOPLESOFT
if %ERRORLEVEL% EQU 1 net use r: \\ntaccom01\psoft /PERSISTENT:NO ifmember PictPerf
if %ERRORLEVEL% EQU 1 net use u: \\ntcad01\pictperf$ /PERSISTENT:NO REM Connect home drive
REM ==================
net use h: \\ntuser01\%USERNAME%$ /PERSISTENT:NO 2> NUL if exist h:\notes\printers.cmd call h:\notes\printers.cmd REM Do not remove the below ... its a special for Mel Kimmerly
IF "%BARCODE%"=="M70632" GOTO exit REM Check for LOTUS - NOTES Settings
REM ==============================
IF NOT EXIST H:\NOTES\NOTES.INI XCOPY P:\DISKIMAGE\HDRIVE\NOTES\*.* H:\NOTES /s /e /i > NUL
```

*FIG. 17B-1*

```
REM Picture Perfect Batch File
REM ============================
ifmember PictPerf
if %ERRORLEVEL% EQU 1 CALL %LOGONSERVER%\netlogon\pictperf.bat REM setup start menu for CURRENT USER
REM ==================================
if exist %USERPROFILE%\"Start Menu"\PROGRAMS\"Group Data" goto DEL_LINKS
        md %USERPROFILE%\"Start Menu"\PROGRAMS\"Group Data"
        goto COPY_LINKS :DEL_LINKS
attrib -r %USERPROFILE%\"Start Menu"\PROGRAMS\"Group Data"\*.lnk > NUL
del %USERPROFILE%\"Start Menu"\PROGRAMS\"Group Data"\*.lnk > NUL :COPY_LINKS
copy %LOGONSERVER%\netlogon\links\*.lnk %USERPROFILE%\"start menu"\PROGRAMS\"Group Data" 2> NUL >NUL REM setup start menu for DEFAULT_USER
REM ==================================
if exist %DEFAULT_USER%\PROGRAMS\"Group Data" goto DEL_LINKS2
        md %DEFAULT_USER%\PROGRAMS\"Group Data"
        goto COPY_LINKS2

:DEL_LINKS2
attrib -r %DEFAULT_USER%\PROGRAMS\"Group Data"\*.lnk > NUL
del %DEFAULT_USER%\PROGRAMS\"Group Data"\*.lnk > NUL
del %DEFAULT_USER%\PROGRAMS\"command prompt.lnk" 2> NUL :COPY_LINKS2
copy %LOGONSERVER%\netlogon\links\*.lnk %DEFAULT_USER%\PROGRAMS\"Group Data" 2> NUL >NUL REM Copy down current icons
REM remove reliance on P: drive, by putting menu in NETLOGON stucture
REM ================================================================
xcopy p:\diskimage\cdrive\training\"start menu"\*.* %DEFAULT_USER% /s /e /c /r /q >NUL
xcopy p:\diskimage\cdrive\training\"start menu"\*.* %USERPROFILE%\"start menu" /s /e /c /r /q >NUL REM Check & Setup H:\Group Data
```

*FIG. 17B-2* common.cmd

```
REM ===========================
h:
if not exist \"Group Data" md \"Group Data"
if NOT ERRORLEVEL 0 goto end
        attrib -r \"Group Data"\*.lnk 2> NUL > NUL
        Del h:\"Group Data"\*.lnk 2> NUL > NUL
        copy %DEFAULT_USER%\PROGRAMS\"Group Data" h:\"Group Data" 2> NUL > NUL

:END

REM   Updating fonts
REM ================ call c:\version.bat
net use z: /d 2> NUL
net use z: \\%BARCODE%\c$ /user:SOCOG\0update new1fonts 2> NUL REM === downloading new language lotus dictionary
IF EXIST C:\TEMP\FIXDICT.FLG GOTO NODLL
XCOPY s:\wordpro\spell\*.dll z:\lotus\compnent\spell >NUL 2>NUL
xcopy s:\wordpro\spell\fixdict.flg z:\temp >NUL 2>NUL
xcopy z:\lotus\compnent\spell\ltsuser01.udc c:\temp >NUL 2>NUL
REM === END of new language dictionary test.

:NODLL

REM === Test Downloading of Lotus Dictionary
XCOPY s:\wordpro\spell\ltsuser1.udc z:\lotus\compnent\spell /D 2> NUL
REM === End of Lotus Dictionary download IF EXIST c:\temp\fonts2.flg GOTO NoFont
IF NOT EXIST c:\version.bat GOTO NoFont
del z:\winnt\fonts\sydney20.ttf 2> NUL
xcopy s:\ibm_gsa\fonts\*.ttf z:\winnt\fonts /D 2> NUL
xcopy s:\ibm_gsa\fonts\fonts2.bat z:\temp /D 2> NUL
START "Please wait..." /MIN C:\temp\fonts2.bat
```

*FIG. 17C-1*

```
:NoFont
net use z: /d 1> NUL

REM Fix for smartsuite trayicons - do not do until after P: has been mapped!
REM To reduce the waiting time without risking that it'll time out too early, run this last!
IF NOT EXIST C:\WINNT\TRAYICON.BAT COPY P:\DISKIMAGE\CDRIVE\LOTUS\SMARTCTR\TRAYICON.BAT C:\WINNT > N
UL
START "Please wait..." /MIN C:\WINNT\TRAYICON.BAT
goto exit :Build53
REM ===========================================================
REM    This section is specifically for Build 53 PCs to allow users to log
REM    onto the network properly.
REM ===========================================================

REM Disconnect Local H: Drive
REM ========================
SUBST h: /d 2> NUL

REM Map Network H: Drive
REM ====================
net use h: \\ntuser01\%USERNAME%$ /persistent:no REM Disconnect Local S: Drive
REM ========================
SUBST s: /d 2> NUL REM Map Network S: Drive
REM ====================
net use s: \\ntshare01\shared /persistent:no :exit
```

*FIG. 17C-2*

```
                                              technology.cmd
@ECHO OFF
REM ***************************************************
REM
REM Technology logon script file.
REM
REM Date         Version  Who
REM 20/11/97     1.0      Sean O'Brien
REM 19/12/97     1.1      MichaelB Moved common.bat to
REM                       end of file for timing reasons.
REM 07/02/98     1.2      Sean O'Brien    moved to \\ntuser01
REM 28/05/98     1.3      Robert   Move to \\ntprt03
REM 29/04/99     1.4      Robert Kettles moved G: to ntgroup01
REM 14/10/99     1.5      Tim Carman - Removed printer FXABLE_06E3
REM ***************************************************

REM Connect group drive
REM ===================
net use g: \\ntgroup01\technology$ /PERSISTENT:NO REM Connect group printers
REM ====================== con2prt /c \\ntprt03\IB4317_06H2
con2prt /c \\ntprt03\FXAble_06J2

REM Connect common drives
REM =====================
call %LOGONSERVER%\netlogon\common.cmd
```

*FIG. 18*

```
                              makedisk.bat
@echo off

REM set output=NUL
set output=NUL rem as there are a number of references to I:, make sure we have this drive mapped correctly.
IF NOT EXIST I:\SCRIPTS\IMAGE\MAKEDISK.BAT goto no_idrive REM first, check what operating system we are running on...
IF NOT "%OS%"=="Windows_NT" goto win95

:winnt
REM if we are running NT, we have a confirmed and validated id.
if NOT "%USERDOMAIN%"=="SOCOG" set OLDUSER=%USERNAME%
if     "%USERDOMAIN%"=="SOCOG" set OLDUSER=%USERDOMAIN%\%USERNAME%
goto top :win95
REM If user not confirmed and validated (eg running W95 etc), check boot disk...
REM First, make sure that we can access the A: drive
REM then, check the contents of password.bat to make sure that we have a valid boot disk
rem to use as a key. This could be tested by trying to connect to something...

I:\system\tools\CDX A: >NUL
If Errorlevel 1 goto no_key

REM if we are still here, there's a floppy in the drive. Check for CONTROL.BAT...
IF NOT EXIST A:\CONTROL.BAT goto bad_key REM pick up old username to keep for logfile.
REM do it before anything else so the OLDUSER remains the same
REM even if we create multiple disks at the same time.
CALL A:\CONTROL.BAT

SET OLDUSER=%OWNER%

REM if the expected contents aren't found...
IF "%OLDUSER%"=="" GOTO bad_key
```

*FIG. 19A-1*

```
REM verify that the diskette has been initialised
REM eg the user has used and the password etc is now there.
call a:\password.bat
if NOT "%USERID%"=="%OWNER%" goto key_new REM check that this user actually has validated to the network.
rem this means that password.bat exists, and the name in there matches what is in control.bat
rem if we get really paranoid, we could actually use the user acct & pw to do a test connect
rem to a restricted area to confirm that they DO have access...

:top
CLS
echo ----------------------------------------------------------------
echo.
echo       To create a bootdisk, please
echo.
echo          1) INSERT A NEW DISKETTE and
echo.
echo          2) Type the LOGIN NAME of the person (eg "MJones" etc).
echo             (use an account that is a member of 'PC Install Team',
echo             and do NOT use a 0-account.)
echo.
echo             Or, type EXIT to exit this utility.
echo.
echo          3) Select the desired network card.
echo ----------------------------------------------------------------

REM Don't change case...
REM Logfiles is writeable - most other areas are not.
I:\system\tools\fdate /fget /Q"Enter the LOGIN NAME, and then press ENTER: " /P"set name=" > I:\LOGF
ILES\NAME.BAT echo.
REM Pick up the name as a variable
CALL I:\LOGFILES\NAME.BAT REM check for empty string...
IF NOT "%NAME%"=="" GOTO name_ok
echo ----------------------------------------------------------------
echo.
echo.      ERROR: The name '%NAME%' is not allowed by MAKEDISK.
```

*FIG. 19A-2*

```
                              makedisk.bat
echo            Please contact your Administrator if you need assistance.
echo.
echo ---------------------------------------------------------------
PAUSE goto top :name_ok
REM Delete TEMP file...
DEL I:\LOGFILES\NAME.BAT REM If case is not forced to upper, we need to check all likely combos...
IF "%NAME%"=="EXIT" GOTO END
IF "%NAME%"=="exit" GOTO END
IF "%NAME%"=="Exit" GOTO END echo Thank you. Now, please choose the type of IBM Token Ring network card:
echo.
echo        1. 'Autowake ISA' or 'Auto 16/4 ISA'    (Desktop)
ECHO       2. 'Turbo 16 PCMCIA' or 'Auto 16 PCMCIA' (Laptop)
ECHO.
I:\SYSTEM\W95DOS\CHOICE /C:12 /N >NUL 1>NUL IF ERRORLEVEL 1 set nic=IBMTOK5
IF ERRORLEVEL 2 set nic=T16PCM set protocol=NETBEUI
set version=2.0

REM Make sure that %NIC% is set to something suitable.
REM The same goes for %PROTOCOL%

IF NOT EXIST I:\SYSTEM\BOOTDISK\%NIC%\%PROTOCOL%\NET\NET.EXE GOTO no_files
IF NOT EXIST I:\SCRIPTS\BOOTDISK\%NIC%\%PROTOCOL%\MODIFY.BAT GOTO no_files

CLS
```

*FIG. 19B-1*

```
echo.
echo ---------------------------------------------------------------
echo   Thanks for the help! The diskette is now being prepared.
echo.
echo.       NOTE: Although this process is automated, it will
echo             take a few minutes, since the system must:
echo.
echo             1. 'FORMAT' and 'SYS' the diskette.
echo             2. COPY and CONFIGURE network files.
echo             3. Ensure a unique computer name.
echo.
echo ---------------------------------------------------------------
echo                       Processing - please wait...

REM All of these steps can now be done with the WRITEIMG tool.
REM The main advantage of this is a) speed and b) it is no longer necessary to run Win95.

REM Since WriteImg will come up with extra prompts if the disk format is different,
REM it's best to do a dummy format first...
REM as /U is not supported in NT, we need to feed multiple 'y' to it in case we get more prompts
REM (this will depend on exactly how the disk was previously formatted).

REM do NOT do a quick format as we don't know what was on the disk before.
REM even though it will overwritten by WRITEIMG, FORMAT's responses will vary depending on what's on
 the floppy.
REM and if we feed multiple responses to it, we'll never know what it'll do
REM (eg Y is sometimes Yes go ahead, sometimes Yes, do an unconditional format etc)

REM we must use a different format command depending on if we are DOS/95 or NT.
REM under NT, we get a lot of additional prompts, so format the disk first.
REM %format_command% a: /v:blank /F:1.44 < I:\scripts\image\yes.txt >%OUTPUT%

REM Then, wait a couple of seconds until the diskette is no longer locked before continuing.
REM i:\system\tools\standby 5

REM Write diskette image which include the SYS files:
REM I:\system\tools\writeimg i:\scripts\image\w95boot.img a: >NUL <I:\scripts\image\newline.txt REM W95BOOT2.IMG also includes the 'BIOS-isation' of the floppy so it can be used for an IBM Bios up
grade.
REM /i ignores image type, so it should (hopefully) overwrite whatever is in the drive...
I:\system\tools\writeimg i:\scripts\image\w95boot2.img a: /I >%OUTPUT% <I:\scripts\image\newline.txt
```

*FIG. 19B-2*

```
                                                          makedisk.bat
REM ECHO   Quick-Formatting disk... >%OUTPUT%
REM I:\SYSTEM\W95DOS\FORMAT A: /V:BOOTDISK /Q <I:\scripts\image\yn.txt >NUL
REM May need to delete doublespace files?
REM IF so, use deltree as it works regardless of ATTRIB settings on the files.
REM I:\SYSTEM\W95DOS\DELTREE /Y A:\DBLSPACE.BIN >NUL
REM ECHO   Transferring system files...>%OUTPUT%
REM I:\SYSTEM\W95DOS\SYS I:\SYSTEM\BOOTDISK\COMMAND A: >NUL ECHO   Copying network files...>%OUTPUT%
REM remember that the EXE (as well as the syntax) varies between operating systems.

IF NOT "%OS%"=="Windows_NT" I:\SYSTEM\W95DOS\XCOPY I:\system\BOOTDISK\%NIC%\%PROTOCOL%\*.* A:\ /S /E
 > NUL
IF     "%OS%"=="Windows_NT" XCOPY I:\system\BOOTDISK\%NIC%\%PROTOCOL%\*.* A:\ /S /E > NUL REM Modify the disk to be suitable for the drive (eg A: or C:).
ECHO   Modifying network files...>%OUTPUT%
CALL I:\SCRIPTS\BOOTDISK\%NIC%\%PROTOCOL%\MODIFY.BAT A: >NUL ECHO   CONTROL.BAT is now being created.>%OUTPUT%
REM delete the old file if it exists...
IF EXIST A:\CONTROL.BAT DEL A:\CONTROL.BAT >NUL REM remember not to have any spaces before the pipe characters...
ECHO @ECHO OFF>> A:\CONTROL.BAT
ECHO SET VERSION=%VERSION%>> A:\CONTROL.BAT
ECHO set nic=%NIC%>> A:\CONTROL.BAT
ECHO set protocol=%PROTOCOL%>> A:\CONTROL.BAT
ECHO SET OWNER=%NAME%>> A:\CONTROL.BAT REM Add build / share info...
CALL I:\SCRIPTS\IMAGE\HOSTNAME.BAT
ECHO SET HOST=%HOST%>> A:\CONTROL.BAT
ECHO SET SHARE=%SHARE%>> A:\CONTROL.BAT REM prepare initial password file...
ECHO   Preparing temporary password list.>%OUTPUT%
IF EXIST A:\PASSWORD.BAT DEL A:\PASSWORD.BAT >NUL
ECHO @ECHO OFF>> A:\PASSWORD.BAT
ECHO SET USERID=BootDisk>> A:\PASSWORD.BAT
ECHO SET USERPW=none>> A:\PASSWORD.BAT
```

*FIG. 19C-1*

```
REM This will fail if the username is longer than allowed on a disk label!
REM ECHO    Changing diskette volume name...>%OUTPUT%
REM I:\SYSTEM\W95DOS\LABEL A:%NAME%

REM Copy CDA.EXE to A: as it is used for testing if the drive is accessible.
COPY I:\system\tools\CDA.EXE A: > NUL ECHO    Updating logfile...>%OUTPUT%
CALL I:\SCRIPTS\IMAGE\DISKLOG.BAT >NUL CLS
echo -----------------------------------------------------------------
ECHO    The boot diskette has now been created!
ECHO.
ECHO.

CALL I:\SCRIPTS\BOOTDISK\FLOPYLBL.BAT
echo.
echo -----------------------------------------------------------------
PAUSE
GOTO top :no_files
CLS
echo -----------------------------------------------------------------
echo.
echo.       ERROR: Some files that are needed for MAKEDISK seem to
echo              be missing. Please contact your Administrator.
echo.
echo -----------------------------------------------------------------
GOTO END :no_key
CLS
echo -----------------------------------------------------------------
echo.
echo.       ERROR: Original Key-disk not found. Please re-insert
echo              your bootdisk or contact your Administrator.
```

*FIG. 19C-2*

```
                                                    makedisk.bat
echo.
echo ----------------------------------------------------------------
GOTO END :bad_key
CLS
echo ----------------------------------------------------------------
echo.
echo.       ERROR: There is a problem with the Key-disk.
echo              Please contact your Administrator for assistance.
echo.
echo ----------------------------------------------------------------
GOTO END :key_new
CLS
echo ----------------------------------------------------------------
echo.
echo.       ERROR: The key-disk that you are using has not yet been
echo              validated. Contact your Administrator for assistance.
echo.
echo ----------------------------------------------------------------
GOTO END :no_idrive
CLS
echo ----------------------------------------------------------------
echo.
echo.       ERROR: MAKEDISK will not run unless you have I: mapped
echo              to the correct location (\\ntshare01\ntimage$).
echo              Please contact your Administrator for assistance.
echo.
echo ----------------------------------------------------------------
GOTO END :old_winnt
CLS
echo ----------------------------------------------------------------
echo.
echo.       ERROR: This version of MAKEDISK will not run under NT.
echo              Please boot from an existing boot disk and THEN
echo              run MAKEDISK to create a new boot disk.
echo.
echo.              Or, contact your Administrator for assistance.
echo.
echo ----------------------------------------------------------------
GOTO END

:END
SET FORMAT_COMMAND=
```

FIG. 19D

| Lease Name | Scope Start | Scope End | Total Leases | Status |
|---|---|---|---|---|
| Floor3_1a | 172.20.16.51 | 172.20.16.152 | 102 | Active |
| Floor3_2a | 172.20.17.1 | 172.20.17.127 | 127 | Active |
| Floor3_3a | 172.20.18.1 | 172.20.18.127 | 127 | Active |
| *Floor3_1c* | *172.20.144.51* | *172.20.144.152* | *102* | *Inactive* |
| *Floor3_2c* | *172.20.145.1* | *172.20.145.127* | *127* | *Inactive* |
| *Floor3_3c* | *172.20.146.1* | *172.20.146.127* | *127* | *Inactive* |
| Floor4_1a | 172.20.32.51 | 172.20.32.152 | 102 | Active |
| Floor4_2a | 172.20.33.1 | 172.20.33.127 | 127 | Active |
| Floor4_3a | 172.20.34.1 | 172.20.34.127 | 127 | Active |
| *Floor4_1c* | *172.20.160.51* | *172.20.160.152* | *102* | *Inactive* |
| *Floor4_2c* | *172.20.161.1* | *172.20.161.127* | *127* | *Inactive* |
| *Floor4_3c* | *172.20.162.1* | *172.20.162.127* | *127* | *Inactive* |
| Floor5_1a | 172.20.64.51 | 172.20.64.152 | 102 | Active |
| Floor5_2a | 172.20.65.1 | 172.20.65.127 | 127 | Active |
| Floor5_3a | 172.20.66.1 | 172.20.66.127 | 127 | Active |
| *Floor5_1c* | *172.20.192.51* | *172.20.192.152* | *102* | *Inactive* |
| *Floor5_2c* | *172.20.193.1* | *172.20.193.127* | *127* | *Inactive* |
| *Floor5_3c* | *172.20.194.1* | *172.20.194.127* | *127* | *Inactive* |
| Floor7_1a | 172.20.80.51 | 172.20.80.152 | 102 | Active |
| Floor7_2a | 172.20.81.1 | 172.20.81.127 | 127 | Active |
| Floor7_3a | 172.20.82.1 | 172.20.82.127 | 127 | Active |
| *Floor7_1c* | *172.20.208.51* | *172.20.208.152* | *102* | *Inactive* |
| *Floor7_2c* | *172.20.209.1* | *172.20.209.127* | *127* | *Inactive* |
| *Floor7_3c* | *172.20.210.1* | *172.20.210.127* | *127* | *Inactive* |
| Floor10_1a | 172.20.48.51 | 172.20.48.152 | 102 | Active |
| Floor10_2a | 172.20.49.1 | 172.20.49.127 | 127 | Active |
| Floor10_3a | 172.20.50.1 | 172.20.50.127 | 127 | Active |
| *Floor10_1c* | *172.20.176.51* | *172.20.176.152* | *102* | *Inactive* |
| *Floor10_2c* | *172.20.177.1* | *172.20.177.127* | *127* | *Inactive* |
| *Floor10_3c* | *172.20.178.1* | *172.20.178.127* | *127* | *Inactive* |
| Floor14_1a | 172.20.96.51 | 172.20.96.152 | 102 | Active |
| Floor14_2a | 172.20.97.1 | 172.20.97.127 | 127 | Active |
| Floor14_3a | 172.20.98.1 | 172.20.98.127 | 127 | Active |
| *Floor14_1c* | *172.20.224.51* | *172.20.224.152* | *102* | *Inactive* |
| *Floor14_2c* | *172.20.225.1* | *172.20.225.127* | *127* | *Inactive* |
| *Floor14_3c* | *172.20.226.1* | *172.20.226.127* | *127* | *Inactive* |

FIG. 22

| Lease Name | Scope Start | Scope End | Total Leases | Status |
|---|---|---|---|---|
| Floor3_1b | 172.20.16.153 | 172.20.16.254 | 102 | Active |
| Floor3_2b | 172.20.17.128 | 172.20.17.254 | 127 | Active |
| Floor3_3b | 172.20.18.128 | 172.20.18.254 | 127 | Active |
| *Floor3_1d* | *172.20.144.153* | *172.20.144.254* | *102* | *Inactive* |
| *Floor3_2d* | *172.20.145.128* | *172.20.145.254* | *127* | *Inactive* |
| *Floor3_3d* | *172.20.146.128* | *172.20.146.254* | *127* | *Inactive* |
| Floor4_1b | 172.20.32.153 | 172.20.32.254 | 102 | Active |
| Floor4_2b | 172.20.33.128 | 172.20.33.254 | 127 | Active |
| Floor4_3b | 172.20.34.128 | 172.20.34.254 | 127 | Active |
| *Floor4_1d* | *172.20.160.153* | *172.20.160.254* | *102* | *Inactive* |
| *Floor4_2d* | *172.20.161.128* | *172.20.161.254* | *127* | *Inactive* |
| *Floor4_3d* | *172.20.162.128* | *172.20.162.254* | *127* | *Inactive* |
| Floor5_1a | 172.20.64.153 | 172.20.64.254 | 102 | Active |
| Floor5_2a | 172.20.65.128 | 172.20.65.254 | 127 | Active |
| Floor5_3a | 172.20.66.128 | 172.20.66.254 | 127 | Active |
| *Floor5_1c* | *172.20.192.153* | *172.20.192.254* | *102* | *Inactive* |
| *Floor5_2c* | *172.20.193.128* | *172.20.193.254* | *127* | *Inactive* |
| *Floor5_3c* | *172.20.194.128* | *172.20.194.254* | *127* | *Inactive* |
| Floor7_1a | 172.20.80.153 | 172.20.80.254 | 102 | Active |
| Floor7_2a | 172.20.81.128 | 172.20.81.254 | 127 | Active |
| Floor7_3a | 172.20.82.128 | 172.20.82.254 | 127 | Active |
| *Floor7_1c* | *172.20.208.153* | *172.20.208.254* | *102* | *Inactive* |
| *Floor7_2c* | *172.20.209.128* | *172.20.209.254* | *127* | *Inactive* |
| *Floor7_3c* | *172.20.210.128* | *172.20.210.254* | *127* | *Inactive* |
| Floor10_1a | 172.20.48.153 | 172.20.48.254 | 102 | Active |
| Floor10_2a | 172.20.49.128 | 172.20.49.254 | 127 | Active |
| Floor10_3a | 172.20.50.128 | 172.20.50.254 | 127 | Active |
| *Floor10_1c* | *172.20.176.153* | *172.20.176.254* | *102* | *Inactive* |
| *Floor10_2c* | *172.20.177.128* | *172.20.177.254* | *127* | *Inactive* |
| *Floor10_3c* | *172.20.178.128* | *172.20.178.254* | *127* | *Inactive* |
| Floor14_1a | 172.20.96.153 | 172.20.96.254 | 102 | Active |
| Floor14_2a | 172.20.97.128 | 172.20.97.254 | 127 | Active |
| Floor14_3a | 172.20.98.128 | 172.20.98.254 | 127 | Active |
| *Floor14_1c* | *172.20.224.153* | *172.20.224.254* | *102* | *Inactive* |
| *Floor14_2c* | *172.20.225.128* | *172.20.225.254* | *127* | *Inactive* |
| *Floor14_3c* | *172.20.226.128* | *172.20.226.254* | *127* | *Inactive* |

| Subnet | Start of IP Address | End of IP Address | Available Address |
|---|---|---|---|
| 255.255.255.240 | 172.20.1.1 | 172.20.15.254 | 4094 |
| 255.255.255.240 | 172.20.16.1 | 172.20.31.254 | 4094 |
| 255.255.255.240 | 172.20.32.1 | 172.20.47.254 | 4094 |
| 255.255.255.240 | 172.20.48.1 | 172.20.63.254 | 4094 |
| 255.255.255.240 | 172.20.64.1 | 172.20.79.254 | 4094 |
| 255.255.255.240 | 172.20.80.1 | 172.20.95.254 | 4094 |
| 255.255.255.240 | 172.20.96.1 | 172.20.111.254 | 4094 |
| 255.255.255.240 | 172.20.112.1 | 172.20.127.254 | 4094 |
| 255.255.255.240 | 172.20.128.1 | 172.20.143.254 | 4094 |
| 255.255.255.240 | 172.20.144.1 | 172.20.159.254 | 4094 |
| 255.255.255.240 | 172.20.160.1 | 172.20.175.254 | 4094 |
| 255.255.255.240 | 172.20.176.1 | 172.20.191.254 | 4094 |
| 255.255.255.240 | 172.20.192.1 | 172.20.207.254 | 4094 |
| 255.255.255.240 | 172.20.208.1 | 172.20.223.254 | 4094 |
| 255.255.255.240 | 172.20.224.1 | 172.20.239.254 | 4094 |
| 255.255.255.240 | 172.20.240.1 | 172.20.254.254 | 4094 |

*FIG. 30*

| No | Machine Name | Function | Hardware Configuration | Platform |
|----|----|----|----|----|
| 1 | ORG01 | Defined as the Primary Domain Controller plus standard applications via network. | PC520 | OS/2 Warp Server |
| 2 | ORG02 | Defined as the Backup Domain Controller | PC500 | OS/2 Warp Server |
| 3 | ORG03 | Lotus Notes Production/Development | PC320 | OS/2 Warp |
| 4 | ORG04 | DDCS Gateway. It represents the physical link from user workstations to AS/400 machine(POSSUM) | PC320 | OS/2 Warp |
| 5 | SORG05 | PeopleSoft | PC320 | OS/2 Warp |
| 6 | SORG06 | Additional Data Server. Home User, Groups Directory from A-K. | PC520 | OS/2 Warp 4.0 Advanced Server |
| 7 | SORG07 | Additional Data Server. Home User, Groups Directory from L-Z. | PC320 | OS/2 Warp 4.0 Advanced Server |
| 8 | SORG08 | Additional Data Server .Cc:Mail PostOffice | PC520 | OS/2 Warp 4.0 Advanced Server |
| 9 | SORG09 | Additional Data Server .Cc:Mail PostOffice | PC520 | OS/2 Warp 4.0 Advanced Server |
| 10 | SORG10 | DB/2 Trim Server | PC320 | OS/2 Warp 4.0 Server |
| 11 | SORG11 | Lotus Notes Production | PC320 | OS/2 Warp 4.0 Server |
| 12 | SORG12 | DTP Server. Publications Server to control LOGOS for ORG/SOBO, SPOC | PC330 | OS/2 Warp Server 4.0 |
| 13 | PORG01 | Print Server Redirector 1 | 100DX4/Dp | OS/2 Warp |
| 14 | PORG02 | Print Server Redirector 2 | 100DX4/Dp | OS/2 Warp |
| 15 | PORG03 | Print Server Redirector 3 | 100DX4/Dp | OS/2 Warp |
| 16 | CAD01 | CAD Server | PC520 | OS/2 Warp |

*FIG. 32*

| No | Machine Name | Function | Hardware Configuration | Platform |
|---|---|---|---|---|
| 1 | NTPDC | Defined as the Primary Domain Controller. It is purely designed to use only for users logon validation. | PC330 | NT Server 4.0 with Service Pack 3.0 |
| 2 | NTBDC01 | Defined as the Backup Domain Controller 01. | PC330 | NT Server 4.0 with Service Pack 3.0 |
| 3 | NTBDC02 | Defined as the Backup Domain Controller 02. | PC330 | NT Server 4.0 with Service Pack 3.0 |
| 4 | NTUSER01 | First User Directory Server. Users Name A-K. | PC704 | NT Server 4.0 with Service Pack 3.0 |
| 5 | NTUSER02 | Second User Directory Server. Users Name L-Z. | PC704 | NT Server 4.0 with Service Pack 3.0 |
| 5 | NTSHARE01 | Shared Directory Server | PC704 | NT Server 4.0 with Service Pack 3.0 |
| 5 | NTPRINT01 | NT Print Server 01 | PC320 | NT Server 4.0 with Service Pack 3.0 |
| 6 | NTPRINT02 | NT Print Server 02 | PC320 | NT Server 4.0 with Service Pack 3.0 |
| 7 | NTPRINT03 | NT Print Server 03 | PC320 | NT Server 4.0 with Service Pack 3.0 |
| 8 | NTARCHIVE01 | Archive Server | PC330 | NT Server 4.0 with Service Pack 3.0 |
| 9 | NTCAD01 | CAD and DTP Server | PC330 | NT Server 4.0 with Service Pack 3.0 |
| 10 | NTAPPS01 | Applications Server, share and TRIM | PC704 | NT Server 4.0 with Service Pack 3.0 |

*FIG. 34*

New User

3500

| | |
|---|---|
| Username: | dlam |
| Full Name: | Danny Lam |
| Description: | NWS - |
| Password: | |
| Confirm Password: | |

☑ User Must Change Password at Next Logon
☐ User Cannot Change Password
☑ Password Never Expires
☐ Account Disabled

[Add] [Cancel] [Help]

[Groups] [Profile] [Hours] [Logon To] [Account] [Dialin]

FIG. 35

COMPUTER FUNCTIONAL ARCHITECTURE AND A LOCKED DOWN ENVIRONMENT IN A CLIENT-SERVER ARCHITECTURE

FIELD OF THE INVENTION

The present invention relates to computer architectures, and in particular to a structured computer organisation in a client-server environment.

BACKGROUND

In the last fifteen to twenty years, the utilisation of "personal" computers has exploded, along with the rapid advent of the Internet and other networked environments of such personal computers. Such personal computers are used in both the business world and at home, enabling widespread variations in both hardware and software installed on such computers.

Along with the widespread adoption of personal computers, there has arisen along with it the need for "help desks" and information technology (IT) support to help people with difficulties using their computers. This represents a significant expense for businesses and other organisations. For example, in large corporate environments where many users utilise a network environment, IT specialists and help desk personnel must be available to minimise downtime arising from hardware and software conflicts and other problems that arise. The same applies for example with Internet service providers. For example, an organisation might use a standard word processing application, but due to the differing hardware configurations, operating systems, network environments, software drivers, and the like problems regularly arise leading to downtime and other expenses arising from such inefficiencies, as well as the additional expense of IT personnel and the like who have to try to resolve these problems. This is often like looking for a needle in a hay stack.

Thus, a need clearly exists for an improved system for structuring computer configurations in large network environments.

SUMMARY

In accordance with a first aspect of the invention, there is provided a method of providing a lockeddown client environment in a client-server architecture of a computer network, the method including the steps of:

checking an asset database accessible via the computer network using a personal computer capable of connecting to the computer network and booted using a personalized network boot disk for a user to validate settings for configuration of the personal computer, the asset database containing information about the configuration of one or more personal computers;

if the settings are validated, creating a lockeddown build for the personal computer, the creating step including the sub-steps of:

initializing the personal computer for installation of a user environment dependent upon the personalized network boot disk;

installing an operating system and hardware drivers on the personal computer via the computer network dependent upon the asset database, the operating system adapted to enable security of installed software on the personal computer against unauthorised modification and to prevent bypassing the operating system;

creating a computer account for the personal computer in the computer network;

installing preconfigured application software on the personal computer from a repository in the computer network dependent upon the asset database, the personal computer being configured so that user data can only be stored remotely at a server via the computer network;

updating a master logfile at the server accessible via the computer network to record the personal computer configuration.

Preferably, the method further includes the step of creating a personalised network boot disk.

Preferably, the method further includes the step of remotely interrogating the personal computer via the computer network and comparing the interrogation results with the asset database. The method may further include the step of determining if the personal computer satisfies software licensing requirements dependent upon the comparison results.

Preferably, the method further includes the step of remotely performing diagnostic testing of the personal computer.

Preferably, the method further includes the step of maintaining a security access profile for each user to enable virtual login from any personal computer connected to the computer network.

Preferably, at least two personal computers are capable of accessing the computer network, the personal computers having similar hardware and software configurations.

Preferably, the method further includes the step of providing centralized login scripts via the computer network to the personal computer from the server.

Preferably, the method further includes the step of providing a security profile for the user to enable the security.

Preferably, the method further includes the step of providing scripts to provide the security profile and to map one or more remote storage drives to be accessible via the computer network by the personal computer.

Preferably, the settings are validated if an asset number provided by the personalized network boot disk.

Preferably, the asset database contains information about the hardware and software configuration of the one or more personal computers.

Preferably, the personalized network boot disk contains a unique identification name. The method may further include the step of validating the personalized network boot disk dependent upon a password of the user when the personalized network boot disk is first used.

Preferably, the method further includes the step of updation an individual log file.

In accordance with a second aspect of the invention, there is disclosed an apparatus for providing a lockeddown client environment in a client-server architecture of a computer network, the apparatus including:

a device for checking an asset database accessible via the computer network using a personal computer capable of connecting to the computer network and booted using a personalized network boot disk for a user to validate settings for configuration of the personal computer, the asset database containing information about the configuration of one or more personal computers;

a device for, if the settings are validated, creating a lockeddown build for the personal computer, the creating device further including:

a device for initializing the personal computer for installation of a user environment dependent upon the personalized network boot disk;

a device for installing an operating system and hardware drivers on the personal computer via the computer network dependent upon the asset database, the operating system adapted to enable security of installed software on the personal computer against unauthorised modification and to prevent bypassing the operating system;

a device for creating a computer account for the personal computer in the computer network;

a device for installing preconfigured application software on the personal computer from a repository in the computer network dependent upon the asset database, the personal computer being configured so that user data can only be stored remotely at a server via the computer network; and a device for updating a master logfile at the server accessible via the computer network to record the personal computer configuration.

In accordance with a third aspect of the invention, there is disclosed a computer program product having a computer readable medium having a computer program recorded therein for providing a lockeddown client environment in a client-server architecture of a computer network, the computer program product including:

a computer program code module for checking an asset database accessible via the computer network using a personal computer capable of connecting to the computer network and booted using a personalized network boot disk for a user to validate settings for configuration of the personal computer, the asset database containing information about the configuration of one or more personal computers;

a computer program code module for, if the settings are validated, creating a lockeddown build for the personal computer, the computer program code module for creating further including:

a computer program code module for initializing the personal computer for installation of a user environment dependent upon the personalized network boot disk;

a computer program code module for installing an operating system and hardware drivers on the personal computer via the computer network dependent upon the asset database, the operating system adapted to enable security of installed software on the personal computer against unauthorised modification and to prevent bypassing the operating system;

a computer program code module for creating a computer account for the personal computer in the computer network;

a computer program code module for installing preconfigured application software on the personal computer from a repository in the computer network dependent upon the asset database, the personal computer being configured so that user data can only be stored remotely at a server via the computer network; and a computer program code module for updating a master logfile at the server accessible via the computer network to record the personal computer configuration.

In accordance with a fourth aspect of the invention, there is a method of locking down a client environment of a personal computer in a computer network, the method including the steps of:

providing an asset database via the computer network that can be accessed by the personal computer, the asset database containing information about the configuration of one or more personal computers;

booting the personal computer capable of connecting to the computer network and having installed therein an operating system and hardware drivers dependent upon the asset database, the operating system adapted to enable security of installed software on the personal computer against unauthorised modification and to prevent bypassing the operating system, the personal computer further having preconfigured application software installed on the personal computer dependent upon the asset database;

logging onto the personal computer and the computer network using a centralized logon script enabling asset tracking of the personal computer;

checking the asset database accessible via the computer network dependent upon a unique identifier for the personal computer and information about the user to validate settings for configuration of the personal computer; and if the settings are validated, configuring the personal computer according to a locked down build for the user and the personal computer, the personal computer being configured so that user data can only be stored remotely at a server via the computer network.

Preferably, the asset database contains information about the hardware and software configuration of the one or more personal computers.

Preferably, the method further includes the step of remotely interrogating the personal computer via the computer network and comparing the interrogation results with the asset database. The method may further include the step of determining if the personal computer satisfies software licensing requirements dependent upon the comparison results.

Preferably, the method further includes the step of maintaining a security access profile for each user to enable virtual login from any personal computer connected to the computer network.

Preferably, the method further includes the step of providing a security profile for the user to enable the security. The method may further include the step of providing scripts to provide the security profile and to map one or more remote storage drives to be accessible via the computer network by the personal computer.

In accordance with a fifth aspect of the invention, there is disclosed an apparatus for locking down a client environment of a personal computer in a computer network, the apparatus including:

a device for providing an asset database via the computer network that can be accessed by the personal computer, the asset database containing information about the configuration of one or more personal computers;

a device for booting the personal computer capable of connecting to the computer network and having installed therein an operating system and hardware drivers dependent upon the asset database, the operating system adapted to enable security of installed software on the personal computer against unauthorised modification and to prevent bypassing the operating system, the personal computer further having preconfigured application software installed on the personal computer dependent upon the asset database;

a device for logging onto the personal computer and the computer network using a centralized logon script enabling asset tracking of the personal computer;

a device for checking the asset database accessible via the computer network dependent upon a unique identifier for the personal computer and information about the user to validate settings for configuration of the personal computer; and a device for, if the settings are validated, configuring the personal computer according to a locked down build for the user and the personal computer, the personal computer being configured so that user data can only be stored remotely at a server via the computer network.

In accordance with a sixth aspect of the invention, there is disclosed a computer program product having a computer readable medium having a computer program recorded therein for locking down a client environment of a personal computer in a computer network, the computer program product including:

a computer program code module for providing an asset database via the computer network that can be accessed by the personal computer, the asset database containing information about the configuration of one or more personal computers;

a computer program code module for booting the personal computer capable of connecting to the computer network and having installed therein an operating system and hardware drivers dependent upon the asset database, the operating system adapted to enable security of installed software on the personal computer against unauthorised modification and to prevent bypassing the operating system, the personal computer further having preconfigured application software installed on the personal computer dependent upon the asset database;

a computer program code module for logging onto the personal computer and the computer network using a centralized logon script enabling asset tracking of the personal computer;

a computer program code module for checking the asset database accessible via the computer network dependent upon a unique identifier for the personal computer and information about the user to validate settings for configuration of the personal computer; and a computer program code module for, if the settings are validated, configuring the personal computer according to a locked down build for the user and the personal computer, the personal computer being configured so that user data can only be stored remotely at a server via the computer network.

BRIEF DESCRIPTION OF THE DRAWINGS

The embodiments of the invention are described hereinafter with reference to the figures, in which:

FIG. 4 is a screenshot illustrating the configuration of a personal computer derived from the asset database;

FIG. 9A is a depiction of a master log file, Master.log;

FIG. 9B is a depiction of a bootdisk log file, Bootdisk.log;

FIGS. 10A-1–10C-2 are a depiction of a machine log file;

FIG. 11 is a depiction of an application log file;

FIG. 12 is a screenshot of a computer model table from the asset database;

FIG. 13 is a screenshot of a display adaptor table from the asset database;

FIG. 14 is a screenshot of a network card table from the asset database;

FIG. 15 is a screenshot of a software builds table from the asset database;

FIGS. 16A and 16B are a depiction of access rights to files;

FIGS. 17A-1–17C-2 depict Command.Cmd Logon script of the preferred embodiment;

FIG. 18 depicts a Technology.Cmd logon script;

FIGS. 19A-1–19D depicts MakeDisk.bat;

FIG. 22 is a table 2200 illustrating the DHCP server configuration;

FIG. 23 is a table illustrating the configuration for a second DHCP server;

FIG. 30 is a table setting forth IP subnets;

FIG. 32 is a table providing information about the servers of FIG. 31;

FIG. 34 is a table showing the server naming convention;

FIG. 35 is a screenshot of the User Manager for the Domain interface;

DETAILED DESCRIPTION

A method and a system for providing an improved computer functional architecture are disclosed. Further, a method and an apparatus for providing a client-server architecture having a lock down environment are disclosed. In the following description, numerous details are set forth. It will be apparent to one skilled in the art, however, that the present invention may be practised without these specific details. In other instances, well-known features are not described in detail so as not to obscure the present invention.

The description is organized as follows:
1. Overview
2. Thick/Thin PC Client
3. Standardized Configuration of Workstations
4. Workstation User Information
5. Initial Network Design
6. Network And Cabling Design
7. NT Deployment Cut-Over Method

1. Overview

The embodiments of the invention involve methods, apparatuses, and computer program products for implementing a locked down environment in a client server architecture. The embodiments also involve a computer functional architecture, as well as an assets logistics process. The embodiments have been developed to set up and manage a large organization with a stable, re-usable infrastructure, facilitate computer sharing, minimise downtime, maximise reliability and minimize human resources required to support the infrastructure. In the following description, numerous specific details such as software applications, computer model numbers, naming conventions, and the like are set forth. However, it will be apparent to those skilled in the art in view of this disclosure that changes and/or modifications can be made thereto without departing from the scope and spirit of the invention. In other instances, details well known to those skilled in the art have not been set forth so as not to obscure the invention.

The locked down environment provides a thick client that works like a thin client. The application software is loaded from the client, but the user data is kept on the server. This enables a user to log in anywhere in the network and download their data. The locked down environment provides fast image response and fast image activation. Updates of the software can made to the Personal Computer over the network using remote management software such as Tivoli. Further, the locked down environment does not permit users to access local storage devices for storing user data, but instead compels the storage of data on storage devices available via the network. That is, all user generated data is held on a network server(s). Preference files are pre-written onto the PC and then locked down on the local storage device, forcing the user to go to the network drive to store user data. This also provides security for the user data. If the PC is stolen, no user data or "Intellectual Property" is lost. This also greatly ameliorates or eliminates the effects of hardware failure and consequential "down time" of users. Details of this aspect are set forth hereinafter.

Figure 1:
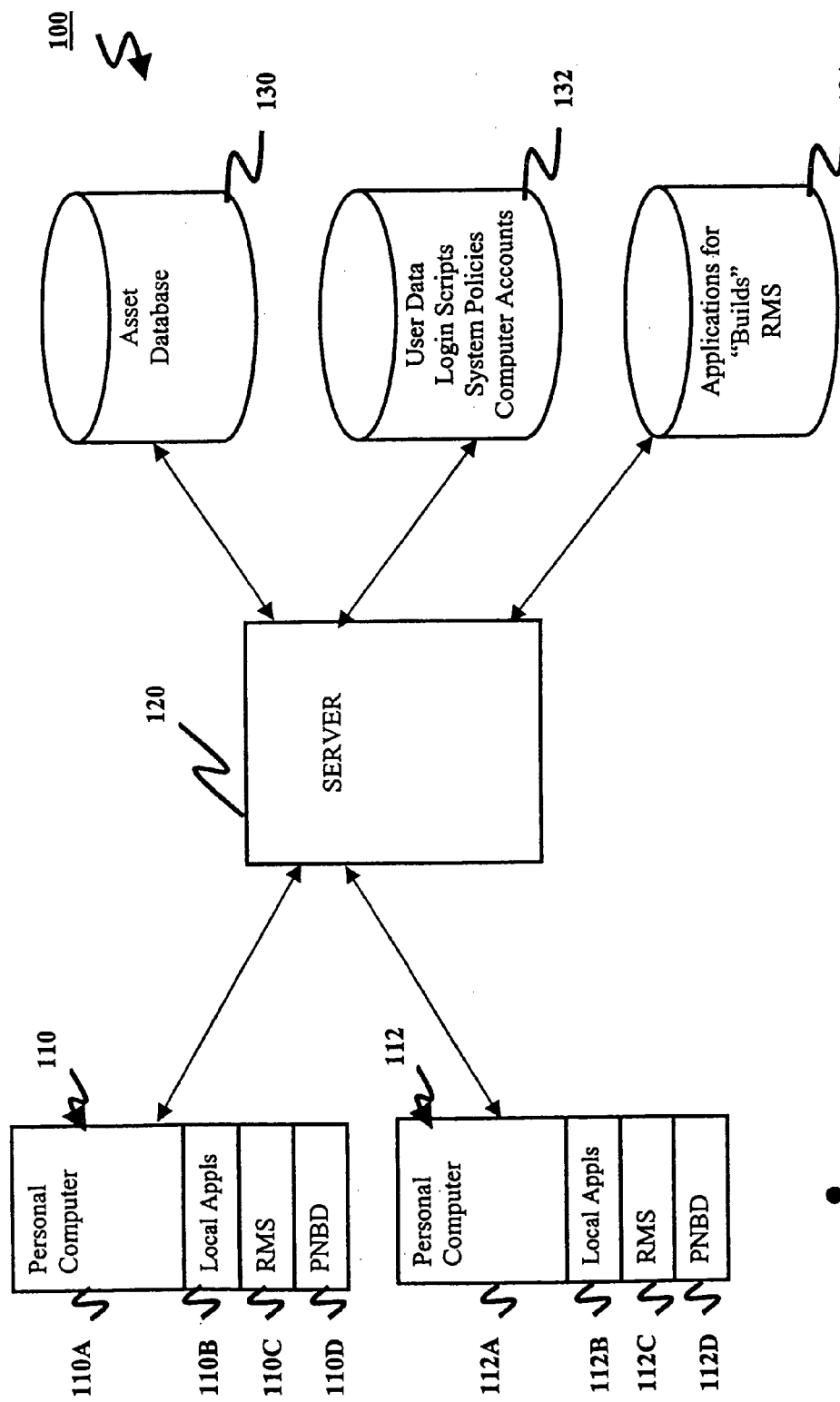
FIG. 1 is a high-level block diagram illustrating a computer networked environment 100 for implementing a locked down environment in accordance with one embodiment of the invention.

In broad terms, this embodiment of the invention is shown in FIG. 1 depicting a networked environment 100 of an enterprise or organization. Each client 110, 112 has a personal computer 110A, 112A, with an application image or simply local applications 110B and 112B once installed. Remote management software 110C, 112C can be used to interrogate the "asset", and installation of the locked down environment is effected by a personalized network boot diskette 110D, 112D. The clients 110, 112 are coupled to one or more servers 120 via a network (generally indicated by double headed arrows between the foregoing elements). An asset database 130 is accessible by the server, as are a database 132 containing user data, login scripts, system policies and computer accounts. Applications for the "builds" and remote management software 134 are accessible by the server 120. The networked environment 100 is described in greater detail hereinafter.

Figure 2:
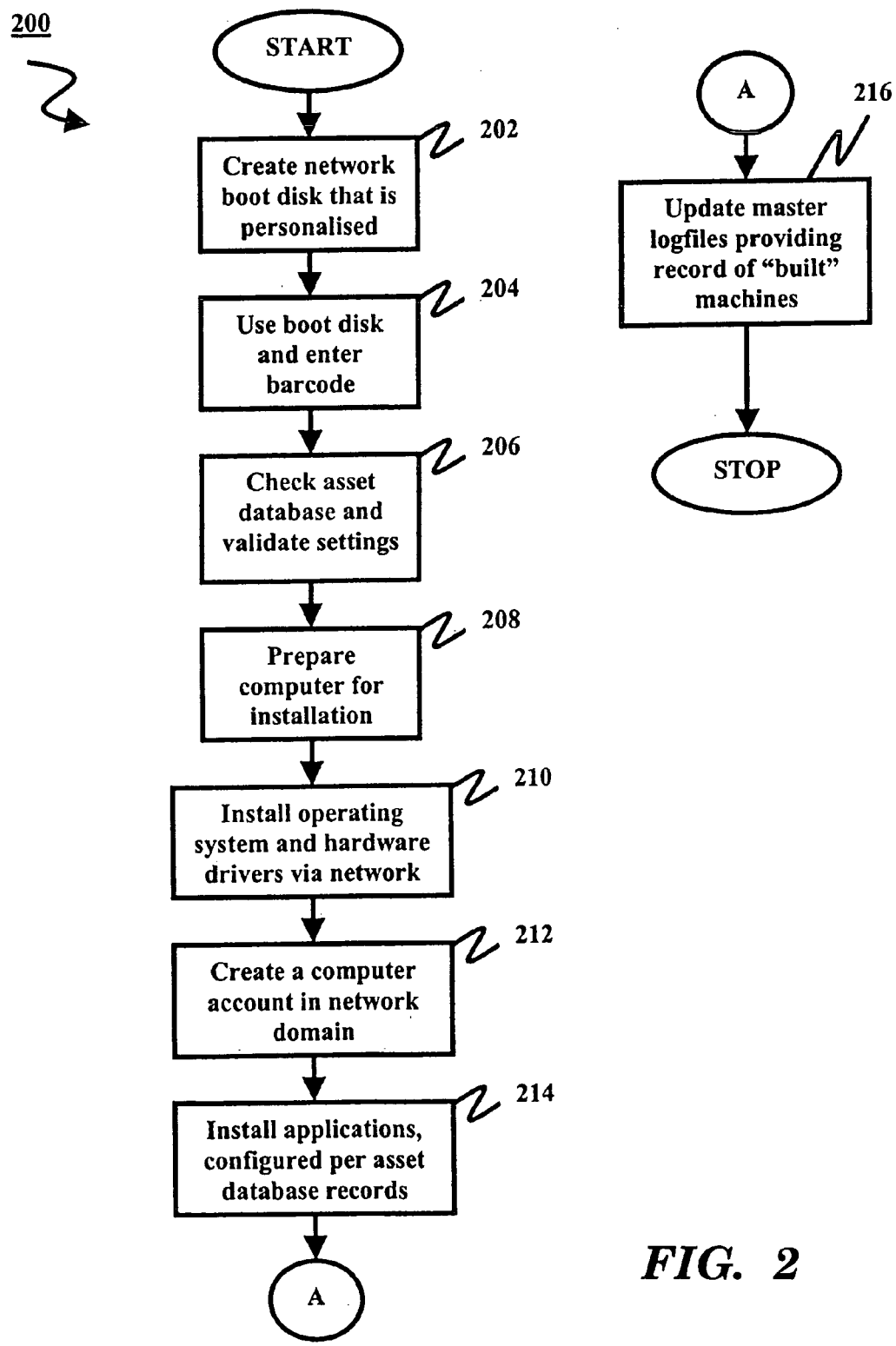
FIG. 2 is a flowchart illustrating a process for creating a build for a personal computer in the locked down environment of FIG. 1.

FIG. 2 is a flow diagram illustrating a generalized process 200 for providing a lockeddown client environment in a client-server architecture of a computer network. In step 202, a personalized network boot disk is created. In step 204, a personal computer is booted using the boot disk. A bar code or other identifier is entered to provide information about the personal computer (PC). In step 206, the asset database is checked using the bar code and the settings for the PC are validated. In step 208, the PC is prepared for installation. In step 210, the operating system and hardware drivers are installed via the network. In step 212, a computer account is created in the domain. In step 214, applications are installed on the PC via the server and the applications are configured per the relevnat asset database records. In step 216, the master logfiles are updated providing a record of the "built" machine. Processing then terminates.

The embodiments of the invention also include a computer functional architecture, i.e. a network hardware architecture for enterprise or organization networks, including client server systems. The embodiments modularise the logical functionality of the network from the physical structure using "low" level technology. Redundancy is added to the physical structure to maximize various measures (e.g., availability and throughout). In particular, using such redundancy, less expensive PC equipment can be used as server hardware, preferably using Intel-based servers. The system provides a Disaster Recovery Process (DRP) using Raid Controllers. In particular, RAID 5 with parity is used protecting data with many channels for throughput, focussing on data flows between devices. This system provides high availability and is a fault resistant architecture, achieving 90% or more effectiveness of special purpose or dedicated, mid-range systems yet at 20% of the costs of the more expensive approaches. The system uses lower end technology, and the user never sees the physical underpinnings.

The embodiments further include assets logistics processes. If an asset identified over the network is not recognized in an asset database, a locked down environment build is not permitted. That is, the Personal Computer is not permitted to be configured or to load an application image. If the asset is in the database, then the application image can be loaded. This provides essentially an electronic, centralized management database and associated processes. This enables the building and configuration of operating systems and applications on a personal computer, either a desktop PC or a laptop, to be moved from highly specialized personnel to relatively low skilled personnel. In this manner, new PCs can be rapidly deployed into the networked environment of the enterprise or organization. Further the deployed system reports back to an auditing system periodically, preferably every 30 days. This assets logistics process allows an enterprise or organization to check and determine where assets are. Further, the enterpise or organization is able to more effectively manage licensing of software, since users do not have privileges enabling the users to update or write files.

The embodiments provide a toolset for users, ensuring consistency and efficiency across the network. In essence, this involves a paradigm shift from the PC as a "personal" computer to a "business" computer in the enterprise networked environment. This involves a number of methodologies that are effectively building blocks for organized the network environment. Consequently, the networked environment has greater predictability.

2. Thick/Thin PC Client

The embodiments of the invention provide an advantageous Desktop Office environment utilising existing tools and applications. The embodiments address the challenge of implementing a back-office solution for a desktop client that reduces the cost of support by at least 50% over existing benchmarks. This implementation provides availability and access to data that meets or exceeds stringent Service Level Agreements requirements. The embodiments provide the following features:

1. Fast Application activation;
2. Work over any type of Network LAN infrastructure (ATM, Ethernet or Token Ring);
3. Extensible over Wide Area Network to remote sites;
4. Protect the client's Intellectual Property. Intellectual property as used here includes user data and data necessary to conduct a business and the like. This information often has concepts, processes and procedures that differentiate a business's or organization's product and provides a competitive edge. Loss of such information could significantly impact a business's ability to effectively compete in the marketplace.
5. Provide for a 3:2 sharing ratio of Staff to personal computer (PC) Equipment;
6. High availability;
7. Lower support costs;
8. Virtual Login, i.e. any staff member may login to any PC on the client's network and have their data and security access profile follow them to the particular PC the number logged into providing access to all authorised network services;
9. Utilise standard Office Automation Products (Word Processing, Presentation, Spreadsheet, Database applications, etc.);
10. Standardisation across the PC fleet allowing lowered cost of training;
11. Easy for end user to learn and use;
12. Ensure consistency of information interchange between internal staff and external organisations;
13. Ease of application software update and bug fix distribution;
14. Granular security control from the organisation level down to the individual staff member; and
15. Cater for 3 different computing environments, Standard Office, CAD, Desktop Publishing.

The phrase Personal Computer (PC) implies a number of cultural behaviours surrounding the word Personal. These behavioural characteristics include such things as:

1. The PC is permanently assigned to a particular staff member, i.e. "It's mine, I'll do as I please".
2. Since the computer is Personal, the staff member may perform configuration changes as desired without concern for ultimate impact on information interchange, configuration control (Hardware/Software), virus infection, data protection or software licensing.
3. Since the user is allowed to have Personal control over their system, business critical data is generally allowed to be stored on the local desktop computer. Loss of this locally stored data through fire, theft, vandalism or component failure costs organisations an amount estimated to be in the hundred's of millions of dollars annually throughout the globe. This loss of Intellectual Property and lost productivity can be crippling, if not fatal for an organisation.

These basic behaviours can cost large organisations hundreds of millions of dollars annually across the globe. These costs are typically contained under the broad heading of 'Support', 'Intellectual Property Loss' and 'Productivity Loss'.

The embodiments of invention involve a paradigm shift whereby the Personal computer became the Professional computer. An organisation can issue its staff members a toolbox, not a sandbox.

To overcome these organisation technology liabilities while achieving the requirements outlined above, the embodiments of the invention pioneer a new architecture and implementation methodology.

The new architecture utilises and builds upon existing, commercially available hardware and software. Viewed at a high level, the embodiments address the following issues:

1. The environment is Locked Down, so that an individual staff member may not modify the software configuration in any manner, except where specifically authorised to do so. No application software may be added or deleted without management approval. This facilitates many benefits including, software configuration control and software licensing compliance.
2. All organisational data is forced to be stored on a highly available, central file server(s). All desktops, except where specifically excluded, are not allowed to store any data locally. This protects an organisation's Intellectual Property by ensuring standard, regular IT disciplines are used to protect data (backup/restore, off-site storage etc.).
3. To allow for incremental computing capacity to be added, deleted or moved, the central storage performs file serving and network based services, such as Authorisation/Authentication, Mail, Printing and Name Services. Desktop PC's are the primary source of user compute cycles and memory necessary to perform the organisation's business.
4. To allow for fast Application Activation times, the user applications are primarily installed on the Desktop PC. The desktop PC provides the memory, computational facilities and scratch disk areas necessary for the application to function properly. This reduces the size and cost of the central services including the LAN bandwidth.
5. To ensure maximised flexibility within a facility, dedicated bandwidth is provided to each server, which aggregates into a high speed backbone and subsequent distribution to a managed ratio of PC's to LAN segment. Printing within larger sites, greater than 200 PC's, is put on dedicated segments.
6. All PC Computing Environment hardware is of the same memory capability. As far as possible, multiple PC hardware configurations are minimised by purchasing in large lots as needed. This ensures both standardisation of performance and minimises application or operating system errors due to hardware differences. Once a problem is identified, bug-fix distribution is greatly simplified.

To facilitate this environment, the embodiments of the invention utilize a particular set of commercially available products and communication standards. The Standard Operation Environment (SOE) preferably includes:

1. Operating System: Microsoft Windows NT™,
2. Office Applications: Lotus Notes (Mail and Application), Lotus Smartsuite, including WordPro, Freelance Graphics, Approach, 1-2-3 spreadsheet. Microsoft Office Viewers, Adobe Acrobat reader, Netscape, Terminal emulation allowing access to JDE for procurement and Norton Antivirus.
3. Tivoli for Hardware/Software configuration reporting, remote takeover support, availability monitoring and reporting.
4. TCP/IP as the network I/O transport.

However, other commercially available products may be chosen and have basically the same effect, plus or minus some features, if this solution/architecture is followed without departing from the scope and spirit of the invention. Just as a piece of iron can be cast to perform many different unique tasks, so the basic technology tools can be forged to create multiple unique solutions from the same raw material.

Central to this architecture is the choice of PC Operating System (PCOS). The PCOS must provide:
1. User Access/Authentication,
2. User Security Profile Management,
3. Application Management,
4. Access to Network Based Services (Print, Name, Authentication, Configuration (DHCP) etc.),
5. Access to high availability File Services,
6. Full complement of TCP/IP protocol support,
7. Ability to allow/deny access to resources located on the local PC based on the user profile,
8. Not allow a user to over-ride the access authorisation, and
9. Organisation Security Policy enforcement.

User Applications are standard with the customisation performed on the preferences to ensure consistent operation and integration into the LAN infrastructure. This pre-configuration also plays an important role in the overall deployment, installation and support of these products. Except where authorised, users are not allowed to modify these preferences or parameters.

Personal computers and Servers are preferably selected from standard, commercially available Intel-based products. Since data availability becomes critical in the embodiments of the invention, server construction plays a key role and is covered in a separate document.

Figure 3:
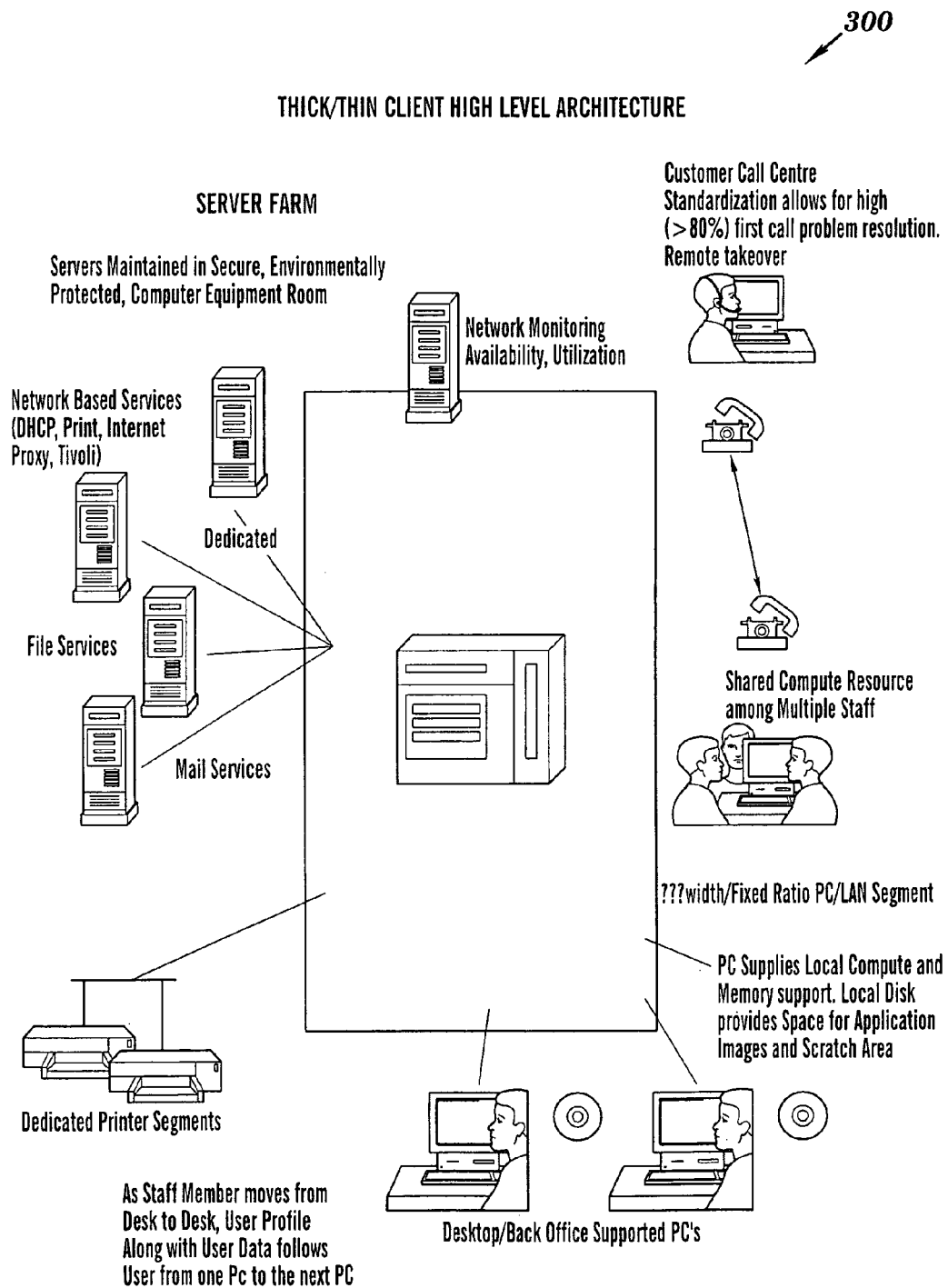
FIG. 3 is a more detailed diagram of the thick/thin client networked environment.

FIG. 3 is a more detailed schematic diagram illustrating a thick/thin client computsing architecture 300 in accordance with embodiments of the invention.

Figure 40:
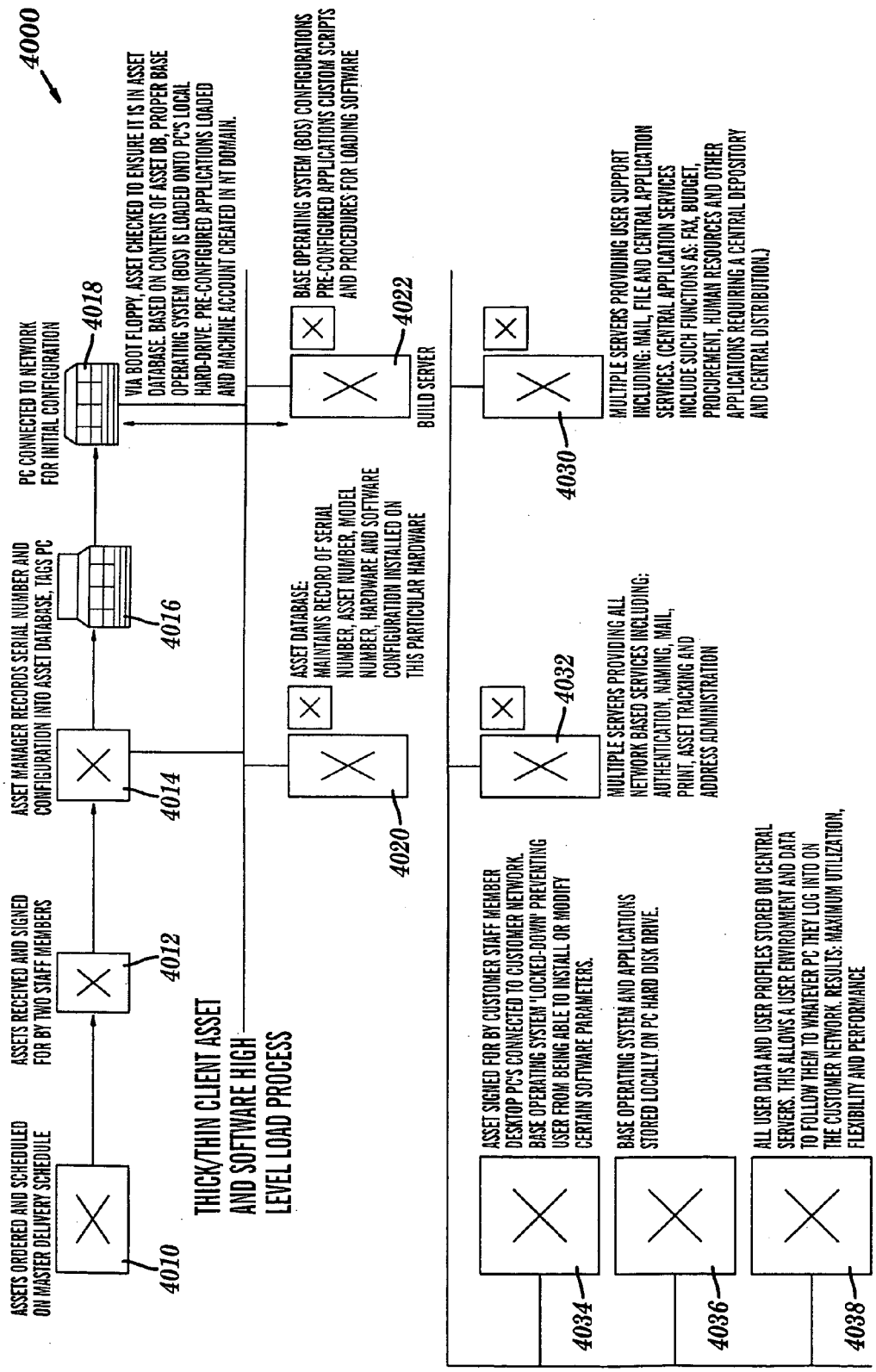
FIG. 40 is a block diagram illustrating the process according to the embodiment of the invention.

The process 4000 of FIG. 40 commences in step 4010. In step 4010, assets are ordered and scheduled on a master delivery schedule. In step 4012, assets are received and preferably signed by two staff members. In step 4014, an asset manager preferably records the serial number and configuration into an asset database and then tags the PC 4016 as shown. The PC 4018 is then connected to the network for initial configuration. This is done via floppy disk that is used to boot the personal computer. The asset is then checked to ensure that it is in the asset database. Based on the contents of the asset database, the proper base operating system (BOS) is loaded onto the PC's local hard drive, pre-configured applications are loaded, and a machine account is created in the NT domain. The build server 4022 provides the base operating system configurations, the pre-configured applications, and custom scripts and procedures for loading software. The asset database 4020 maintains records of the serial number, asset number, model number, and hardware and software configuration installed on the particular PC. Further, in this process, the asset is preferably signed for by a staff member. The desktop PCs are connected to the network, and the base operating system "lockeddown" environment prevents users from being able to install or modify certain software parameters as shown in block 4034. With reference to block 4036, the base operating system and applications are stored locally on the PC's hard disk drive, as shown in block 4036. Further, in block 4038, all user data and user profiles are stored on central servers. This allows a user environment and data to follow the user to whatever PC the person logs onto in the network. This results in maximum utilisation, flexibility and performance. The system also has multiple servers 4032 that provide network base services including: authentication, naming, mail, print, asset tracking and address administration. The multiple servers 4030 also provide user support including: mail, file and central application services. Central application services include such functions as: fax, budget, procurement, human resources, and other applications requiring a central depository and central distribution.

Benefits from implementing the solution/architecture of FIGS. 3 and 4 are as follows:
1. Significant reduction in cost-of-support. This benefit is attributable for several reasons:
   a) Since all PC's have a similar configuration, a hardware or software failure on one PC is not a high priority since the staff member may simply log onto another PC where their environment follows the staff member.
   b) The staff member cannot install software, thereby damaging other installations already on the PC.
   c) LAN bandwidth requirements are predictable.
   d) Centralised logon scripts ensure ease of implementation for Moves, Adds or Changes. This scripting is done at 3 levels: Organisation, Division/Group and Individual. By maintaining this hierarchy, data access at various levels of the organisation can be provided easily. By standardisation of the environment naming, ease of training and staff communication is enabled. This authorised data access facilitates organisational standardisation, i.e.: common look and feel for all electronic documents, Workgroup Collaboration and Individual Configuration (e.g., favourite printers) and confidentiality. The data follows the user instead of the user following data on a particular PC.
2. Fast Image Activation is ensured because an application image is stored on disk media local to the user.
3. Predictable performance is ensured because the PC hardware CPU and Memory are similar throughout the organisation.
4. The organisation's Intellectual Property is protected from loss due to fire, water, theft, component failure or acts of God since all user data is located on the file servers in a secure area. This user/organisational data is protected on the servers by:
   a) Security Profiles that determine which users can access specific data;
   b) Regular backups and off-site fire storage of all organisational data;
   c) Server redundancy, including the use of Redundant Array of Inexpensive Disks (RAID), separation of Server Operating System from User Data both physically as well as logically, Redundant Power, UPS, Multiple Network Interface Cards (NICs) and dedicated IO Bandwidth for disk spindles; and d) If a particular PC fails, is destroyed or is stolen, only the applications are on the PC while user data continues to be available from a server farm.
5. Centralised authorisation with distributed authentication ensures only properly authorised staff access data the staff are granted to have access to.
6. Centralised logon scripting also enables calling of hardware/software configuration monitoring and reporting software. This enables asset tracking applications to be called thus ensuring up-to-date status of asset availability to the organisation. Conversely, lack of visibility within a pre-determined time period alerts the organisation to locate a particular PC in question.
7. Information interchange is assured because the applications are all maintained at similar revision levels. Also no staff member can install their 'favourite' application such as a spreadsheet, thereby creating organisational information interchange problems.
8. Training is simplified because a standard software tool suite is maintained.
9. Executive management is put back in charge of an organisation's direction. Costs are more predictable, conversion issues due to lack of knowledge are eliminated while improving the organisation's return on assets.
10. Virus infections potential from staff installing software are significantly reduced or eliminated altogether and thus the associated costs with repair and organisation productivity.
11. Capital costs are reduced since not all staff need be allocated a "Personal" Computer. Sharing physical hardware while maintaining a level of personalization permits an organisation to reduce capital expenditures for PC's while enabling their workforce with the needed tools and data to deliver the organisation's business.
12. Centralised scripting further facilitates the distribution of software patches/bug-fixes while providing an entry point for calling overall software application installations or updates.

Demonstrated capabilities of an embodiment of the invention include:
1. Information availability 99.3%.
2. All services available greater than 99%.
3. Call Centre 'First Call' problem resolution rate greater than 80%.
4. All customer Service Level Agreement measurements met or exceeded.
5. Calls to Call Centre averaging approximately 1 call/user/month. Industry average indicates approximately 3–5 calls per user per month.
6. Highest customer satisfaction rating for the longest period to date.
7. Zero virus infections and as such, no resource expended cleaning/restoring 'clean' environment or loss of productivity to the end customer due to lack of access to data.
8. No un-recoverable data loss.
9. Support costs including overhead of approximately $1000/year/seat typically while industry averages researched by the Gartner Group are indicative of costs approximating $3000/year/seat.

The Total Cost of Ownership and costs of service delivery can be significantly reduced while improving the overall predicability and technology delivery to an organisation if the unique methodology/architecture in accordance with the embodiments of the invention is implemented.

Science has the same basic elements available to it, yet from these basic elements many varied and unique combinations can be formed. Putting the same basic technology elements together in a predetermined and defined manner in accordance with the embodiments of the invention yields a unique environment with repeatable characteristics.

3. Standardized Configuration of Workstations 3.1 Overview

A Windows NT Workstation Standard in accordance with an embodiment of the invention enables large numbers of computers to have Windows NT installed and configured (or, when necessary, rebuilt) quickly and efficiently. In addition, the setup may cater for an organisation's policy of sharing desktop PCs. The installation strategy should offer maximum flexibility (both on the hardware- and software-side), while at the same time keeping operator intervention to a bare minimum.

To achieve these objectives, a modular build process ties in with an Asset Database that is already in use at a site. Making the Asset Database the repository for all information about every machine's configuration offers a number of benefits:

Hardware and software are collected in one central location.
Duplication and re-entry of data is avoided.
Non-standard machines can be tracked.
Reporting and reconciliation are simplified.
The Build process uses the asset database to decide what to install on a given machine.
Integrity between the database and what is actually on the machine is ensured.
Manual interaction during the build process is minimised.

Conceptually, the installation process involves:
1. To start an installation, the operator inserts a network boot disk into the computer.
2. The operator is prompted for the barcode of the machine.
3. The operator is prompted to remove the disk.
4. The installation proceeds without manual interaction, using information from the database.

At that point, the operator may continue to another machine, and start the same process there. Meanwhile, the automated installation does the following:

Uses the barcode to check the asset database record for this machine.
Identifies the brand, model and type number from the asset database based on the barcode.
Once the model is known, the system locates a BIOS upgrade for this model and applies the BIOS upgrade.
Partitions and formats the hard disk(s) (unless the database specifies otherwise).
Windows NT is installed.
The database is queried for network card information, and relevant drivers are loaded.
Display drivers are also loaded as per the asset database.
A computer account is created in the domain and the machine joins the domain.
If the computer is a Laptop, ThinkPad Features (and—if relevant—Mwave) are loaded. Due to the mobile nature of a laptop computer (e.g., a ThinkPad), a different build is required on this type of hardware. Since the laptop is often operated while disconnected from the main network (Local Area Network or LAN), a modem can be provided for dial-up connectivity. "MWAVE" is an example of a modem that can be used; MWAVE is an IBM internal modem that can be used with a ThinkPad.

The database dictates what (if any) custom application set gets loaded onto the machine.

'Standard' software such as Tivoli and the Service Pack is installed.

Security is implemented on the workstation, both for the file system and the Windows registry.

The time taken for the installation varies depending on factors such as the application set selected, workstation hardware, and network load. Typically, a complete installation takes about 1 hour.

Ten or twelve machines can safely be installed at the same time without negatively affecting performance, but any number of installations can be initiated at once. Any excess is simply placed in a "holding queue" from which the installations are progressively released as other machines complete their builds.

Throughout the installation process, a number of logfiles are written to the server. At the end of the installation, an alert is sent across the network to the person that initiated the build, advising that person that it has completed.

3.2 Supported Hardware

Minimum Hardware Requirements

The following hardware configuration is a minimum that an organization might select for running a Windows NT workstation.

Although the following specifications are well above what is considered the minimum requirements by Microsoft, the perceived performance depends on a number of factors. For example, a person that uses a machine for Computer Aided Design (CAD) or Desktop Publishing (DTP) work is more likely to raise concerns over performance issues than someone who is simply using a terminal emulation package.

Processor Speed

An Intel Pentium (or faster) processor is recommended.

RAM

Sixty-four MB RAM is preferably the minimum standard for desktop and laptop models. Greater memory requirements may be necessary for specialized applications, such as Adobe Photoshop™.

Hard Disk Size

For desktops, the recommended minimum hard disk size is at least 3.0 GB. For laptops, the requirements may be increased to cater for H: and S: network drives being local.

Supported Models

Within an organizations's environment, many different models of hardware may exist prior to a migration to Windows NT. Due to the minimum hardware requirements specified, the number of unique models can be reduced, but there may still be around a dozen common configurations.

Set out below are the supported models, on both the desktop and laptop sides, together with brief descriptions of each, with which the embodiments of the invention are preferably implemented.

Manufacturers (e.g. IBM) regularly manufacture more than one 'model' while still using the same 'model number' (e.g. '760 ED' or '300 GL'). Thus, it is important to identify machines by the type number (see sample ThinkPad label) rather than model designation. All the following model numbers are in respect of IBM products. However, the same principles would apply to products by other manufacturers without departing from the scope and spirit of the invention.

Desktops

PC 300GL with CD

The PC300 GL is the most common model within environment with the preferred embodiment of the invention. This model has a P200 MMX processor and 32 MB of RAM standard and may include a CD-ROM. Memory should be increased to 64 MB.

PC 300GL without CD

This model makes up the bulk of the desktop stock in accordance with the preferred embodiment. These are identical to model PC 300GL, except that this model does not include the CD-ROM.

PC 300PL

Only a small number of models of this type are used in the preferred embodiment.

PC 350

Only a small number of these models are used preferably, as these have P200 processors.

PC 365 with SCSI

These machines are preferably used for CAD and DTP applications. The machines have Pentium Pro—200 processors and typically substantial amounts (64 MB or more) of RAM. In addition, the machines preferably have SCSI interfaces as well as SCSI hard disks, which contribute to improved performance.

PC 365 without SCSI

The PC365 is very similar to the PC365 model mentioned above. However, this model does not include SCSI.

P75

These 3 models are all older style Pentium-75 based machines, which have been upgraded with larger drives and more memory to provide reasonable performance. Although listed as 3 separate models, the models are essentially identical. The different type numbers indicate that the models were supplied with different drive sizes and operating systems.

P100

Similar to the P75 models, but based on a Pentium-100 processor.

Laptops

Although there may not be quite as many types of laptops as desktops in use by an organization typically, there may still be some variety.

In the embodiment of the invention, older ThinkPad 750- and 755-series models, which may use 486-series CPUs, have been replaced with Pentium-based ThinkPads from the 760- or 765-series.

Four primary types of IBM ThinkPads are preferably used. Further, laptops with 48 MB of RAM have generally adequate performance.

765D

This is a common model of the ThinkPad range used in the embodiments of the invention and typically has 48 MB of RAM and a PCMCIA modem. The memory should be increased to at least 64 MB.

760ED (XGA Version)

Although somewhat older, the performance of this model is adequate. These machines may have an optional Telephony Adaptor for Mwave, but some utilise card-modems of various brands and types. This model is the $2^{nd}$ most common ThinkPad utilized in the embodiment of the invention (roughly 20 machines of this type in use).

760E

This model is essentially a 760ED without the CD-ROM. Only a handful of these are used.

760XD

The 760XD is quite similar to the 760E/ED, and a little bit faster. Only one or two are used.

560-series

ThinkPad 560's may also be used if the machines have been upgraded. The machines can be tested and included in the standard.

Supported Network Cards

A number of different network cards were in the embodiment prior to the NT migration. Although there may be some variety, new machines all come with a 'standard' card. In addition, a number of commonly occurring older cards have been identified as 'preferred' and included as options in the build.

ISA Network Cards for Desktops

Although all of the following ISA cards may use the same DOS-level drivers (and thus can use the same boot disk), the individual card type must still be selected in the Asset Database for the NT installation to be successful.

IBM Token Ring Autowake

All new desktop machines are preferably supplied with the IBM ISA Autowake card. As the name implies, this card supports the auto-wake on LAN feature, but for this to work, the relevant cables must be correctly connected. This card is sometimes identified as IBMTOK5, and that is the driver which must be selected for the card to work correctly.

IBM Token Ring 16/4

This is an older type of network card, which exists in a number of variants. Although the exact shape of the card varies considerably between revisions, most of the cards are visually similar to the IBM Token Ring Autowake Card. However, there is a newer release of this card, which may tend to cause a bit of confusion.

The principal difference between the cards is that there is nowhere to connect any autowake cables on this model. All of the Auto 16/4 ISA cards should—regardless of the physical layout and size of the card—be able to use the IBMTOK4 drivers.

PCMCIA Network Cards for Laptops

Just as there are different network cards used on the desktops, there are a number of different PCMCIA network cards used on the Laptops.

IBM Token Ring Turbo 16/4 (PCMCIA)

The Turbo 16/4 PCMCIA card is commonly supplied with Laptops. The card can be distinguished by "Turbo 16/4" being printed in Green letters over a reflective background. This card actually looks rather similar to the older style 'Auto' card, but uses completely different NT drivers. In addition, the network cable is not quite the same. This card is identified in the asset database as 'T16PCM'.

IBM Token Ring Auto 16/4 (PCMCIA)

The Auto 16/4 PCMCIA card is often used on older Laptops. In addition, this card is sometimes supplied with new machines (typically in case the 'preferred' model is out of stock). This card looks very similar to the newer style 'Turbo' card, but uses completely different NT drivers. As mentioned above, the network cable is somewhat different. If the cable does not fit, connection between the cable and card should not be forced. In the Asset Database, this card is referred to as the 'A16PCM'.

Please note that although these two cards may appear similar (and use the same DOS-drivers), they are different. If the wrong type is selected in the asset database, NT may not be able to install and configure the drivers.

IBM Turbo 10/100 Ethernet (PCMCIA)

The Turbo Ethernet Card is the currently most common network interface card utilized on laptops. While this card physically appears similar to the Token Ring cards, a different cable is required and a different set of drivers is necessary for it to function properly in the laptop.

3.3 Supported Software

There is a considerable variety of software used within an organization's environment in accordance with the preferred embodiment of the invention.

Software Build Options

A number of applications are considered 'standard' and get installed on every machine. This application set is known as the 'BASE' build. In addition, other application sets are also available. These other applications sets are normally based on the common 'BASE' application set, with custom additions.

Table 1 briefly lists the contents of each build set in accordance with the preferred embodiment.

TABLE 1

| | |
|---|---|
| BASE Software Build | Lotus Smartsuite 97 |
| | Organiser 97 GS |
| | Lotus Notes 4.6 |
| | IBM Antivirus v3.0 |
| | IBM Personal Communications v4.1 |
| | Trim 4.1 |
| | DB2 5.0 |
| | JD Edwards 7.3 (aka GUI-400) |
| ABC Software Build | All BASE software |
| | Flowcharter v7.0 |
| TRAINING Software Build | all BASE software |
| | Pace training package |
| CAD Software Build | all BASE software |
| | Microstation |
| | Photoshop v4.0 |
| | Adobe Type Manager & Custom Fonts |
| DTP Software Build | all BASE software |
| | Photoshop v4.0 |
| | Adobe Illustrator |
| | Quark Xpress v4.0 |
| | Acrobat Reader 3.0 |
| | Adobe Type Manager & Custom Fonts |

The foregoing is merely an example of the types of software that may be used in one or more builds. Different software may be used without departing from the scope and spirit of the invention. In addition to the above 'regular' builds, two 'special' builds warrant further discussion. First, there is a 'Laptop' build, which is designed for Laptops. Preferably all laptops of the preferred embodiment are built with this software combination. Attempting to load other builds on a laptop is not supported. Secondly, a 'Support' build has been created for the convenience of onsite staff. This contains all the software that is on the client machine, but has a few additions that are designed to simplify matters for support staff.

TABLE 2

| | |
|---|---|
| LAPTOP Software Build | all BASE software |
| | Acrobat Reader 3.0 |
| | IP Dialler (aka IGN) |
| | Xerox Textbridge |
| | Suretrak |
| | Winzip |
| SUPPORT Software Build | all BASE software |
| | DPU |
| | Technet |
| | NT Server tools |
| | VM session |
| | IP Dialler (aka IGN) |
| | Flowcharter |

Again, different software may be practiced without departing from the scope and spirit of the invention.

Non-Standard Software

If any combination of software is requested that is not available as part of a standard software build option, the matter should be referred to a Site Manager, who may authorise the addition of further (non-standard) software on a given machine. Should this be necessary, it becomes especially important to ensure that the Asset Database accurately reflects the configuration of the machine.

3.4 Asset Database

A central database or "asset database" acts as central repository of all information relevant to the configuration of each of the machines. For example, the database contains information about hardware configurations, making it easy to identify all machines with, say, a particular network card or hard disk size. In addition, the asset database provides information about the software that is installed on a machine. Last, but not least, this database is used by the build process to install various software, depending on what is selected in the database. For example, device drivers for network cards and display interfaces are loaded based on the selections in the database. Similarly, the database also controls the selection of application software that is installed on the client workstation.

Features and Benefits

The Asset Database offers a number of important benefits, the key ones being that the Asset Database:
acts as a Central Asset repository,
avoids duplication or re-entry of data,
tracks non-standard machines,
simplifies reporting, and
provides information that the build process uses to decide what to install on a machine.

Usage

During the installation, a build process communicates with the asset database, but this is typically transparent to the operator.

Help Desk staff should familiarise themselves with the information available in the database (and its layout) as such staff may from time to time be required to verify that current entries are correct. Network card settings are probably the one item that are regularly used by Help Desk staff. However, maintenance of the Asset Database should generally be the responsibility of the Asset Manager.

Selecting a Build Option in the Database

Before building a machine, the asset database needs to be up to date. Normally, all required hardware-related fields already filled in as part of the regular asset control procedures. Software options may not be known in advance, so before a machine gets built, one should confirm that—at a minimum—the software selected is appropriate and relevant to the ultimate user of the machine.

FIG. 4 is a screenshot of a Microsoft Access Summary window 400 illustrating a configuration of a personal computer from the database.

If a machine is being re-built, there is not normally a need to change anything in the database. However, if the machine is to be delivered to another user, or has had hardware upgraded or replaced, the user should ensure that the database contains the correct information before starting the installation. If the site manager has authorised that a machine be setup with non-standard software, it would normally be based on one of the standard builds. Once the 'base' software has been loaded, further software may be installed manually. In such a case, the 'non-standard' checkbox in the database should be utilised together with the 'Other Information' field to provide a detailed record of how the machine is configured.

Maintenance

The asset database is normally managed by an on-site asset manager. Anyone involved in the build process should understand what the various options are and do. This way, unnecessary rebuilds due to miscommunication are minimised.

3.5 Boot Disks

The creation and use of network boot disks are now described. The boot disks are necessary to connect to the network and start the installation of NT to a client machine.

Creation

The tool which is used to create the network boot disk is called MAKEDISK. MAKEDISK is a computer script program utilized to build/create a bootable floppy disk. This disk enables a "virgin" computer to boot and is given enough intelligence to load files over the network. This capability allows an operating system to be loaded onto the hard disk drive and installed locally on the virgin desktop computer. FIGS. 19A–10D illustrates an example of a makedisk.bat file.

Running Makedisk

MAKEDISK can be run by anyone that needs to create a network boot disk and has sufficient access rights to the network. Typically, the person that actually ends up using the diskette creates the diskette, but it may also be done by a supervisor or administrator. There are two ways of starting makedisk (the one that is most appropriate at any given time may be used):

While booting of an existing boot-disk, simply wait for the barcode prompt to come up. Then, instead of entering a Barcode, type MAKEDISK and press enter.

Alternatively, the program can be run from within Windows NT, either by running it from a DOS-prompt, or by clicking on the icon for the file. The programs name and location is: I:\SCRIPTS\IMAGE\MAKEDISK.

Figure 5:
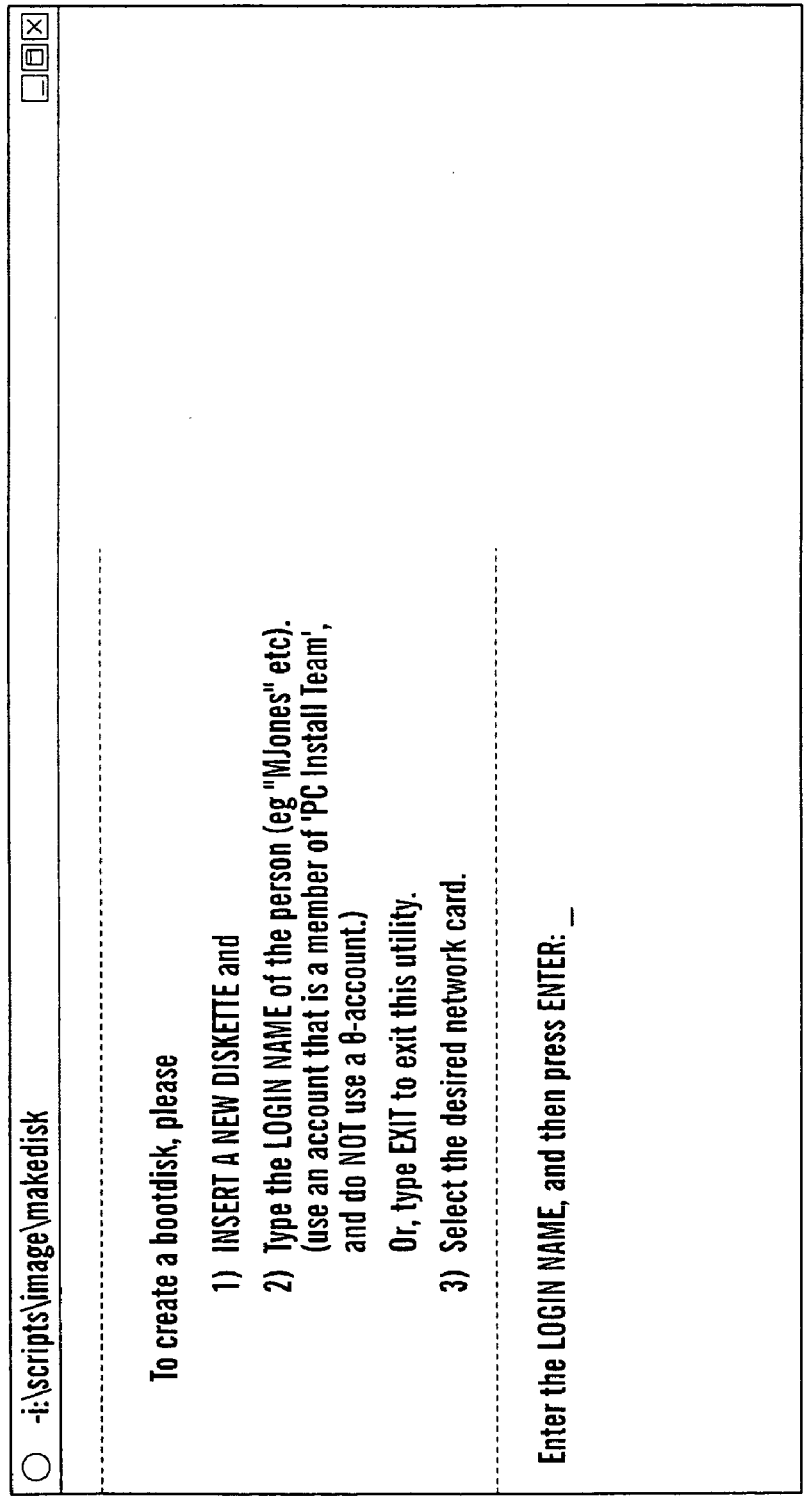
FIG. 5 is a screenshot for the Makedisk command.

FIG. 5 is a screenshot 500 of the text prompt for the makedisk command. At this stage, the name of the login id is typed that 'owns' this boot disk. 0-accounts must not be used, as this would compromise security. This architecture utilizes a convention whereby a "0" is added to the beginning of an account ID. The "0" account is preferably a domain privileged account, which the login script parses and bypasses all login scripting. This bypass prevents certain profile information from being loaded onto the client system when a domain administrator logs onto the client to perform any required maintenance, software or hardware. Instead, a 'normal' domain account is used that has been made a member of the 'PC Installation Team' group. Under normal circumstances, the entire login script is desirably executed. A normal account is used to execute the entire login script so that all logging and configuration steps are accomplished.

Selecting the Network Card

Once you have entered a name, another prompt is received, presenting a user with the available network cards as options.

Preferably there are only 2 choices:

'Autowake ISA' or 'Auto 16/4 ISA', which is used for any of the supported network cards for desktop machines.

'Turbo 16 PCMCIA' or 'Auto 16 PCMCIA', which is used for any of the supported Laptop network cards.

Figure 6:
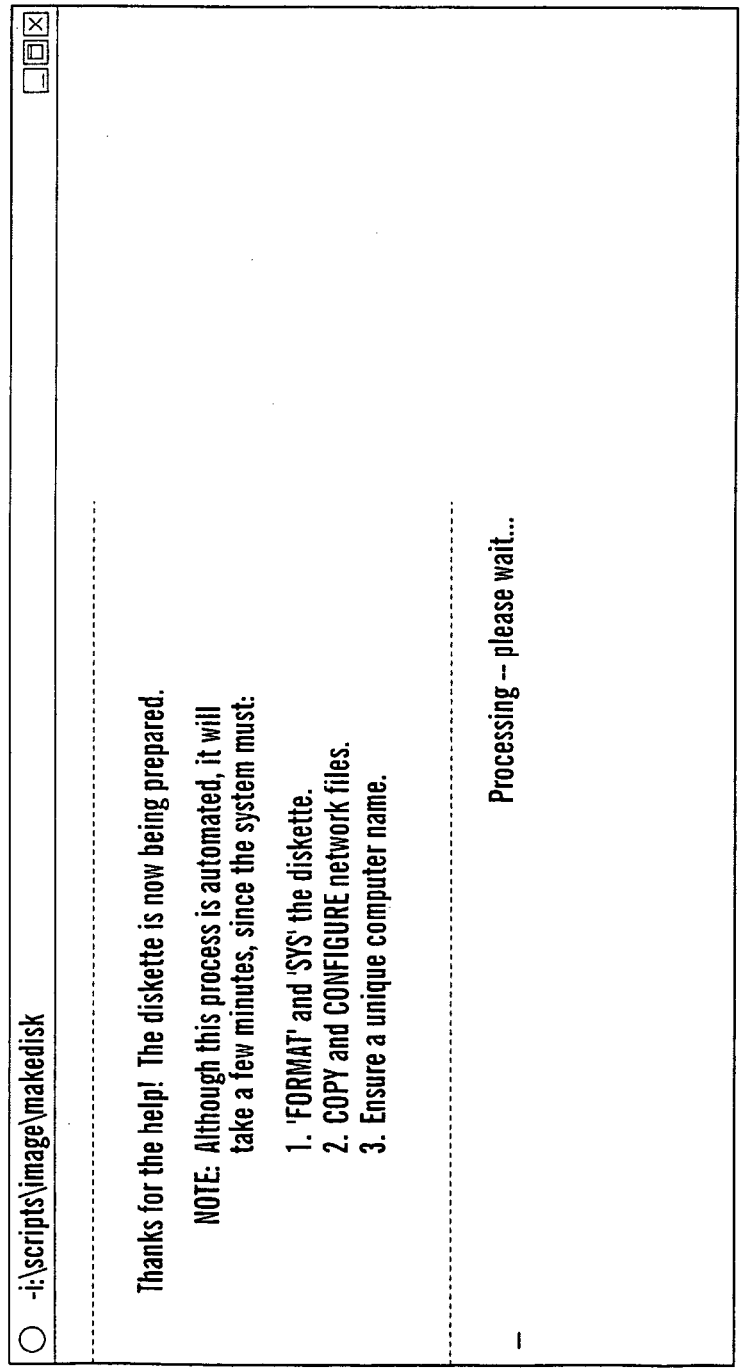
FIG. 6 is another screenshot for the Makedisk command.

Once the card-type has been selected, the boot disk is automatically created. FIG. 6 is a screenshot 600 illustrating the text interface displayed during this process.

Although the boot-disks can use identical drivers for multiple cards, the same does not apply to Windows NT. The exact card (e.g. IBMTOK4 or IBMTOK5) must be selected in the asset database when building a machine, even though the same bootdisk may work for both of these cards.

Technical Details

The process of preparing the boot disk takes approximately 3 or 4 minutes. The reason that it takes so long is that MAKEDISK.BAT has to FORMAT the disk, then make sure that it is bootable. The diskette also has to be modified so that the diskette can be used as an IBM BIOS upgrade disk. Finally, the network files have to be copied down to the disk and configured with a unique computer (machine) name. In addition, the disk is personalised and logfiles tracking the process are written to the server.

Labelling

Figure 7:
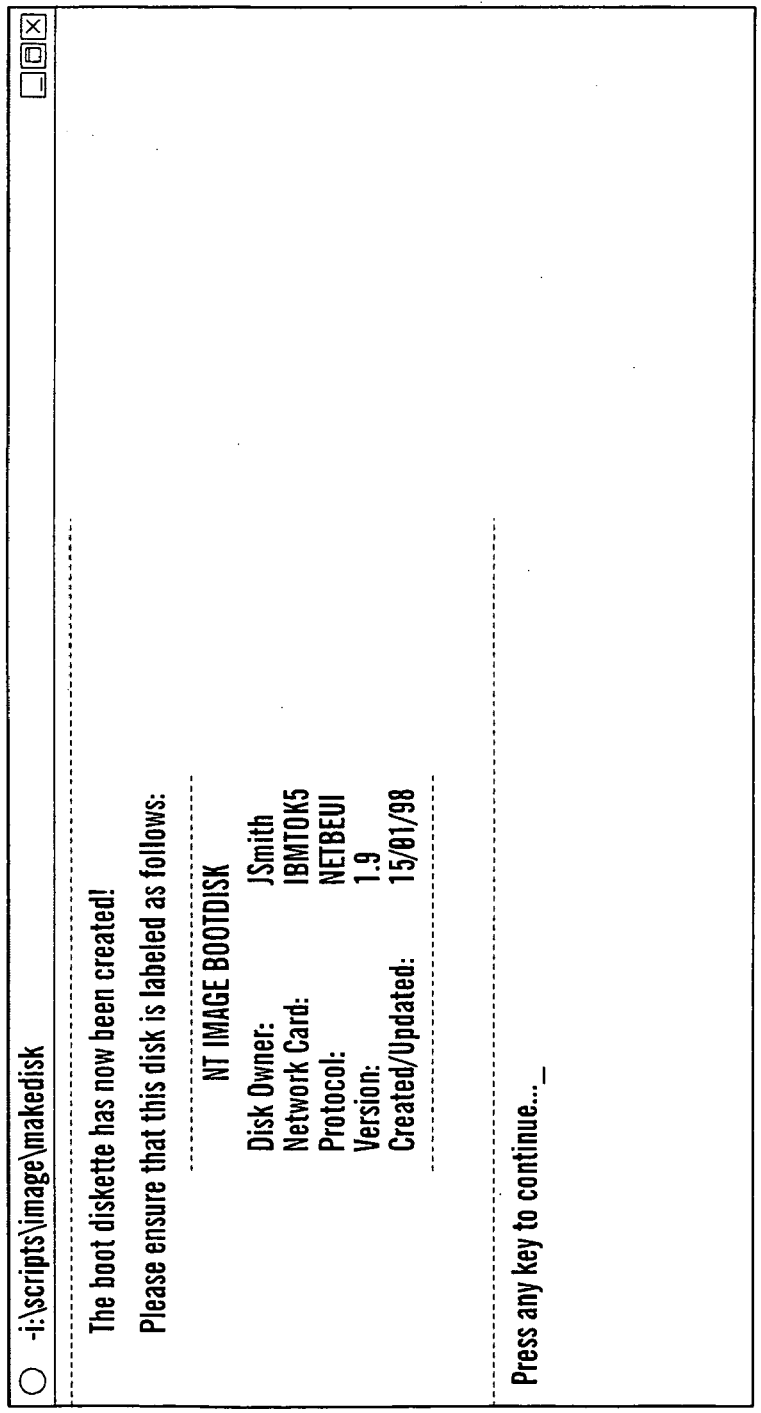
FIG. 7 is a screenshot illustrating an example of a diskette labelling format.

Once the diskette is ready, the operator is presented with a suggested labelling layout 700, for example, as shown in FIG. 7. Users are encouraged to label their diskettes in a manner similar to this one, so that different diskette versions and owners can be readily identified.

Duplication

At this point, the operator may choose to create further boot disks. If desired, one can create multiple boot disks for a particular user. Even if the disks are used at the same time, the disks still work (since the disks are unique). Conversely, please note that simply running DISKCOPY or a similar command only provides a backup copy of the disk—will not be able to use a DISKCOPY'd boot disk at the same time as a 'real' one as the copy does not have a unique computer or machine name, etc.

Usage

First Time

The first time that a boot disk is used, the operator is prompted to 'validate' the boot disk. The operator does this by typing (and then re-confirming) his or her password. This process ensures that the person actually using the boot-disk is the same person that the disk was created for. This helps to ensure the integrity the system in relation to security in general and logfile creation in particular.

Normal Usage

During general usage, the process is straight forward. To start an installation, the operator:

1. Inserts the Boot Disk
2. Enters the barcode when prompted
3. Removes the boot disk when prompted (this should happen within a couple of minutes).

Although the build may take an hour or more, the boot-disk may immediately be used for other machines.

Security

Once the operator has validated the boot disk, the disk effectively becomes a 'key' to the installation and is to be treated as such. In other words, once validated, the boot disks contain network authentication information, which is another reason why the disks need to be treated responsibly. In particular, that keys (disks) are personal and should not be lent. If a boot-disk is lost, that operator's domain password should be changed to render the diskette invalid. The installation requires the operator to be a member of the 'PC Installation Team' group on the domain before the boot disks can be used.

It is recommended that any accounts that are made members of this group and issued with network boot disks have only 'user' rights, so as to minimise unnecessary security exposure.

3.6 The Build Process

Installation Process—Overview

The installation process consists of a number of automated stages, where necessary separated by automatic reboots. Throughout these processes, feedback is provided to the operator(s) through screen output, logfiles and alert messages. The installation process may be considered from either a 'physical' or a 'logical' perspective, and it may be useful to compare and contrast the two. The various reboots are highly visible parts of the installation, and the installation sequence is therefore summarised hereinafter reboot by reboot.

Physical Sequence

1st Floppy Boot

Connects to the network (using a computername from the bootdisk).

Synchronises time with the server.

Prompts the operator for the barcode of the machine.

Checks the Asset database and validates the selected settings.

Loads updated BIOS (if available).

FDISK's and FORMAT's the harddisk.

Reboots the machine.

2nd Floppy Boot:

Connects to the network (using the above computername).

Copies minimal network files to the client machine (and configures them).

Prompts the operator to remove the boot diskette.

At this point, the operator may leave and the bootup-disk can be used for another machine.

Reboots the machine.

1st Hard Disk Boot:

Connects to the network (using the barcode as a computername).

Starts an unattended NT installation.

Configures the network card using information from the asset database.

Configures the display driver (also using information from the asset database).

Reboots the machine.

2nd Hard Disk Boot:

Logs on to the local machine.

Creates a computer account on the domain.

Brings the machine into the domain.
Maps a temporary network drive to the server.
Installs any applications (e.g. ThinkPad Features) that need to be installed using the actual 'Administrator' account.
Reboots the machine.

3rd Hard Disk Boot:
Logs on to the domain.
Installs applications as per the asset database record.
Installs 'standard' software, e.g. Tivoli.
Installs the Service Pack (and any applicable hotfixes).
Updates the master logfile to provide a record of what machines have been built.
Sends an alert to the person that started the build, advising that the build has now completed.
Shuts down the machine.

Logical Sequence

In comparison to the 'physical' sequence described hereinbefore, the 'logical' sequence of events during an installation is much more structured, as shown in Table 3.

TABLE 3

Booting from the diskette
Automatic preparation of the machine
Loading BIOS updates
Partitioning & formatting the drive
Automatic Installation of the Operating System
Windows NT
Network Drivers
Display Drivers
Joining the Domain
Automatic Modifications to the Registry
Swap file size
Logon Bitmap
Wallpaper
Packet Size
Automatic Installation of Applications
Applications are loaded as per the asset database
'Standard' system software (e.g. Tivoli)
NT Service Pack In Table 3, automatic preparation of the machine involves loading BIOS updates and partitioning and formatting a hard disk drive, for example. Similar comments apply to automatic installation of the operating system and automatic modifications to the Registry.

With regard to automatic installation of applications, applications are loaded in accordance with the asset database, including standard system software and an NT service pack, for example. This is the process step whereby the asset database is read, the products destined for the specific asset are determined, and installation of the applications on the hard disk drive of the destination PC is performed.

3.7 Feedback

While a machine is being built, various types of feedback are provided for the convenience of operators and administrators. This feedback takes the form of Courtesy Alerts, Logfiles, and—sometimes—simple screen output.

Courtesy Alerts

Figure 8:
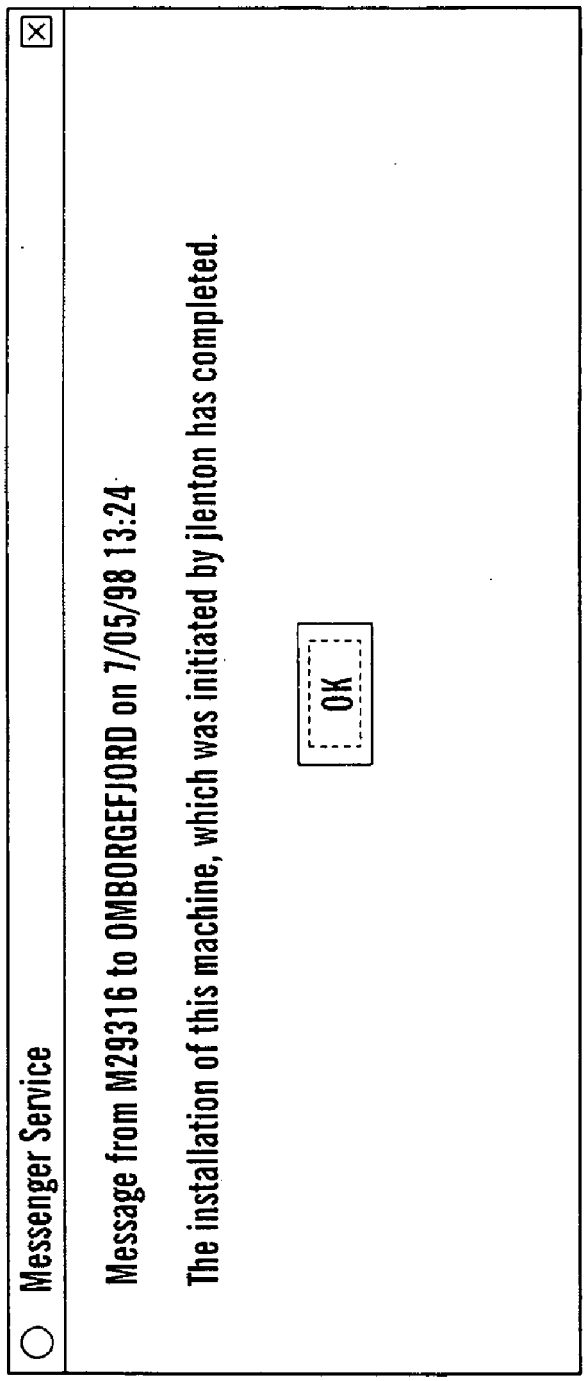
FIG. 8 is a screenshot of an example of a courtesy alert.

Once an installation has been completed, an alert message 800 shown in FIG. 8 is sent to 'interested parties'. The message looks similar to the above and may be sent to the following accounts:
  (1) The operator that initiated the build is the primary recipient of the message;
  (2) However, since the operator is possibly back at his or her desk and is logged on using a 0-account (i.e. the admin account) rather than the 'user' account that was used for the build process, a message is also sent to the corresponding 0-account; and
  (3) In addition, messages are sent to listed build administrators.

Logfiles

At the end of the installation, a master logfile is updated as a summary of what machines have been installed. This is in addition to the individual (and rather comprehensive) log file which is continuously updated throughout the build of each machine. Other activities that are tracked through logfiles include the installation of 'unusual' applications (e.g. Photoshop, Flowcharter, etc.), that have their own application specific logfiles in order to simplify auditing and licence management. Similarly, Boot Disk creation is tracked through the bootdisk.log file.

MASTER.LOG

For each machine that is built, a summary line is created in MASTER.LOG 900, containing a timestamp, the barcode of the machine, and the name of the operator that installed this machine as shown in FIG. 9A.

BOOTDISK.LOG

As a boot disk is being created, BOOTDISK.LOG 950 is updated to identify who created a bootdisk for whom. In addition, the version number and type of network card(s) that this disk is intended for is logged as shown in FIG. 9B. This information is collected both for troubleshooting purposes and to allow prompt replacement of any boot disks if a new version be released.

Mxxxxx.LOG

For each machine that is built, a detailed logfile 1000 is also created. The name of this file is Mxxxxx.LOG, where xxxxx is the barcode of the machine in question. As can be seen from the sample shown in FIGS. 10A-1–10C-2, the level of detail in this file is quite high.

Application Logfiles

From a licencing point of view, perhaps the most important logfiles of all are those that relate to a particularly 'expensive' product. Examples that fit into this category include applications such as Quark Xpress or Adobe Photoshop. The format of such a logfile can be seen from the extract from the PHOTOSHOP.LOG file 1100 shown in FIG. 11.

3.8 Server Setup

Certain aspects of the server configuration affect the workstation clients. The most visible influence is the drive letters that are used for various network drives. These are generally allocated through the logon scripts, which also handle printer assignments. Finally, system policies also affect the look and feel of the client machine.

Drive Mappings

A number of network drives are mapped for almost all client machines. The logon scripts generally control these mappings. However, some of the mappings that are used on the laptops point to 'virtual' drives that are local to the workstation. Such mappings are necessary to ensure that the machine behaves consistently regardless of whether the machine is on or off the network. The primary reason for this setup is to simplify the setup of Lotus Notes, since Lotus Notes can now be configured the 'same' for both laptops and desktops. The common drive letters that are preferably used are as follows:

G: drive

This is the "Group' drive, which is used by a department or similar work group to share data.

P: drive

The P: drive is (historically) the 'Applications' drive.

S: drive

This drive is available for the entire organisation, and contains common items like Smartsuite templates, etc. A local version of this drive is used for laptops.

H: drive

This is the users home directory, which typically resides on the server. A local version of this drive is used for laptops. Synchronising laptop data to a server (if desired) becomes the responsibility of the user, which requires a manual process.

Logon Scripts

A number of login scripts are used by an organisation in accordance with the preferred embodiment. Firstly, there is a common script, which is run by 'everyone', followed by smaller (often departmental) modules that handle group drives and printer mappings. In addition, provision exists for users to have individual modules on their H: drives. Preferably, this is done for the Lotus Approach application that handles non-standard printer selections in the preferred embodiment.

Login scripts are well known, as is their function. Such scripts are important for how user profiles are mapped to groups and subsequently follow an individual from PC to PC in the preferred embodiment. The scripts perform many tasks at each logon, such as:

(1) mapping favourite/group printers to a user upon logon,
(2) setting the time (based on an atomic clock sync connection on the time server),
(3) mapping network drives,
(4) spelling dictionary updates and the like, and simple application installations and updates (e.g. fonts).

COMMON.CMD

This is a common script, which is run by 'everyone'. This script sets up common drive mappings and synchronises the time between the client and the server. An example of this script is shown in FIG. 17A-1–17C-2.

LAPTOP.CMD

This is a minor variation of COMMON.CMD and is used on the laptops. The primary difference between the two is that LAPTOP.CMD does not attempt to map S: and H: drives. Instead, these drives are mapped from the laptop itself as the laptop boots up.

Group-Specific Modules (e.g. TECHNOLOGY.CMD)

Each group or department in an organization often requires a custom login script. When applicable, any unique settings that are required by a group can be kept in a separate module. This avoids duplication of data and simplifies maintenance. Such logon script modules are normally named after the department, e.g. 'TECHNOLOGY.CMD' and take care of printer mappings and group drives. FIG. 18 illustrates an example of such a technology.cmd.

User-Specific PRINTERS.CMD on H:

An additional login script module is created on a user's H: drive if the user makes use of custom printer mappings tool. If such a file exists, the script module is called from the main COMMON.CMD script.

System Policies

The final component of the server setup that affects the client workstations is System Policies. Policies are used to control a number of things that affect both the look and feel of the client machine, as well as what the user can and cannot do. Preferably, there is a common policy for all of an organization's desktop users in the preferred embodiment. For historical reasons, this policy is named 'PolTrain' in the preferred embodiment, and all desktop users should be members of this Policy Group. Laptop users should not be members of this group, as it would interfere with the operation of their machines. The POLTRAIN policy preferably controls the following:

Disables Desktop Icons

All desktop icons are hidden, so as to provide a 'clean' interface that is less likely to distract the users.

Maps Start Menu To 'Default User'

The start menu is mapped to a known location for all users. This further helps in reducing the clutter as the 'all users' part of the menu is no longer necessary.

Forces Background Wallpaper

Predetermined images or patterns appear as the background desktop wallpaper.

Disables Last User Name

For security reasons, the last logged on user's name is not displayed in the logon dialog box.

The system policy is a powerful tool, the setup of which has been carefully tuned and tested to provide optimal results for an organization's environment in the preferred embodiment. Due to the interaction and delicate balance between login scripts, applications, the registry and System Policies, changes to the system policies are not recommended, as such changes are likely to result in disruption of service.

3.9 Ongoing Support

Issues that may assist Help Desk staff with day to day operations are described hereinafter. In the preferred embodiment, a 'static' environment is provided, with no changes to the client software once deployed. In addition, only a set, small, number of 'non-standard' machines is allowed, and the definition of 'non-standard' is quite strict.

Modularity

The standard environment of the preferred embodiment is designed to be modular. This ensures that the sections of code that relate to a particular product can easily be replaced when a new version of the product is released, or even if a product is removed, added, or substituted altogether. However, this does not necessarily mean that a section of code can be used standalone. There are still unavoidable interdependencies between modules.

Remote Management

TME ('Tivoli') is the product preferably used to provide remote management for the environment of the preferred embodiment. However, a lot of functionality is possible even without reliance on Tivoli. Also, other software similar in function may be used without departing from the scope and spirit of the invention.

Using Tivoli

Tivoli is used for Remote Control, Hardware and Software inventory, and Software Distribution.

Manually

If Tivoli is not available, remote management may still be done. For example, login scripts can interrogate VERSION-.BAT to see what is installed on the machine (or the drive can be searched directly). VERSION.BAT is a computer script and part of Tivoli application that performs the function of locating, from a broad list of possible software applications, identifying and determining the version number of software installed. Contingency has been allowed for support of applications that may not be functioning properly or to test specific module functions, scripts may be called and executed manually. Help Desk staff with sufficient access rights can simply do a NET USE to a remote machine, and control things that way, either manually or through a batch file.

Modifications of the Build

Modifications to the build can be preferably coordinated through a Standard Operating Environment Group. However, Onsite Support may perform minor modifications to the login scripts (that do not affect the build process) in conjunction with Central LAN Management (CLM), as long as formal change control procedures are followed.

3.10 Technical Reference

Application Reference

This section lists brief descriptions of all the applications that are known to be in use in the organization of the preferred embodiment under the Windows NT standard. Any relevant information about the application, including how the application is configured is included. In addition, non-standard applications are identified.

Lotus Smartsuite 97

Lotus Smartsuite is preferably used for WordProcessing (WordPro), Spreadsheets (Lotus 123), and databases (Approach). All modules are installed, with the exception of ScreenCam and Organiser. Due to the modularity of the NT standard, shipping a new version of a product is not a problem. Existing machines can be preferably upgraded using the Software Distribution tools available in Tivoli, or—as a backup plan—by using Logon scripts.

Lotus Notes 4.6

Lotus Notes is the standard email client of the preferred embodiment. In addition, this product is used to access various bulletin boards with company 'public' information. A dial-up connection can be offered, where users can dial into the Notes server.

DB2

The DB2 client is used to provide a connection using TCPIP to the TRIM database.

Trim 4.1

Trim (currently version 4.1) is preferably used to access an in-house document database. This application can be installed on all machines.

As the configuration of the Trim server has changed over time (new box, new name, new operating system, new protocol), any previously configured Trim workstations may have to be reconfigured for the application to work. However, any machines built naturally have the most up to date Trim configuration automatically loaded as part of the build process.

Norton Anti-Virus

Preferably, Norton Anti-virus is utilised. Alternatively, IBM Anti-Virus can be installed on the client. IBM AV supports automatic upgrades of Signature Files. In practical terms, this means that in order to upgrade the signature files on the client workstations, all that needs to be done is for Central LAN Management (CLM) or onsite Help Desk Staff to load updated signature files on the server as these become available. Once these files are correctly loaded on the server, workstations are automatically upgraded. (This works because IBMAV 'remembers' where the application was installed from and looks for updated files in the same location).

JD Edwards v7.3

JD Edwards (JDE) provides a customised version of GUI-400, which can be used to access an AS/400 computer system in the preferred embodiment.

Tivoli

Each machine (both client and server) has Tivoli installed. The modules used in the preferred embodiment are Remote Control and Software Distribution.

ABC Flowcharter 4 & 7

ABC Flowcharter v4 (which includes ABC SnapGraphics v2), has recently been replaced by ABC/Micrographics Flowcharter v7.0. At least one machine with the older version of the application installed may be kept to assist with any conversion issues.

Xerox Textbridge

The Xerox Textbridge is installed on all of the Laptops in the preferred embodiment.

Kodak Camera

Kodak Digital Camera, which comes with some software, is used in the preferred embodiment by an organization's personnel. This product is not included in any builds, but works adequately as long as the serial port is configured correctly. Alternatively, a flash-RAM PCMCIA card may be used.

Adobe Photoshop v4.0

Adobe Photoshop v4.0 is preferably installed on both CAD and DTP machines.

Microstation

Microstation is preferably installed on CAD machines. Since this application needs an individual licence for each machine and this information needs to be entered in a registration screen, the software cannot be installed automatically. Nevertheless, the installation program is preferably started automatically to ensure that this application is not overlooked.

Primavera

Primavera is a project management package, which needs a "dongle" to work. The dongle may be located on a 'server". Dongle is a term the manufacturer uses to refer to a security device, which is read by the application software to determine the user is properly licensed. The dongle is in the form of a connector that plugs into the parallel port of a computer. The connector has a computer chip or integrated circuit embedded therein that represents the serial number and activation dates that an application, such as Primavera, uses to verify proper licensing. This application is considered non-standard and is preferably only installed in response to special requests.

Suretrak

Suretrak is similar to Primavera (and from the same company) and is preferably installed on all laptops in the preferred embodiment.

Quark Xpress v4.0

Quark Xpress is preferably installed on all DTP machines. The installation of this product is currently manual.

Microsoft Office 97

Microsoft products are considered non-standard applications in the preferred embodiment. However, a handful of MS Office copies are used in the preferred embodiment.

This is considered a 'non-standard' product.

Microsoft Access 97

Microsoft products are considered non-standard applications in the preferred embodiment and only a handful of MS Access copies are used.

This is considered a 'non-standard' product.

Adobe Acrobat Reader 3.0

Adobe Acrobat Reader is available as a module within Lotus Smartsuite. Version 3.0 of Acrobat reader is installed on machines that receive the DTP or LAPTOP builds.

Pagemaker

Pagemaker version 5 and 6 are used in small numbers in the preferred embodiment. None of the Pagemaker versions are included in any of the standards of the preferred embodiment.

Filemaker Pro

Claris Filemaker Pro (version 4) are used. This application is non-standard and not included in any of the builds.

Asset Database

This database is used for asset management and is located at \\NTSHARE01\IBM_GSAS\Assets\Hardware97 in the preferred embodiment.

Tables

The database consists of a number of tables, covering items such as Computer Models, Network Cards, Display Adapters, etc. Sample screenshots of some of these tables are shown in the drawings.

Computer Models

The Computer Models table 1200 shown in FIG. 12 holds all known information about a particular model of hardware, such as drive size, processor, display chip, etc. Other (sub-) tables hold detailed information that is in turn used by the Computer Models table, such as the tables for Display Adapters and Network Cards.

Display Adapters

Information about each display adapter can be found in the Display Adapters table 1300 shown in FIG. 13.

Network Cards

Information about various network cards (Driver Name, Description, Interface, Topology, etc.) is held in table 1400 of FIG. 14.

Software Builds

Information about the various software builds is held in table 1500 of FIG. 15.

Database Enhancements

The asset database is occasionally modified to cater for new requirements. Presently, the database contains all the tables and fields deemed necessary. In addition, the database contains fields, etc. that, although not currently in use, are intended to simplify further expansion.

Client Directory Structure

The directory structure of a client machine varies depending on a number of factors, such as:

Is the machine a laptop or a desktop?

What specific model is the machine? (e.g. the machine may have custom drivers loaded).

What software set is installed on the machine?

Because of the above, a directory listing is not useful. Instead, personnel can familiarise themselves with the various configurations by building and studying sample machines.

Client Security

In the preferred embodiment, the system is locked down to the maximum extent possible from a technical perceptive. Due to inconsistencies in how some of the applications behave under Windows NT (including some 32-bit products that are billed as NT-compatible), a number of security 'holes' have had to be opened up. The specific locations that are accessible vary depending on the software build on the machine and can be expected to change as new releases of these products become available.

The only location that is guaranteed to be writeable by a normal user is the TEMP directory. Security restrictions can be bypassed by making the user a local administrator on that machine. However, this renders the machine 'non-standard'. Also, Help Desk Staff that are not domain administrators may get local administrator access on all client machines by ensuring that the staff are members of the HelpDeskStaff group on the domain.

Server Directory Structure

The I: drive is preferably the location where all distribution software necessary for the build is located, with the exception of Tivoli, which is installed from a network server from which the Tivoli suite of software is installed on the target client desktop PC.

Server Security

The server is protected by standard NT file and shares access rights. Only certain accounts (and groups) have rights to these areas. The rights and accounts are:

Access Rights to Files

In case the security permissions on the server become corrupted, the information in table 1600 of FIG. 16 may be used to restore the settings in the preferred embodiment.

Accounts used by the Build Process

The accounts which are used throughout the build process are:

'BootDisk', which is used when the bootup disk initially connects to the network for validation purposes.

Any account which is a member of the 'PC Installation Team' group. These accounts are used to initiate the main installation.

'NewPC' is the account which is used to create a machine entry in the domain, and then to bring the client machine into the domain.

'Install' is used to install certain applications, e.g. DB2.

'Administrator' (on the local machine) is used while installing applications for which it is inadequate to have Administrator access on the local machine. The latest version of ThinkPad Features, for example, may not install unless the user is actually using the Administrator account.

Thus, the reasons for not using a single account are:
Security, and
Restrictions on how particular applications install.

Passwords for the Install Accounts

Each of the special accounts used during the installation has a password associated with the account. However, there is normally no need to be aware of the passwords for these accounts. Instead, the following should be noted:
The installer only needs to know the password for the person's own account.
The passwords for the domain accounts ('BootDisk', 'NewPC' and 'Install') should not be changed.

However, if any of the special install accounts are ever accidentally changed, the accounts can be reset using information kept in a secured environment (e.g., a safe).

Laptop Differences

The key differences between laptop and desktop configurations are Disk partitioning, the 'local, virtual H: drive', security, System Policies, additional software, and implications for shared usage. Each of these issues is described hereinafter in more detail.

Drive Partitioning

While disk partitioning is relatively straightforward on the desktops, the situation is a bit different for the laptops. On a desktop, the first 2 GB of storage capacity is the primary C: partition, and anything that is left over simply is D: in the preferred embodiment. On a laptop, this arrangement may be insufficient, since some space must be set aside for the 'virtual H:' and 'virtual S:' drives. As these virtual drives are mapped to locations on the D: drive, laptops should have a sufficiently large D: partition created. The actual size of the D: partition varies depending on the available space on the hard disk, but it is recommended to aim for at least a 500 MB partition. However, this may not always be possible given that the C: partition needs to be about 1 GB to allow sufficient space for the operating system (together with applications and swap file space).

'Virtual' (Local) H: and S: Drives

During the build process, key contents of the S: drive get copied to 'D:\S-drive', ensuring that Smartsuite templates, etc. are available even if the user is not connected to the network. When a laptop boots up, the S: drive is mapped to this location. In addition, the H: drive is mapped to D:\USERS\<username>, where <username> is the name of the currently logged on user, and, if necessary, the relevant directory structure is dynamically created. A full reboot is necessary for this to work; a relogin is not sufficient.

Security

Anybody who is a laptop user may have admin rights on a laptop and is not subject to the System Policy. These users are made members of the LAPTOPGROUP group in the domain of the preferred embodiment.

Policies

Laptop users do not currently use a system policy, as this may be overly restrictive. Thus, laptop users are not members of the POLTRAIN group.

Additional Applications

A number of additional applications are installed on the laptops in the preferred embodiment. This is done through the use of the application set known as LAPTOP. This includes not only all the familiar applications from the 'BASE' build, but also the following three applications:

Xerox Textbridge
This software is an OCR (Optical Character Recognition) package.

Adobe Acrobat Reader 3
This is the version of the software used in the preferred embodiment.

Suretrak
Suretrak is a project management package from the makers of Primavera.

Additional System Software
In addition to these applications, various system files are also copied to the local drive.

I386 directory
The I386 directory is copied to C:\I386 in case the directory is needed while the user is away from the network, perhaps to install a non-standard printer driver.

Service Pack
Similarly, the service pack files get copied to the local drive during the build of the machine.

Limitations on Shared Usage

Although laptops are not ordinarily shared among users in the preferred embodiment, situations may arise that make this functionality desirable. Therefore, the build allocates 'virtual H:' drives on the fly, and this process is transparent to users. However, Lotus Notes must be configured for each user that uses the laptop. Similarly, users have to manually synchronise their data with the server, should the users so desire.

Build Version Numbers

Throughout development of the preferred embodiment, any modifications to the build have been documented. Build numbers are written to each machine that was built. The build number of any machine can be checked from the Start Menu by selecting HelpDesk Information. This same information can also be accessed remotely, either manually or through a login script. The data gets written to both the 'HKLM\Software\Organization\Configuration' branch of the registry and to C:\VERSION.BAT, and can be retrieved from whichever location is most convenient.

4. Workstation User Information

A standard configuration has been developed that incorporates the use of new tools and applications.

4.1 Why Standardise

The use of PCs and the software products available are becoming increasingly complex. To provide a consistently high level of support to such complexities, it is necessary to introduce certain standards. These standards form a solid foundation upon which to build the Desktop environment required to support the business needs of users. This also better enables providing the necessary support for users, and to generate reports on such things as software usage, support call information, user connection information etc.

The standard configuration enables providing an increased level of service in several ways. Some of these features are detailed below.

Remote Control

Tivoli is installed on each workstation. This places the PC in a state that allows its operation to be handed over to a Service Centre. This can remove the necessity for a support person to visit a workstation to resolve a problem. The Service Centre can simply obtain access to a PC and solve the problem remotely.

Reduced Problems

When using a standard configuration, the types of problems experienced by the users are reduced. The standard configuration also provides the ability to conduct trend analysis and act upon certain problems that are reported to avoid the problems happening elsewhere.

Problem Resolution Procedures

In a standardised environment, steps can be documented that need to be followed to resolve certain problems that occur more than once. This can greatly reduce the amount of time taken to solve such problems as there is no need to perform any diagnostics.

Login Procedure

Windows NT requires you to log on by holding down the CTRL+ALT+DELETE keys simultaneously. A user ID and password is then requested for validation and to successfully connect to a file server. For OS/2 users that are migrating to NT, their OS/2 user ID and password need to be exactly the same as their new NT user ID and password.

The Windows NT Installation

Windows NT is installed from a "server-based-setup". Windows NT comes with many built-in utilities and applications. Not all of these are installed during the standard installation routine.

Applications

The applications that are available from the network are controlled by the system of policies. This means that for each application, a group is set up on the server, and only members of that group have rights to use the application. A user ID is joined to the relevant group depending upon the software that the person is licensed for. When joined to an application group, the appropriate icon is displayed in the Windows NT Applications Group. For example, if a user needs to run MS Project on a workstation and has a current licence, the user ID is made a member of the "MS Project Application Group". The relevant Icon is delivered to the user's desktop in the Windows NT Applications Group. The contents of the Windows NT Applications Group are managed centrally.

If using a Notebook PC, based and supported software are installed onto the local hard drive. However, it is important to understand which applications are running from the server and which are running on your local hard drive before disconnecting the laptop from the Network to run in "stand alone" mode. If a user needs to run an application in stand-alone mode that is currently running from the server, the user may need to place a call to a Service Centre to have the application installed onto a local hard drive.

Standard Applications

Standard Applications are setup to run from the harddrive of a PC. Standard applications are applications that have been setup on every PC and thus are available to everybody. Some standard applications are listed below for the preferred embodiment:

Lotus SmartSuite

Lotus Notes

IBM Anti Virus

Personal Applications

Personally installed applications are setup to run from (network/PC). The applications are available through the Start toolbar under programs.

Network Printing

When in the office most printing is conducted through Network Printers. To set up a workstation to print to a particular network printer, all a user needs to know is the printers Barcode Number and the User ID on the File Server the printer is connected to. The steps below are followed:
1. Press the start button on the toolbar
2. Go to the option "Settings" and choose "Printers"
3. Select 'Add Printer' and choose 'Network printer server'
4. Choose a printer and it should be successfully installed Anti Virus As always, it is vitally important that all PC users be aware of the damage Viruses are capable of causing. Anti Virus software run on your PC Daily, (normally at least the first time a PC is rebooted or turned on during the day) and scan the contents of a local hard drive. A shield against viruses also runs in the memory of a PC. AntiVirus software checks all files that are accessed from floppies automatically. However, it is the responsibility of each user to ensure that floppy disks are regularly scanned especially the scanning of diskettes that are going out to clients. To scan a diskette, these steps are followed preferably:
1. Press the Start button on the toolbar.
2. Select programs.
3. Choose Anti Virus software.
4. If a user clicks on the "Push Here" button of the software, a local hard drive is scanned. Click on the "Check" menu option and choose, "Check diskettes" to scan a floppy disk.
1. To scan a floppy diskette select "All Files" and compressed files. Then click on the "Check Now".
2. If a virus is found, the service centre should be contacted. Do not use the PC or any diskettes that have been used in the PC until informed it is safe to do so.
3. If no viruses were found, click the "OK" button.
4. If scanning a diskette, the user is asked if another scan is to be performed. If you do not, choose "NO".
5. When finished scanning for viruses, choose the "Check" menu option and select "Exit".

Change in the Drive Letters Used

What is a Network Drive?

A Network Drive is a directory on the Hard Disk of the file server that is represented by a drive letter. It is unimportant what letter is used. Two well known Network Drives for storing the user's files in the preferred embodiment are "HOME" directory and "Group" directory. The drive letters to be used within the standard configuration are:

| | |
|---|---|
| GROUP | G: Group Name |
| HOME | H:\ |
| APPS | I:\(All network applications will be stored using this drive letter). |
| MAIL | M: (Electronic Mail Messages are stored using this drive letter - only applicable to E-mail). |

On G:\drive, directories represent that groups that a user is able to share data with. Each person sees and has access to a directory under their G:\drive, which is used for ALL members of the same organization to share to transfer data.

This directory indicates the organization name. For example, if a member of both the "SALES" and "ADMIN" groups and an employee of the organization, a user would be displayed with following directories in the user's G:\drive.

G:\SALES (Only members of the "SALES" group on the server see this)
\ADMIN (Only members of the "ADMIN" group on the server see this)
\ORG (All employees of the organization see this)

If an additional "Data Group" is required to be setup, the service centre should be contacted with details on what the group should be named and a list of user ID's a user would like to have joined as members of that group.

Other Drive Letters that are visible when using Explorer are not important as they are "Search Drives". Search drives are necessary for all applications to run smoothly and are therefore not used to store data.

Changing of Passwords

To effect a password change in the Windows NT Standard Environment, this procedure can be followed:
1. Press CTRL+ALT+DELETE
2. Click on Change Password
3. Type in the old password, the new one and the new password once more as a verification.

Shutting Down a Computer

To prevent the loss of unsaved data or damage to programs, the shutdown procedure should be used before turning off a computer.

To shutdown a computer:
1. Save any data
2. Close all open applications
3. Click on the start button
4. Click on "Shut down" then click on "Yes" to confirm the request or
1. Press CTRL+ALT+DELETE to display the Desktop menu
2. Click on Shut Down Who to Call to Get Help The Service Centre is preferably the single point of contact for any further information a user may require, or to report any problems relating to the organization's Standard for workstations.

5. Initial Network Design 5.1 Overview

A brief overview of the initial Windows NT LAN is provided hereinafter.

Objectives

The main objective of the initial design is to provide a stable NT LAN design for an organization in the preferred embodiment. A standard Workstation Environment is designed for desktops, ThinkPads, CAD and DTP workstations incorporating all the software required by the organization. Microsoft Windows NT Server is chosen as the Server and Microsoft Windows NT Workstation is chosen as the desktop for this purpose. To ensure high availability of servers, redundancy is incorporated into the design along with a Backup/Recovery process.

In summary Backup/Recovery design is accomplished under the following guidelines:
1. High speed, high density tape Digital Linear Tape (DLT) drives are used for backups requiring more than 30 gigabytes (gb) of backup storage. 35/70 gb DLT drives are preferred.
2. For servers with storage exceeding 60 gb, DLTs are connected to a local server, dedicated, high speed SCSI port. Each DLT has a maximum transfer speed. No more DLTs may be connected to this port than the total bandwidth supplied by the SCSI port. This type of server backup is considered as "High Rate" backup/restore.
3. For servers with storage less than 60 gb, it is recommended that a server(s) be provided to be the network backup/restore target of these smaller storage server(s). This type of server backup is considered as "Low Rate".
4. Multiple Low Rate backup servers can be implemented when the backup demand exceeds the full duplex, network connection and the elapsed backup time is outside the maintenance window. Multiple servers also provide redundancy in the event of a particular 'Low Rate' server fails.
5. 'Low Rate' servers are configured similar to a 'High Rate' server, i.e.: high speed, dedicated SCSI ports connected to one or more DLTs.
6. The Backup application should support network as well as, local backup capability and have a catalogue of files, backed up within a set, easily accessible for lookup. Additionally, the product should be able to mark files with a date of their last backup. Arcserve was chosen for this task.
7. All user data that has been created or modified since the last backup, is backed up daily. This is known as an incremental backup.
8. Weekly, a full backup of all user data is performed.
9. Incremental backups are kept on-site for a minimum of 2 weeks before being recycled back into a tape pool.
10. Three weeks of full backups are kept on-site for a minimum of 4 weeks with week 4 being sent off-site for fire storage. This fire-storage data is kept for a minimum of 7 years or as long as legal requirements dictate.
11. A restoration server can be provided to perform periodic restorations as a quality check of the process and technology.

Background

Table 4 describes briefly the software to be implemented on the Server and Workstation used by the organization. The software provided is tested on the desktop environment design. Where applicable, alternative software is described.

TABLE 4

| System | Sub System/Description | Program |
| --- | --- | --- |
| Desktop Publishing | PageMaker/Quark Express/Photoshop Illustrator | Creative |
| Lotus Domino/Fax | Ambush Marketing | Legal |
| Peoplesoft | Personnel Management | Human Resources |
| JDE | Financials | Finance |
| Lotus Approach | Database | Technology |

TABLE 4-continued

| System | Sub System/Description | Program |
|---|---|---|
| Media Guide | Media Guide for Windows | Media/Cultural |
| Message Mate | Interface Phone Message to Email | Human Resources |
| Microstation | CAD Drawing | Venue Management |
| NEIS | Government Purchase Order Info | Finance |
| Notes | Applications | Technology |
| Notes | Database | Various |
| Spectrum Pay | Payroll | Human Resource |
| Record Management | TRIM | Research & Information |
| Primavera | Project Management | Technology |
| Provider (Alternatively, Hyperion Pillar budgeting application) | Budget Planning | Finance |
| Lotus Smart Suite | Office Applications | Administration |

Two software packages, "JDE Financial Management" and "Provider", are Mainframe/Midrange based applications. JDE Financial Management requires 5250 Emulation package that needs to be implemented for NT while "Provider" is an OS/2 based product. For Windows NT, Hyperion Pillar budgeting application may be used instead. While specific software applications are listed in Table 4, it will be readily appreciated in view of this disclosure that changes can be made to the kinds of applications, number of applications and particular applications without departing from the scope and spirit of the invention.

5.2 Project Design

This section describes the design of the NT LAN environment and discusses Hardware and Software implementation.

LAN Design

The design of the preferred embodiment is based on the Microsoft Windows NT™ Network Operating System. The design takes into consideration the temporary coexistence of OS/2 and NT LANS. The protocol used by NT server initially is TCP/IP and Netbeui. This is required for communication between OS/2 and NT servers for sharing files and printers. The design is based on the Domain Architecture for NT, as specified by Microsoft, for a maximum of 26,000 users. Following sections provide an overview of the architecture and the design.

Domain Design

Figure 20:
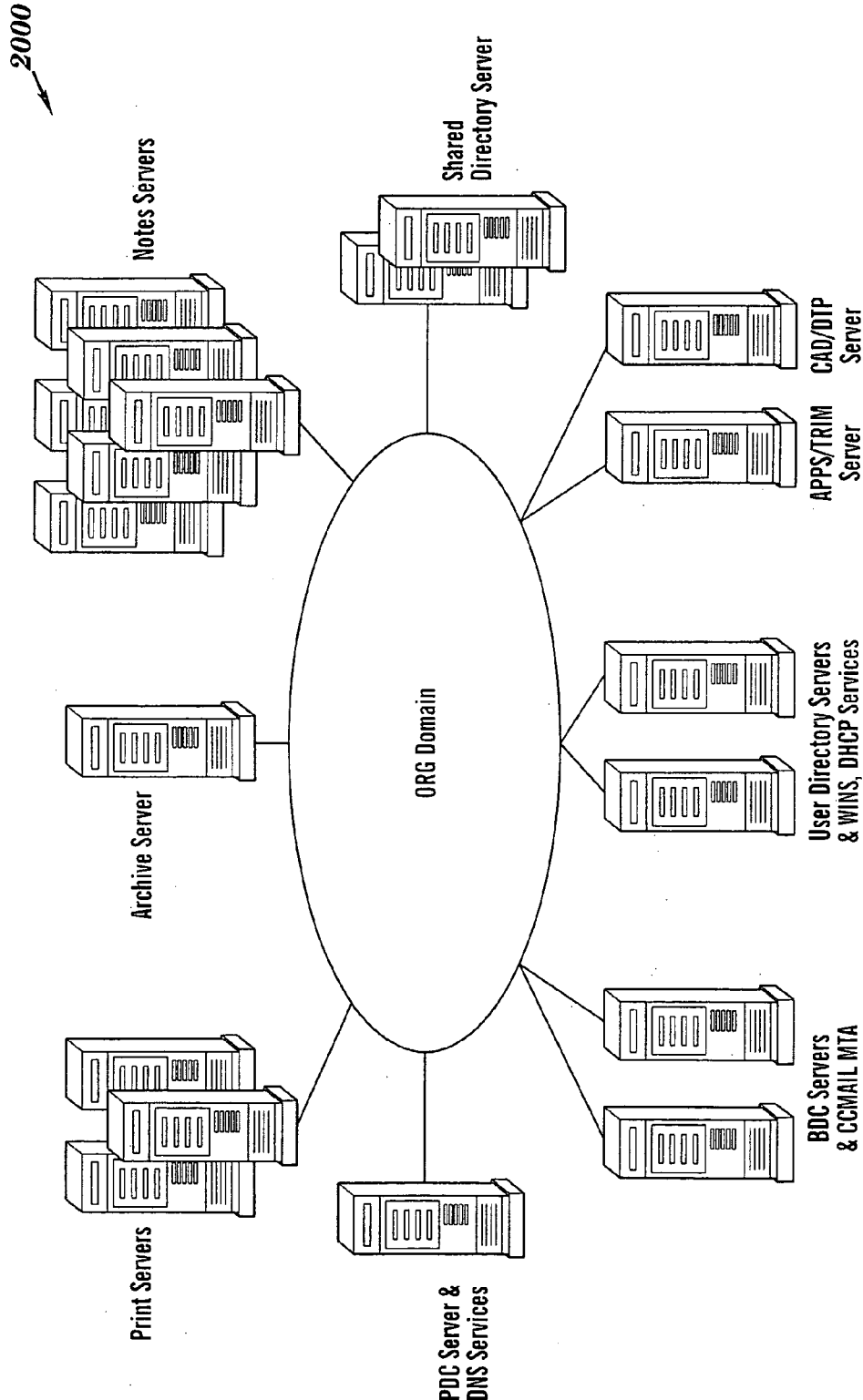
FIG. 20 is a block diagram 2000 of the servers and the network domain 2000 of the initial design.

FIG. 20 illustrates the LAN design 2000 for the organization in the preferred embodiment, which provides the complete Domain Architecture.

Naming Standards for Servers, Workstations, Printers and Shares

The naming standards for Servers, Printers and Shares. The organization preferably uses a standard convention for naming users.

NT Domain name is organization or ORG.

Table 5 illustrates the naming convention for Servers along with its role in the domain.

TABLE 5

| Server Name | Role in the Domain |
|---|---|
| NTPDC | Primary Domain Controller |
| NTBDC01 | First Backup Domain Controller |
| NTBDC02 | Second Backup Domain Controller |
| NTUSER01 | First User Directory Server. Users name A–K |
| NTUSER02 | Second User Directory Server. Users name L–Z |
| NTSHARE01 | First Shared Directory Server |
| NTSHARE02 | Second Shared Directory Server |
| NTPRINT01 | First Print Server |
| NTPRINT02 | Second Print Server |
| NTPRINT03 | Third Print Server |
| NTAPPS01 | Application Server and TRIM Database |
| NTCAD01 | DTP & CAD Server |
| NTARCHIVE01 | Archive Server |

The "NT" prefix on all servers are added to distinguish NT servers. "01" numbering is added to all servers allowing for future growth. Server Names are based on the server's primary usage. The first two characters denote the operating system while the next set of characters (to a maximum of 8 characters) represents the function the server performs on the domain. The last two digits denote the units, if more than one server is used for the same function.

The description field specifies the server make, model and memory details along with Asset tag no.

ooffffffffnn, where
  oo represent the Operating System,
  ffffffff represent their primary function (maximum of 8 characters), and
  nn represents the unit number.

For example, a second print server running NT can be named:
  NTPRINT02

For example, the description field can be "IBM PC 330 with 128 MB RAM Asset Tag:23498"

Shared Printers are named based on their types and asset tag Barcode. The first 6 characters denote the printer and model name, which is then followed by an underscore and asset tag number:

mkmd_xxxx, where
  mk is the make of the printer,
  md is the model of the printer (maximum of 4 characters), and
  xxxx s the barcode number of the printer.

The description field of the printer preferably contains the location of the printer, which may denote the floor level and position, where for example several floors exist in an organization's building. Variations to this can be made without departing from the scope and spirit of the invention, for example where there may be several buildings at different sites. To identify the position of the printer, floor plan can be used as reference. Each floor plan is equally divided and marked from "a" to "n". The poles on the floors are labelled from "1" to "10".

For example:

First HP Laserjet Printer 4P on Level 3 located closer to one side of a building with a barcode of 4356 is named as follows:

HP4P_4356

The description specifies: "Located at Floor 3A10".

Fourth Lexmark Optra N Printer on Level 12 located closer to another side of the building with an Asset Tag No. 5498 is named as follows:

LXOPN_5498

The description field specifies: "Located at Floor 12 M2".

Second Lexmark Optra Colour Printer on Level 6 located closer to first side of building with an Asset Tag No. 7635 is named:

LXOPC_7635

The description field specifies: "Located at Floor 6 A3".
The Shared name and the printer name are configured as identical to avoid any confusion.

A shortcut can be provided on a user's desktop representing the printers the user can connect to, when the user logs on. Shortcuts bear the right description, name and model of the printer. The printer naming conventions are only used for roaming users, who need to know the nearest location of the printer.

Share Names are named based on the type of resource or applications that is shared. All the user home directories are shared based on their username. This is essential since the % username % environment variable is used in mapping home drives.

Group Directory also follows the same naming convention as the groups in order to use the environment variable.

Application Directory has distinctive share names as given in Table 6.

TABLE 6

| Directory Name | Description |
| --- | --- |
| DOSAPPS | DOS applications are stored in this share |
| WIN16APPS | 16 bit Windows Applications |
| WIN32APPS | 32 bit Windows Applications for Windows '95, NT |
| OS2APPS | OS/2 Applications are stored here |
| ADMINAPPS | Administrative applications like installation disks, Workstation images, etc. are stored here |
| CADAPPS | CAD applications are stored here |
| DTPAPPS | Desktop applications are stored here |
| AAPPS | Database applications like Accounting/payroll applications are stored here |
| COMMSAPPS | Communication software and other related applications are stored here |
| ARCHDATA | Storage for archived data, typically in the Archive server |

Workstations are named based on their model number, generic usage, and their location and port number. Given below is the generic naming standard:

mmmmmaaa_xxnnnn, where mmmmm stands for model number with a maximum of 5 characters, aaa stands for generic use of the workstation, xx stands for the floor where it is located, and nnnn stands for the port being used by the workstation.

The description field contains an asset tag number, brief description of the make and model number and the location of the PC. For example:

A standard desktop IBM PC330 workstation located on Floor 3 and connected to port A10 is denoted:

P330STD_03A010

The description specifies "IBM PC 330 located on Floor 3 A05. Barcode:4530".

(A05 may be the pole location as per floor plan).

The following are generic desktop standards:

STD Standard Desktop used for file and print sharing,
OS2 OS2 desktop used for Provider Applications or other applications,
DTP Workstation used primarily for Desktop publishing,
CAD Workstation used primarily for CAD applications,
DEV Workstation used by development environment, and
TST Workstation used for testing purpose; may include Pilot roll out as well.

ThinkPads/Notebooks are based on their model number, user name and asset tag barcode. Given below is the generic naming standard:

mmmmmuuu_nnnn, where mmmmm stands for model number, with a maximum of 5 characters, uuu stands for user initials, and nnnn stands for asset tag number.

The description field can contain the full user name and any additional hardware other than the standard—like extra memory, hard drive, etc. For example:

A ThinkPad model 760CD belonging to James Walker with an asset tag number 7830 will be named as follows:

T760DJWL_7830

The description specifies "James Walker' ThinkPad with CD ROM and additional 32 MB RAM.

Domain Architecture

A group of servers networked together to facilitate administration, maintaining a user database and maintaining an access control list is known as a Domain. The logon response to a domain model mainly depends upon the size of this database—known as Security Access Manager (SAM). A single domain model can accommodate at least 26,000 users. To provide optimum response times to logon requests, Microsoft recommends that the SAM should never be over 40 MB in size.

For the organization of the preferred embodiment, the total number of seats is approximately 1,600. However, the computers are shared in the ratio of approximately 2 computers per 3 users. Thus, the number of users is roughly 2,300. Table 7 provides an approximate calculation for the size of the SAM database.

TABLE 7

| Description | Units | Size/Units in KB | Total Size in KB |
|---|---|---|---|
| Users | 2300 | 1 | 2,300 |
| Workstations | 1600 | 0.5 | 800 |
| Servers | 20 | 0.5 | 10 |
| Printers | 250 | 0.5 | 125 |
| Custom Groups | 230 | 4 | 920 |
| Built in Groups | 12 | 4 | 48 |
| Total Size in KB | | | 4,203 |

Approximate estimated size of the SAM is 4.2 MB. Note:
1. An estimated 250 printers is assumed,
2. Approximately 20 Servers are taken for calculations,
3. An average of one custom group* per 10 users is assumed.

* Custom groups are groups that can be defined by an organization. The preferred embodiment has about 40 custom groups for about 530 users. The calculation of 230 custom groups is based on the worst case when all the 2,300 users are defined in custom groups, similar to the present definition.

Since the size of the SAM is well below the Microsoft recommendations, a single Domain architecture can be practiced in the preferred embodiment.

Domain Controllers

Every domain has a domain controller known as Primary Domain Controller (PDC) where the SAM is stored. This consists of a user database, a group database and user validation information. All the servers and workstations are part of this domain. Any workstation logging into the Domain needing access to the resources should be validated. These validation requests are processed by the PDC. During morning, when all the users log on to the network about the same time, the validation requests from all of the workstations might overload the PDC. To reduce this overload, Backup Domain Controllers (BDC) may be added to the Domain design. The BDC provide logon validation to the workstations. Any validation requests in the domain are always processed by the BDC first, if available. This relieves the PDC for other tasks like synchronising the SAM database with the BDC. The PDC and the BDC share the load of validation requests from the workstations, at the same time providing a backup for the SAM. One of the major advantages of the BDC is, in case of a PDC failure, any one of the BDCs can be promoted to the PDC thus providing redundancy to the LAN design and reducing the downtime. A domain can have multiple backup domain controllers (BDC).

In a typical Domain architecture, the main function of the PDC is to add and update the user accounts and properly replicate the database and changes to the BDC. When a workstation issues logon requests, the BDC responds to validate the user name and password and provides a validation token. The ratio of workstations to a BDC is a way to maintain responsiveness during logging on. One BDC can support up to 2,000 user accounts. Thus, having more than one BDC reduces the load on a single BDC. Microsoft recommendations for BDC are given in Table 8.

TABLE 8

| No. of Workstations | No. of BDC Servers |
|---|---|
| 10 | 1 |
| 100 | 1 |
| 500 | 1 |
| 1,000 | 1 |
| 2,000 | 1 |
| 5,000 | 2 |
| 10,000 | 5 |
| 20,000 | 10 |

In the preferred embodiment, 2 BDCs are recommended to share the Logon load.

Windows Internet Naming Services (WINS)

In order to maintain a list of computers and their IP addresses in the Domain, Windows NT uses a service called WINS. WINS is used under TCP/IP environment to reduce broadcast traffic across the network. WINS maintains a database, which maps a computer name to an IP address.

b-node: When a workstation queries for a computer or a resource, the workstation sends a broadcast on the network requesting the resource IP address for communication. A workstation configured to broadcast for queries is defined as b-node. This increases the traffic on the network, for every query. Also since the routers do not broadcast past the local subnet, if the resource is located past the router, then the workstation fails to identify the resource.

p-node: A workstation has a list of computer resources and their address in the workstation's local table. (LMHOSTS file). The workstation queries the local table and obtains IP address for the resources. Such an address resolution is denoted as p-node. While this method reduces the broadcast traffic on the network, if the resource address is changed, then the table needs periodic updating. This adds overhead to maintenance. Also when a resource is deleted or added, the table on all the workstations must be updated to reflect these changes.

m-node: To overcome the problem of b-node and p-node, Windows NT uses m-nodes. The workstation first checks at the local table. If the IP address for the resource is located at the table, then the IP address in the table is used. However, if not found, then the system resorts to broadcasting to obtain the IP address. The only difficulty with this setup is, if the local table is not updated, then the system does not broadcast for the new address and hence fails to identify the right resource address.

h-node: This is a variation of m-node. The workstation first broadcasts to obtain an IP address of the resource. If the IP address is not obtained, then the workstation looks into its local table to obtain the IP address. The only difficulty is that for every resource query, there is a broadcast request sent on the network.

The preferred embodiment uses h-node and a WINS server, which caches all the computer resource names and provides the IP address resolution. This reduces the broadcast traffic across the network. Further, the DHCP server can be configured to provide the WINS address to the workstation when the workstation leases the address.

To provide redundancy to the WINS service and also to provide load sharing among the WINS servers, two WINS servers are used preferably. These servers are configured as both pull & push servers (pull server is a WINS server which requests an IP address database from its partner, while a push server is one which sends its database to its partner) between them. Depending upon the LAN usage, a proper replication parameter could be achieved for optimum performance. As the organization's LAN is more static, with all the resources like printers, member servers, etc., configured with Static Address, the change in the WINS database is minimal. Replication of the database hence is low and does not significantly impact the network performance.

As there are two user directory servers, both the WINS services are shared with user directory servers. There is no necessity for a separate server requirement for WINS since the combined usage of User directory server and WINS services are minimal.

DHCP Servers

Dynamic Host Control Protocol is the protocol used in TCP/IP environment to allocate and configure IP addresses dynamically. The Servers running DHCP services leases IP address to clients for a period of time. This significantly reduces administration overhead on maintaining IP addresses to the clients. When IP address are leased, few of the network parameters like WINS server address, DNS server address, Gateway Server Address and broadcast node type can also be configured.

To reduce the workload on a single server, two DHCP Servers are recommended in the preferred embodiment. These servers are configured in such a way that the IP addresses are shared evenly between the two servers. When a workstation requests for an IP address, either of these two servers leases the address, depending upon their availability. This reduces the workload on a single server. However, each of the servers is configured for two sets of IP address, with one activated while the other is inactivated. This Setup provides redundancy to the network. The second set of IP address can be activated if either of the DHCP server fails.

Just like WINS, DHCP services do not need separate servers. User directory servers can be configured for DHCP services. As the User directory servers are dual Pentium systems with 0.5 GB of memory, the server is able to handle the combined load of DHCP, WINS and user directory requests without any problem. The workloads are shared evenly by these two servers.

DHCP services must be properly configured for leasing IP address. The leasing configuration of both the DHCP servers along with the naming convention for lease scope are described hereinafter.

Figure 21:
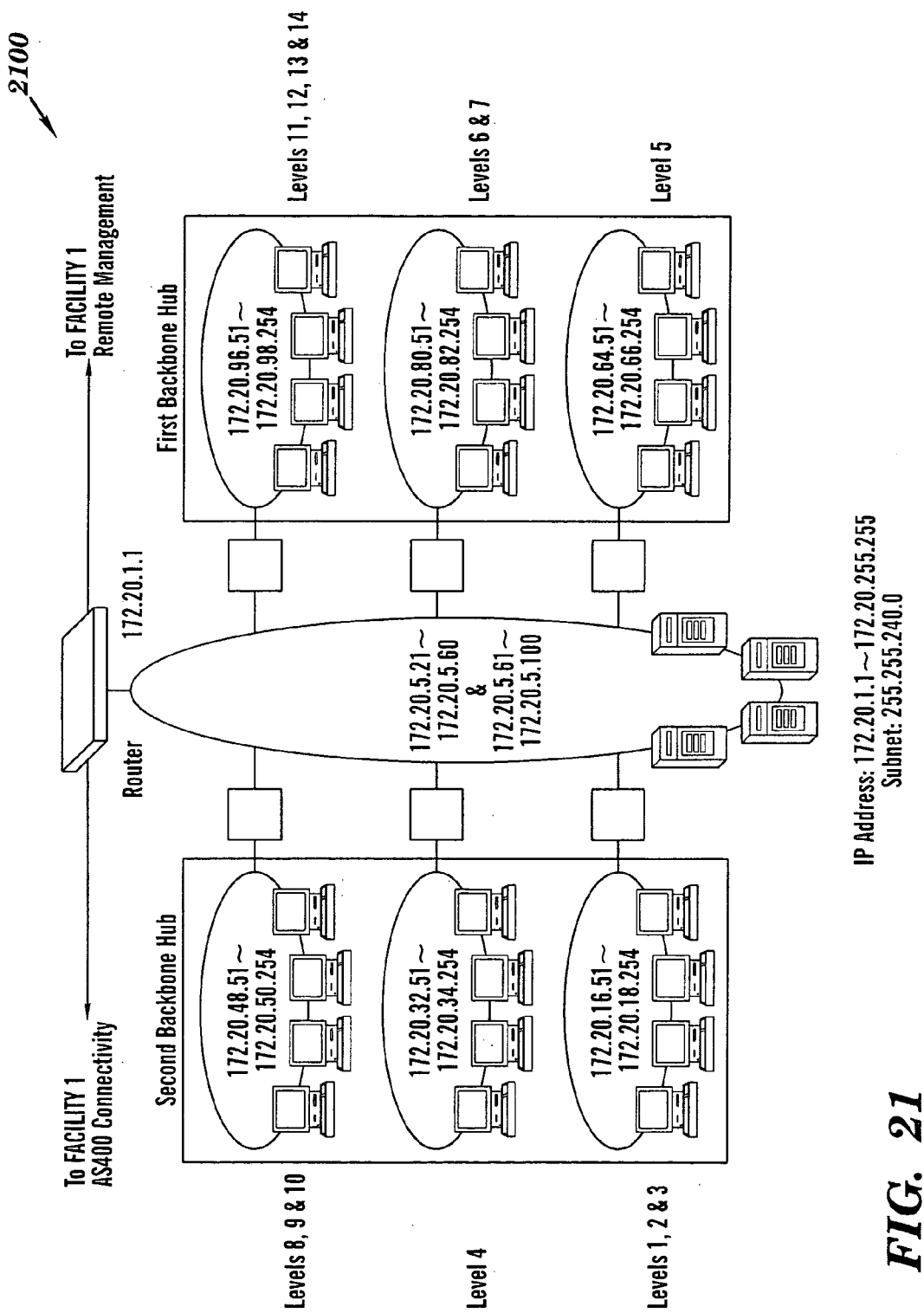
FIG. 21 is a block diagram illustrating the IP addressing structure of the initial design.
Figure 24:
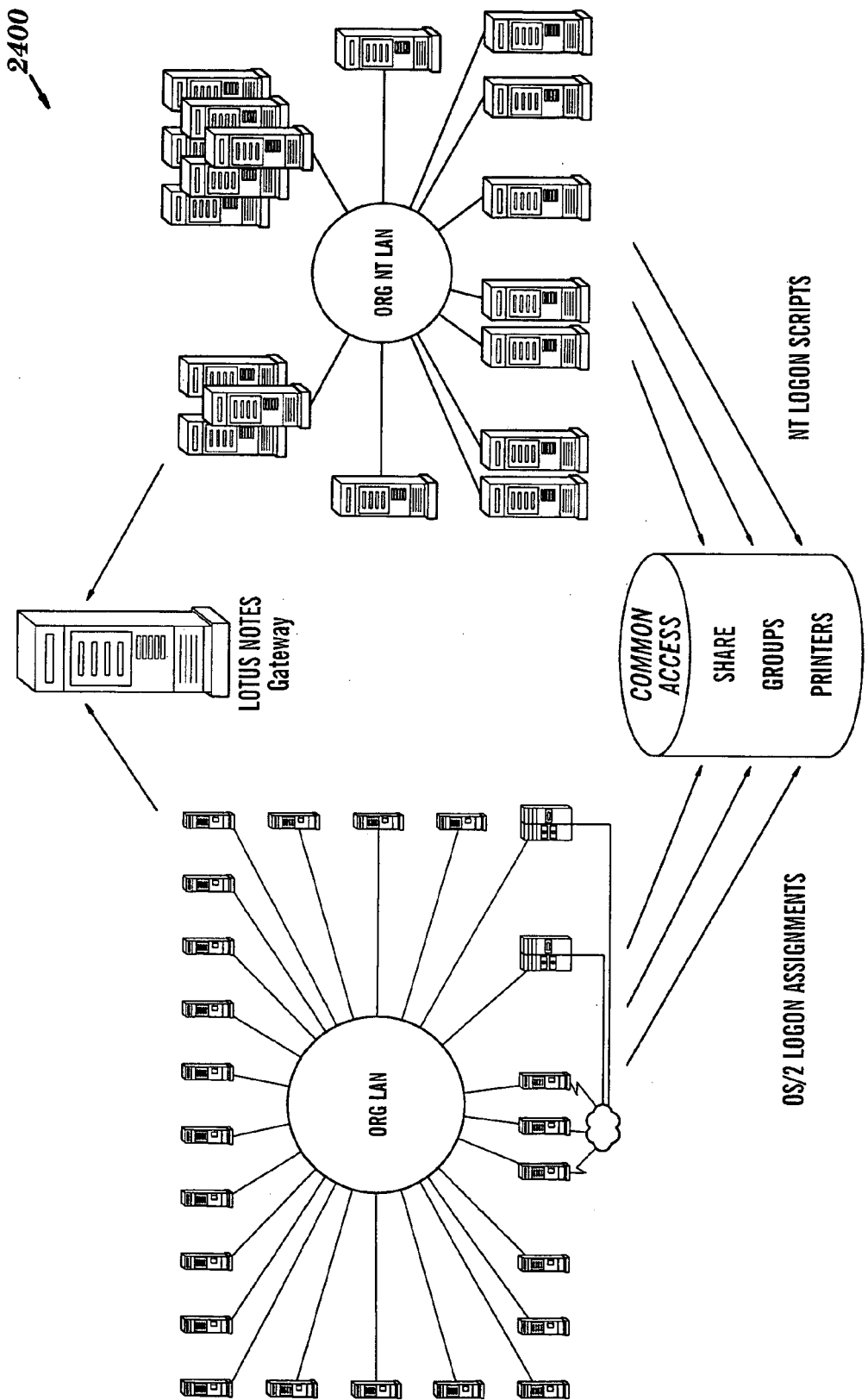
FIG. 24 is a block diagram of the two domains with an interconnecting gateway and shared assets.

The IP addressing structure 2100 is shown in FIG. 21.

The DHCP's Active Scopes are given in Table 9:

TABLE 9

| Floor Levels | IP Ranges |
| --- | --- |
| Levels 1, 2 & 3 | 172.20.16.51-172.20.18.254 |
| Level 4 | 172.20.32.51-172.20.34.254 |
| Level 5 | 172.20.64.51-172.20.66.254 |
| Level 6 & 7 | 172.20.80.51-172.20.82.254 |
| Levels 8, 9 & 10 | 172.20.48.51-172.20.50.254 |
| Levels 11, 12, 13 & 14 | 172.20.96.51-172.20.98.254 |

The DHCP's Inactive Scopes are given in Table 10:

TABLE 10

| Floor Levels | IP Ranges |
| --- | --- |
| Levels 1,2 & 3 | 172.20.144.51–172.20.146.254 |
| Level 4 | 172.20.160.51–172.20.162.254 |
| Level 5 | 172.20.192.51–172.20.194.254 |
| Level 6 & 7 | 172.20.208.51–172.20.210.254 |

TABLE 10-continued

| Floor Levels | IP Ranges |
| --- | --- |
| Levels 8, 9 & 10 | 172.20.176.51–172.20.178.254 |
| Levels 11, 12, 13 & 14 | 172.20.224.51–172.20.226.254z |

The configuration 2200 for the DHCP Server-1 is given in FIG. 22.

The configuration for DHCP Server-2 is given in FIG. 23.

The DHCP settings of the preferred embodiment can be summarised as follows:

Lease names are denoted by the floors for which an IP is being leased. If more than one floor shares the IP pool, then the highest floor is used for naming. For example, Floors 1, 2 & 3 are shared by a common IP pool. The lease name provided is Floor3_1a.

Each pool has 6 lease scopes. 3 of these scopes are active while the other three are inactive. "1", "2" & "3" after "Floor_" indicates the lease scopes.

The scopes are further classified as "a", "b", "c" and "d". "a" and "b" are active scopes while "c" and "d" are inactive scopes.

Both the DHCP servers evenly share the IP scopes. However there is no guarantee that these DHCP servers evenly share the loads. IP leasing is provided by either of the server, depending upon their availability.

When one of the server fails, the other server may run out of address scope. To avoid re-configuring the server, the scopes are pre-defined but made inactive. In the event of failure of any of the server, the other servers' inactive address scope can be manually activated. This can be done on-line without any downtime.

DNS (Domain Naming Services) Server

The WINS server's database consist of NETBIOS name of the Servers and resources. Similarly, the DNS server stores Server Domain names. Any IP networked computer can query the DNS server to resolve the Domain names with that of IP address. As the LAN environment of the preferred embodiment does not utilize the Internet, the need for a DNS Server is not present. However, if the need arises, the PDC server can be configured for DNS services. (The only requirement for DNS services is for Notes SMTP connections. This can be hard coded through Hosts file, rather than using DNS services and adding workload to the server at this stage).

Member Servers

Apart from the PDC, the BDC, WINS and DHCP servers, there are additional servers that participate in the domain. These servers are called member servers. These servers are used for special applications like database servers, file and print servers, Gateway Servers, etc. As these servers are heavily used on the network, the servers do not validate any LOGON requests from the workstations. With respect to the OS/2 architecture, following servers can be used and still cater for future growth:

Servers to store user directories: 2 (Total Users envisaged: 2300)

Print Servers: 3 (Total Printers by year 2000: 250)

Servers to store Applications & TRIM: 1

Server to store Shared Directories: 2

Server to store CAD & DTP: 1

Server to Store Archive data: 1

Thus, the total servers as member servers are 9. Of these 9 servers, 7 are provided as part of the NT design while 2 of the servers can be deployed from the existing OS/2 environments after migration of users to NT. The servers serving User Directories are also configured to provide WINS and DHCP services.

Notes Servers

Notes Servers also are configured as Member servers. The total number of Notes Servers of the preferred embodiment are as follows:

Lotus Notes servers—IBM704 model—2,
Lotus Notes/Mail SMTP gateway—IBM 330 model—1,
Lotus Notes Mail servers—IBM 704 model—3.

Thus the total of Servers recommended for Lotus Notes is preferably 6. Of these 6 servers, four are provided as part of the NT design while 2 of the servers can be deployed from the OS/2 environments after migration of users to NT. The Notes servers replicate mission critical applications to avoid downtime in the event of failures.

Summary of Domain Architecture

Table 11 consolidates the need for the servers in the Domain Architecture and their typical role in the Domain.

TABLE 11

| Server Role | Description | Quantity |
| --- | --- | --- |
| PDC | Primary Domain Controller. Can be configured for DNS services when the need arises. | 1 |
| BDC | Backup Domain Controller. Can also run few of low overhead services like CCMAIL MTA, etc. | 2 |
| User Directories | Servers to store User Directories. (2 of the server also runs WINS and DHCP services). | 2 |
| Shared Directory | Server to store shared directory. Heavily used. | 2 |
| Application Server | Server to run Applications and TRIM database. | 1 |
| CAD/DTP Server | Server to run CAD and DTP applications. | 1 |
| Print Servers | Servers to service print queues. Heavily used. | 3 |
| Archive Server | This server stores all the archived data. | 1 |
| Notes/Mail Servers | Notes, Mail, SMTP Gateway, etc. | 6 |
| | Total Servers Needed | 19 |

In the preferred embodiment, 14 servers are provided as part of the initial NT design while 5 of the servers can be deployed from the existing OS/2 environments.

Hard Disk Requirements

Storage requirements for users and applications are described hereinafter. Hard disk calculations and the Server configurations are generally based on this requirement. The configurations are based on total requirement envisaged of the preferred embodiment.

User Storage

User storage is the storage requirement for each user's home directory. Home directories are accessed only by the user and the security is organised so that no one other than the user and the administrator have any control over this directory. User files have generally been stored on the shared directory rather than a user's Home Directory. Taking this into consideration, User's home directory disk storage allowance provided is 20 MB. Hence, the total hard disk requirement for an estimated 2300 users is 20*2300=46,000 MB or 46 GB.

This is shared by two servers with an estimated hard disk requirement of 23 GB per server. The hard disk size is 25.8 GB per server of which 1 GB is reserved for the Operating System.

Notes/Mail Storage

This is the storage requirement for each user's Mail directory. Every user who has access to Notes has a mail directory to store incoming and outgoing mail. This directory also consists of Scheduler information (preferably Lotus Organiser information, if the user uses Lotus Organiser) address book and other user settings. This is limited to 20 MB of hard disk storage per user. It is the responsibility of the user to ensure that this space does not exceed the limit. All old mails should be promptly deleted to provide storage space for incoming mail. Every user should be trained to archive/delete older mail files. Storage requirements for 2,300 users are 46,000 MB or 46 GB.

Two Notes servers share this load. Hence, the hard disk requirement per server is 23 GB. The Server design houses 25.8 GB of storage space. One gigabyte of this storage space is reserved for operating system.

Print Servers

The requirements for more print servers are mainly due to share the load rather than hard disk storage. Three print servers for a maximum of 250 printers is used preferably in the Domain design. The hard disk requirement can be calculated as follows.

To cater for 250 printers, individual print queues must be created. Under Windows NT, multiple printers can share a single queue. If the printers are centrally located, then the printers can share a single queue. If the printers are not centrally located, but share the same queue, then getting the output from the printer can be difficult, since any of the printers serves the queue.

In general, in the preferred embodiment, individual queues for printers are used. Thus the three print servers share 250 print queues. Each print server can be configured for about 84 queues. Each queue services about 10 users. An estimated average of 5 MB of space is planned for whenever a print job is spooled to the printer. For the worst case where all the users send a job at the same time, total estimated hard disk space is:

84*10*5=4200 MB or 4.2 GB

Shared Directory Server

This server is more heavily used than the User Directory servers. Every group stores its shared information to the individual group directory. If the group wants to share its information with everybody, then the group stores the shared information in a separate directory in the same server. Total hard disk requirement for this Server is calculated as follows.

An estimated 10 users per group is assumed. For 2,300 users, 230 groups are estimated. Storage requirement per group is limited to 300 MB. This requires a storage space of 300*230=69,000 MB or 69 GB.

Global storage requirement is calculated on an estimated usage of 4 MB per user. For 2,300 users, the total storage requirement is 2300*4=9,200 MB or 9.2 GB. Thus total storage requirement for Shared Directory server is 78.2 GB. Two servers of hard disk capacity 42 GB each share this load.

Applications and TRIM Server

The hard disk storage requirement for this server is based on present usage of these servers and a calculated estimate.

Applications and TRIM database servers use about 8 GB. Of this, TRIM Database is about 1 GB. Maximum expected growth of this database is not more than 8 GB in the year 2000. The calculation is based on this maximum TRIM Database, and the expected application server growth. The calculated hard disk maximum requirement for this server is 28 GB by the end of the project.

CAD and DTP Server

The hard disk storage requirement for this server is based on usage of these servers and a calculated estimate. Both applications reside on a server occupying about 8 GB of storage. The use of this server is limited to a few users. The growth of these users in year 2000 is also expected to be minimal. The only requirement will be additional storage space for files. Typically most of the files created by these applications have been moved to Archive server to avoid running out of disk space. The calculated hard disk maximum requirement for this server is 28 GB.

Archive Server

Presently users store data on a shared directory in the OS/2 LAN. Some of these files are infrequently used but only serve as a reference purpose. To avoid running out of hard disk space, such files have been moved to Archive server. In general, any files that are not being accessed for a period of over six months can be moved to this server. This server retains the same directory structure as the moved file and hence locating the file is not a problem to the user. Any user wanting to work on these files must download from the Archive servers to their local directory and work on them. Once complete, the files can be uploaded back to the Archive server. The hard disk itself uses NT Compression to compress these files. Estimated hard disk storage for this server is about 42 GB. With compression, about 100 GB of storage space could be easily achieved.

Hard Disk Requirement for PDC and BDC

While hard disk storage requirement for these servers are not critical, availability of these servers is critical. For this reason, RAID 5 is used preferably for these servers. With a minimum available configuration of 4.3 GB*3 hard drives, 8.6 GB usable storage can be achieved. This is adequate for the preferred embodiment.

Since there are two BDC in the Domain design, failure of any of the servers does not affect the users. In the event of a PDC failure, one of the BDC can be easily promoted to a PDC—online, since the other BDC can still validate logon requests. These servers are also configured for RAID 5 to provide redundancy against any hard disk failures. For a projected maximum of 2,300 users, one PDC and two BDC exceeds the recommended maximum. The design provides optimum performance with minimal downtime. To further avoid any downtimes, PDC and BDC servers do not have any data stored in them. The servers also do not run any other mission critical services like SQL database, DHCP, WINS, DNS, etc.

Summary of Hard Disk Requirement

The hard disk requirement for each server and its configuration is consolidated in Table 12. All the configurations are RAID 5 with an individual hard disk capacity of 4.3 GB. Storage provided for Operating System is 1 GB.

TABLE 12

| Server | Hard Disk Requirement In GB | RAID Configuration | C: | D: | Hot Standby | Hard Disk Quantity |
|---|---|---|---|---|---|---|
| PDC & BDC | N/A | 4.3 * 3 | 1 GB | 7.6 GB | 1 | 4 |
| User Directory Servers | 23.0 | 4.3 * 7 | 1 GB | 24.8 GB | 1 | 8 |
| Shared Directory Server | 39.1 | 4.3 * 11 | 1 GB | 42 GB | 1 | 12 |
| Print Servers | 6.3 GB | 4.3 * 3 | 8.6 GB | N/A | 0 | 3 |
| Application Server | 30 GB | 4.3 * 8 | 1 GB | 33.4 GB | 1 | 9 |
| CAD/DTP Server | 30 GB | 4.3 * 8 | 1 GB | 33.4 GB | 1 | 9 |
| Archive Server | 42 GB | 4.3 * 11 | 1 GB | 42 GB | 1 | 12 |

Server Requirements and Configurations

Table 13 describes the Server Requirement and Configurations for the Domain of the preferred embodiment.

TABLE 13

| SERVER ROLE | CONFIGURATIONS | QUANTITY |
|---|---|---|
| PDC/BDC | Dual Pentium 200 Mhz, 256 Mb RAM, RAID-5, 2 x IBM Auto LAN streamer Cards, 4 x 4.3 Gb HDD, IBM 35/70 GB DLT Tape Drive | 3 |
| User Directory Servers | Dual Pentium 200 Mhz, 512 Mb RAM, RAID-5, 2 x IBM Auto LAN streamer Cards, 8 x 4.3 Gb HDD, IBM 35/70 GB DLT Tape Drive | 2 |
| Shared Directory Servers | Dual Pentium 200 Mhz, 512 Mb RAM, RAID-5, 2 x IBM Auto LAN streamer Cards, 12 x 4.3 Gb HDD, IBM 35/70 GB DLT Tape Drive | 2 |

TABLE 13-continued

| SERVER ROLE | CONFIGURATIONS | QUANTITY |
|---|---|---|
| Print Servers | Pentium 200 Mhz, 128 Mb RAM, RAID-5, 2 x IBM Auto LAN streamer Cards, 3 x 4.5 Gb HD | 3 |
| Application Server | Dual Pentium 200 Mhz, 512 Mb RAM, RAID-5, 2 x IBM Auto LAN streamer Cards, 9 x 4.3 Gb HDD, IBM 35/70 GB DLT Tape Drive | 1 |
| CAD/DTP Server | Dual Pentium 200 Mhz, 512 Mb RAM, RAID-5, 2 x IBM Auto LAN streamer Cards, 9 x 4.3 Gb HDD, IBM 35/70 GB DLT Tape Drive | 1 |
| Archive Server | Dual Pentium 200 Mhz, 512 Mb RAM, RAID-5, 2 x IBM Auto LAN streamer Cards, 12 x 4.3 Gb HDD, IBM 35/70 GB DLT Tape Drive | 1 |

Notes Servers as per Specifications
 I. One additional external DLT Tape Drive is available as a standby.
 II. UPS for servers are required. 6 KW*3 UPS can be used to cater for all the servers. All the servers and UPS are physically mounted on a rack with shared keyboard, mouse and monitor. This reduces floor space and also provides easy access for service.
 III. For LAN remote access, IBM's 8235 Dial-In Access is used to LAN's switch, which can support as many as 72 users at a time.

Hard Disk Usage Chart

Figure 25:
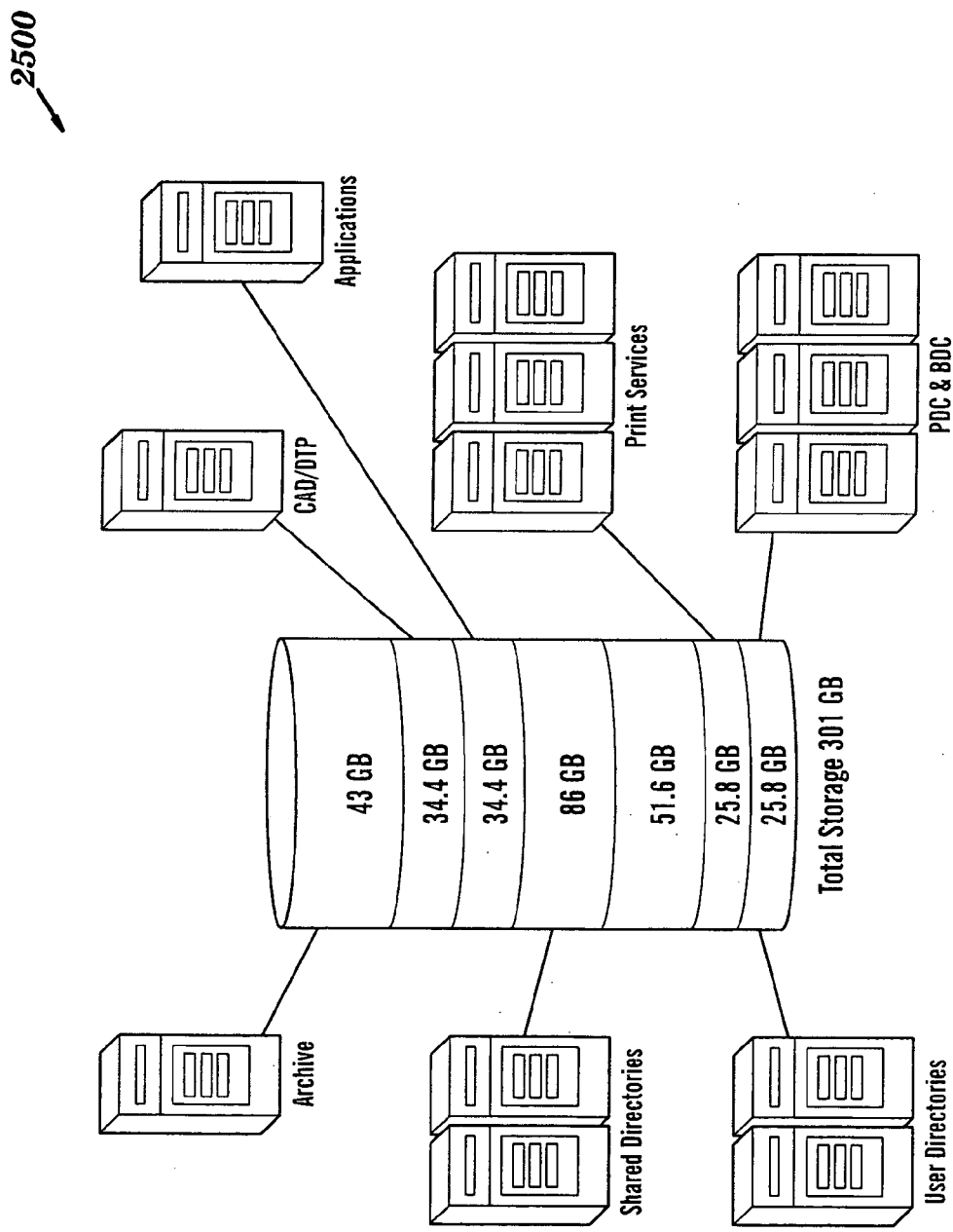
FIG. 25 is a block diagram of usage of hard disk storage in the initial design.

FIG. 25 is a block diagram representing the logical usage of hard disk storage 2500 for various servers listed in Table 13.

Per User Storage Availability

Figure 26:
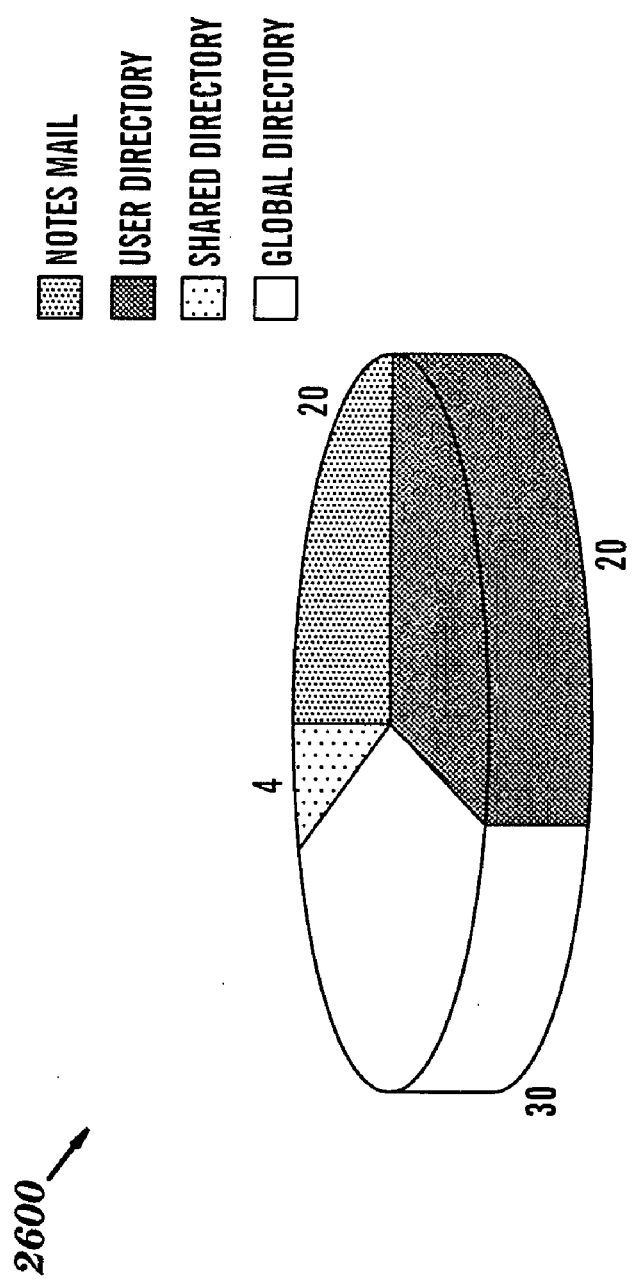
FIG. 26 is a pie chart with legend of disk space available to a user.

FIG. 26 is a pie chart showing the total disk space 2600 available in Mega Bytes per user. Total storage available per user is around 74 MB. If the storage space is used up, then the files can be archived to Archive Server. This storage space does not include local hard disks. Most of the standard applications must be loaded locally. However, no user data is stored on local hard disk.

Software Requirement

This section describes the software requirements for the servers:
 I. 12 copies of NT server 4.0 Service Pack 3. For every Workstation, a Client Access licence can be purchased to avoid licensing problem.
 II. Tivoli and Client Management System.
 III. Cheyenne's Arcserve Backup.

Further Considerations

Considerations for protecting the data against possible failures and increasing the availability of servers is described hereinafter. Though the NT LAN design provides full tolerance with tape backup and RAID 5 technology, in the event of a failure of a server component, there is some down-time, since the server needs to be re-built from the backup.

To avoid this downtime, any of the following technologies may be utilized optionally. The NT LAN design of the preferred embodiment is able to accommodate these technologies with little modification.

Tape Drive Arrays

This is a modified version of the Backup solution. Since the preferred embodiment involves high storage requirements, efficient and quick tape backup and restoration is essential. To decrease the downtime, in events of a failure, Tape Drive arrays may be used for Quick Restores.

In a typical Tape Drive Array, four or five tape drives are connected in an array configuration, to provide more throughput. Tape loaders are available for these types of arrays, which can load four tapes simultaneously. Approximately 30 to 40 GB of data can be restored in an hour, using tape drive arrays. Backup is also faster, and the entire server can be backed up in just over an hour. (Share Directory Server and the Archive Server are the high volume servers, and hold 43 GB of Data each.) Mission critical servers like Share Directory Server, User Directory Servers and Notes Servers can benefit from Tape Drive Arrays.

Raid—1 Data Mirroring

This is a RAID 1 technology where the data is mirrored between two hard disks. Normally data mirroring is not used since the data needs to be written to both the servers and this slows down the system. In the event of failure of a hard drive, mirroring can be broken and the mirror drive can be made the primary hard drive. This decreases the downtime, since no data needs to be restored. In the event of a server failure, then the hard disk can be removed from the server and mounted back on another server. This is the main advantage of RAID 1 against RAID 5, since the RAID 5 hardware controller must be identical when moved to another system. PDC and BDC can benefit from Data Mirroring. The two servers do not store much data but their availability is critical since the network cannot be accessed without these servers.

Replication Servers

This is a more advanced fault tolerant system. Here the data is replicated, periodically on to a standby server. In the event of a server failure then the standby server may be brought online. Data loss depends upon the replication time. If the replication time is higher, then more data is lost. However, keeping this time shorter has a significant impact on the network, as the data needs to be sent over the LAN for replication.

Replication servers always demand more bandwidth. Notes Servers benefit from replications, since a Notes database only sends the database changes to its replication partner and not the entire database. This significantly reduces the bandwidth requirement. Another significant advantage of replication servers is that the servers and hardware configurations need not be identical. Any two servers can be made to replicate with each other, irrespective of their processor, memories, etc. However, the hard disk must have the same capacity of its replication partner. SQL Server and Notes Servers can be configured for Replication services.

Server Clustering

Server clustering is a technology that offers Redundancy for the server at the same time sharing the load. Using server clustering reduces downtime. However, the LAN is duplicated in terms of hardware and software. If an organization desires lower downtime as an important aspect, then this may be considered. Server clustering under NT is not mature. There are many products which offer this technology. Products like Vinca need identical hardware configuration and mirrors server through its own proprietary hardware. This reduces the overload on the Server, but is complicated to install and maintain. Also its requirement of identical hardware, would restrict future upgrades. There are other products like Octopus, which is a software only solution. This product mirrors the softcopy of the hard disk. It is easier to implement and maintain. The main drawback is that this product uses CPU and LAN for mirroring. This has a serious impact on LAN utilisation.

The preferred embodiment already uses RAID 5 technology that provides complete redundancy for hard disks. If necessary, the preferred embodiment may implement additional server redundancy by using server clustering. Though the NT design of the preferred embodiment does not include any clustering technique, this may be easily implemented, as the server configurations are based on cluster design.

The following servers can be clustered:

Application Server,

DTP and CAD Server,

Shared Directory Server,

User Director Servers.

Backups

The critical servers of the preferred embodiment each have a Digital Linear Tape (DLT) tape drive. This is a magnetic tape media capable of storing 35–70 gigabytes of user data. The device and media are utilized to back up user data and subsequently store this data off-site for emergency restoration if required. DLT tape drive provides the high throughput and volume. With a hard disk size of 40 GB, DLT is an existing tape solution able to backup the entire volume in one tape. With compression, each tape can provide a capacity of 70 GB of storage. As DLT is a fairly new technology, the software used for backup must be carefully considered. Numerous software are not able to backup on a DLT tape drive. One relevant application product is "ARCserve" by Cheyenne.

Configurations

The configurations are carried out at the time of installation. A list of users and their security rights are given prior to the installation. These are incorporated during installation and an on-going security and administrative process is implemented for future additions. In the preferred embodiment, security is organised as per ISO 9000 Standard. Servers and Printers are named as per the naming convention which is based on Microsoft Domain Naming system. A backup procedure is setup according to the ISO 9000 standard. An automated setup is implemented with minimal user interference. Management of the Servers and the result of the management reports can be provided monthly. Service level reports may be produced. Wherever possible, the same hardware and software configurations are maintained.

6. Network And Cabling Design

An overview of the NT Network and cabling is provided hereinafter.

Objectives

A significant objective of the preferred embodiment is to provide a stable network and cabling design. This design accommodates an existing infrastructure and also caters for growth. The implementation of the network is in two stages. The first phase provide limited growth and redundancy features. After the second phase implementation, the network has all the features outlined hereinbefore.

Apart from the Servers and workstations that are migrated, the protocol being primarily used—NETBEUI is also changed to TCPIP. The LAN structure is also properly segmented to cater for growth.

Background

The network of the first phase caters for about 26 OS/2 LAN servers, 5 Notes NT servers and 7 NT servers serving file, print sharing and email requirement for over 1,000 users. Most of the users on OS/2 environment are converted to NT Workstation environment. However, due to certain application requirements, there are a few OS/2 workstations, which are not converted. The existence of OS/2 network is needed until all the legacy applications have been converted. Long term, the reduction of OS results in greater efficiency of an organisation.

The following is a brief description about the requirement and LAN infrastructure design for Phase I of the project. Network requirement for Phase I is given in Table 14.

TABLE 14

| Level+ | Description | Supported Connections |
|---|---|---|
| Ground | Storage | 0 |
| 2 | Event Support | 20 |
| 4 | Offices | 129 |
| 5 | Offices | 143 |
| 6 | Marketing | 194 |
| 7 | Research and Information | 8 |
| 12 | Organization Department | 17 |
| 13 | Organization Department | 16 |
| | I. Total Active Connections | 527 |

NETBIOS/NETBEUI for OS/2 and TCPIP for NT are the protocols supported.

In the preferred embodiment, the workstation requirements potentially grow at the rate of about 50 users per month. The network provides this flexibility for growth. The systems provide the following:

I. File and Print Sharing.

II. Office Products (Word Processing, Spreadsheet, Presentation, etc.).

III. Lotus Notes.

IV. AS 400 Applications.

V. Approved standard and Non-standard Programs as per Schedule A and K of the Desktop Agreement.

Protocols to be used are as follows:

TCP/IP for File and Print Access and Internet

NETBEUI/NETBIOS for OS/2 Servers

IP support for AS400

Bridged NETBIOS for OS/2 sessions to AS400

Network Design

The design is based on an existing LAN infrastructure, which is Token Ring LAN topology consisting of IBM 8250 and 8238 LAN hubs. These hubs have been replaced with a combination of IBM 8260 and 8238 stackable hubs using 8272 Switches. The IBM 8260 is used on highly populated floors, while the smaller floors use IBM 8238 stackable hubs, segmented using 8272 LAN Switch.

There are two backbone hubs. These operate using ATM as the protocol and house 3 port 155 MBPS ATM concentrator modules and three slot 4 port 8272 Switches. File Servers are connected to this 8272 switch, which also house an ATM uplink UFC and three Token-Ring Fibre UFC.

To support the fibre cabling on the backbone, two of the smaller level hubs also house a Fibre RI/RO module. These hubs are connected to the Token-Ring Fibre UFC on the 8272 Switches on the backbone.

The stackable hubs on two remaining smaller level hubs are connected to 8272 Switch, which are in turn connected to the Backbone Hub through the ATM concentrator module at the 8260 Hub.

The floor hubs—8260 on two larger levels use 18 port RJ 45 Active Module and a two slot 4 port 8272 Switches. Three 8260 hubs per floor are used, taking into consideration the floor plan and the requirements. An ATM uplink module is used in the UFC slot to connect to the backbone hub through the ATM Concentrator module at the backbone.

Figure 27:
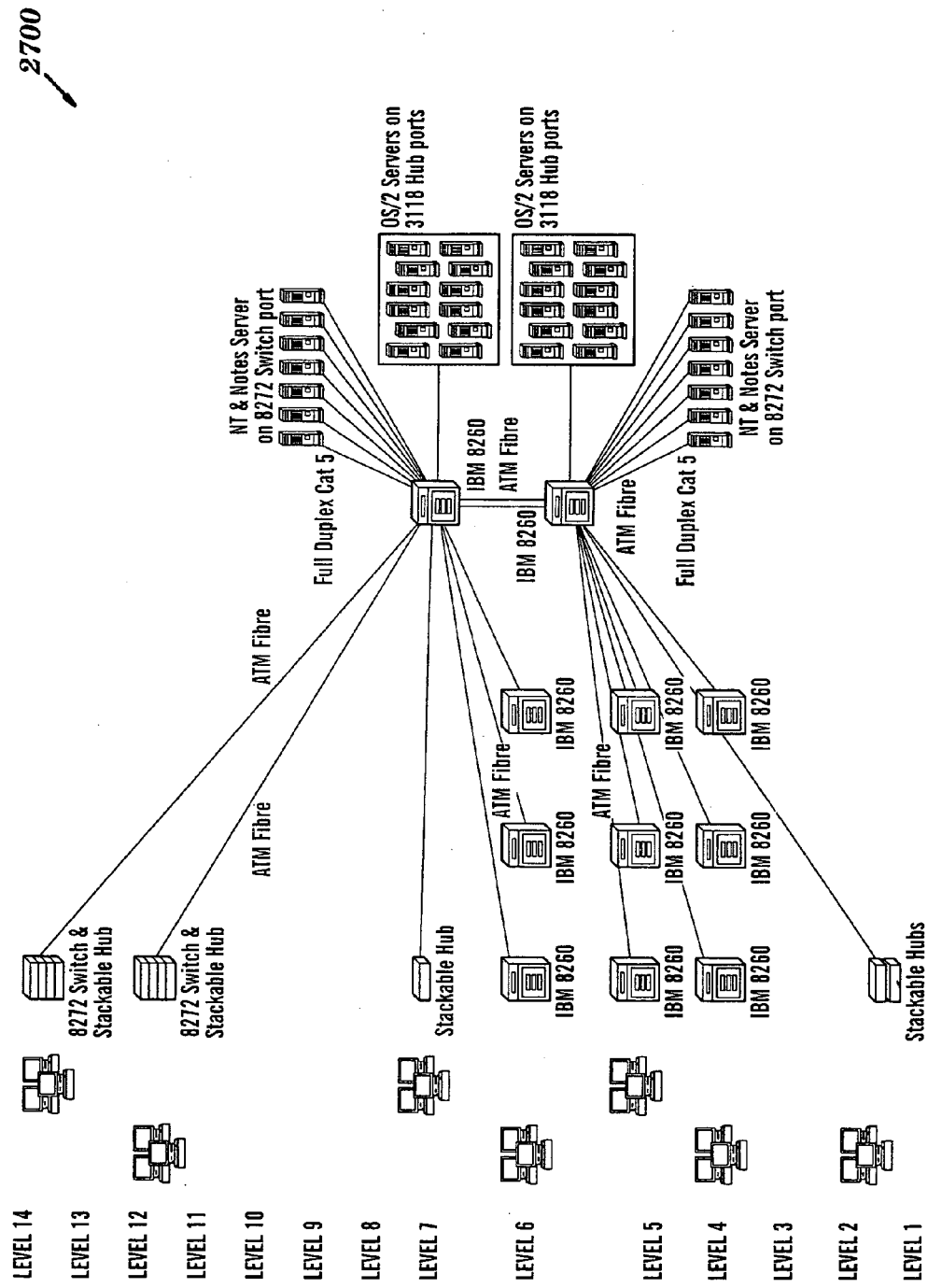
FIG. 27 is a block diagram of the network design in a building of the organization having, for example, 14 floors.

The two backbone hubs also house Multiport Switched Services Server module. This module provides Switched Virtual Networking, bridging and routing between emulated LANs and IP routing on ATM. Thus, depending upon the flow of traffic, the networks is segmented for optimum performance. The network design layout 2700 is shown in FIG. 27.

Highlights of the design include:
Each Server is connected via two independent full duplex switched Token Rings to each of the backbone hub.
  Benefits:
Load sharing between the hubs.
Recovery on fail over of any hub.
Segmentation of the network.
Each Office area has no more than 36 active network connected ports.
  Benefits:
Better Performance.
Easier Management.
Minimum impact on ring failure.
Scalability.
Raiser design bandwidth exceeds the floor hub bandwidth requirements.
  Benefits:
Eliminates bottleneck on the raiser.
Significant scalablity on the design.
Two 155 MB/s ATM links are utilised to connect the two core hubs.
  Benefits:
Load sharing between the links.
Redundancy.
Hot spares are included in the design to provide redundancy and high availability.
The design accommodates anticipated growth.

IP Segmenting (VLANS) Layout

Figure 28:
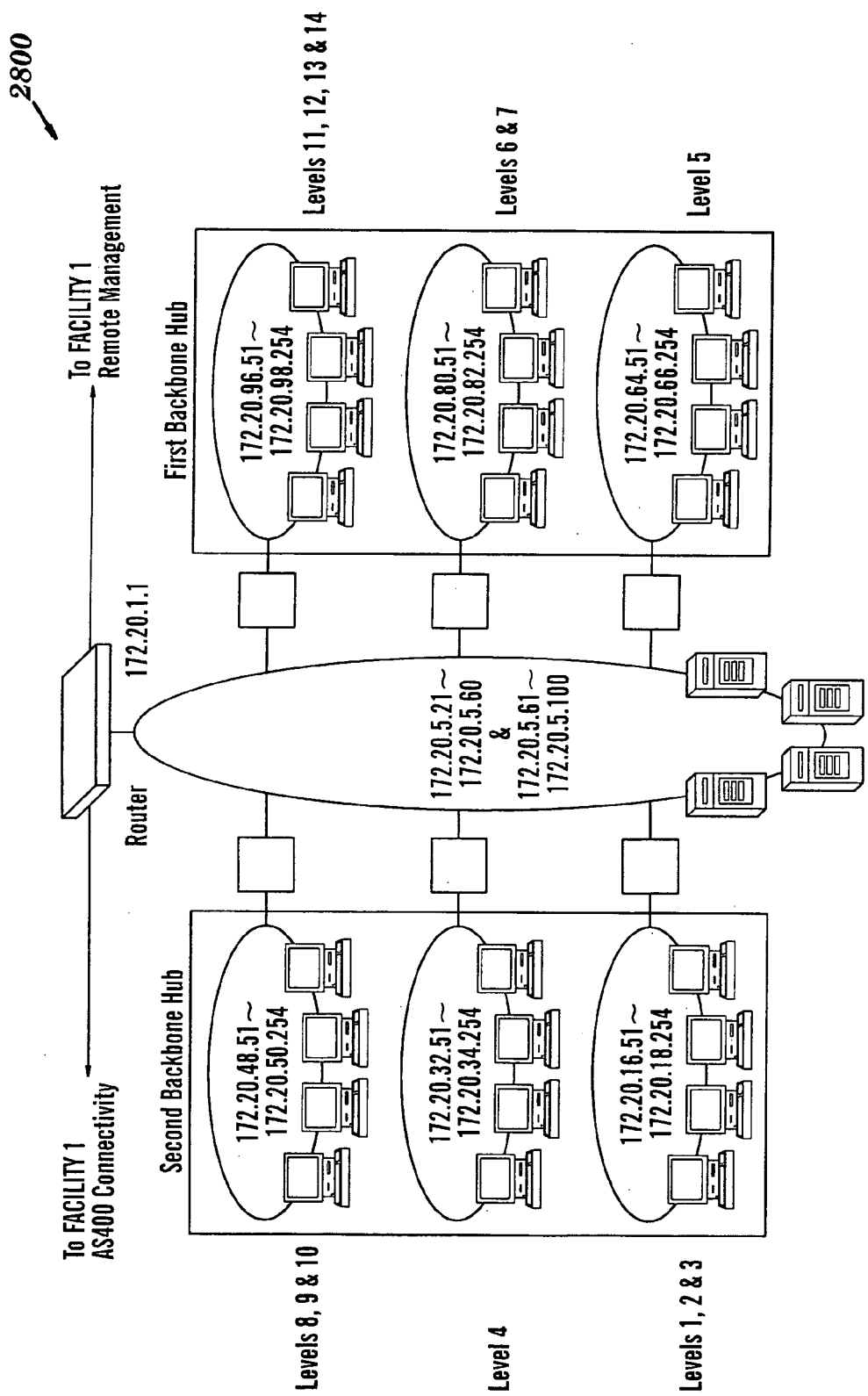
FIG. 28 is a block diagram showing the IP layer structure 2800.

To avoid network traffic and provide less impact on growth, IP segmentations are implemented. The design for IP segments eliminates any need for modification, which results in re-assigning of IP addresses. FIG. 28 depicts the IP layer structure.

Highlights of the Design
Segmented Design which minimises the broadcast traffic and confirms to IP design architecture specifications
Centralised Server implementation to reduce multiple hops on the network
Provides growth capability. IP addressing allows over 4000 addresses per segment. (However, due to physical limitation, not more than 1000 addresses are used per segment. This accommodates 6,000 users—well over 2,300 users)
MSS on the 8260 hub is used to route between the segments. (MSS can be used to segment IP traffic into as many as 12 segments, though the recommended is only 8 segments. The design uses only 7 segments.)
Load sharing between the two backbone hubs 6.1 Implemented Design—Network Architecture The implemented design of Network and Cabling infrastructure of the preferred embodiment is described hereinafter, highlights the differences between the original design and the implemented design and the reasons for changes.

Implemented Network Design

The implemented design is nearly the same as that of the proposed design. However, due to certain physical limitations and also due to the unavailability of certain components, the design is slightly modified from the original structure. These changes are temporary and are reverted during Phase II implementation.

Figure 29:
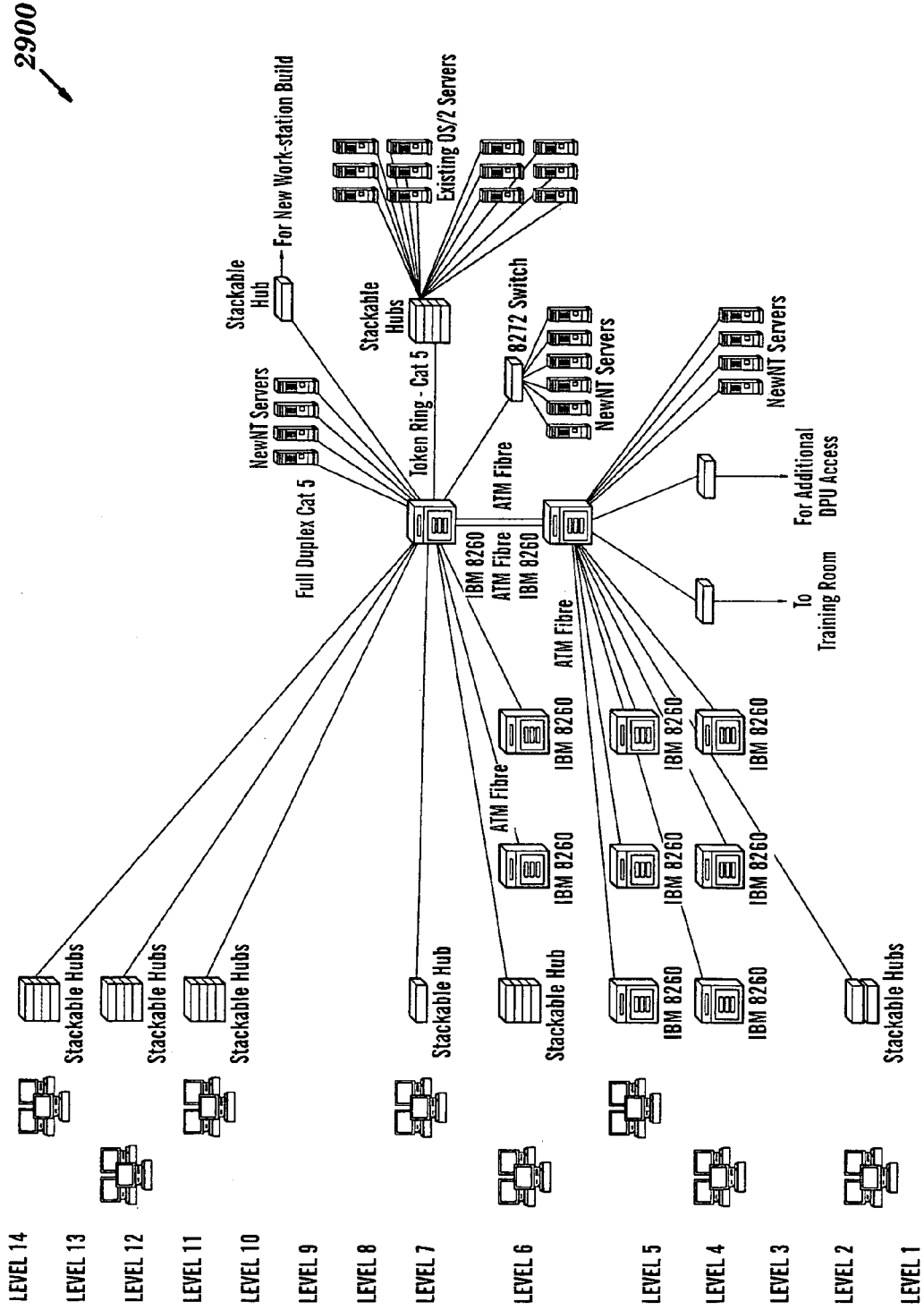
FIG. 29 is a block diagram of the implemented network design.

As seen from FIG. 29, there is little change in the design 2900 from the original structure. The few changes to the LAN and the reasons for those changes are discussed below.

Present IP subnets are listed in the table 3000 of FIG. 30. The table 3000 of FIG. 30 provides the IP addressing for the organization of the preferred embodiment. The address selected is 172.20.1.1~172.20.255.255 using subnet mask 255.255.240.0. Again, address configurations are depicted in table of FIG. 28.

The implementation of IP addresses for the preferred embodiment is as follows:
Router uses the address 172.20.1.1
WAN Link interface uses 172.20.1.2~172.20.4.255
Hubs in the first segment uses the range 172.20.5.0~172.20.5.20
Servers use the address range 172.20.5.21~172.20.5.100
Address range 172.20.n.1~172.20.n.20 in each subnet (other than the first subnet) is reserved for hubs/bridges
Address range 172.20.n.21~172.20.n.50 in each subnet is used as static addressing for printers
Address range 172.20.n.51~172.20.n.+2.254 in each subnet other than the first segment is used by Primary DHCP for leasing to workstations
Address range 172.20.n+3.51~172.20.n.+5.255 in each subnet other than the first segment is used by Secondary DHCP for leasing to workstations
Apart from these, there are addresses reserved for DPU access, normal printers and Xerox (publication) printers. Reserved address are not used presently, but can be used for future growth, though the present address scheme is well over expected growth.

Management of the Networks

The network is carefully chosen for remote monitoring and management. All the hubs including the stackable are manageable. Complete monitoring of the network is done remotely by a CLM (Central LAN Management) team.

Apart from the network management, Tivoli Server is installed on the network to provide LAN management capability. The servers and Workstations are loaded with client software for remote monitoring. This allows to remotely take control of the entire Server or workstation, if necessary. The CLM monitoring and management capabilities is also available to onsite staff.

7. NT Deployment Cut-Over Method

Objectives

The two primary objectives are described below:
1. Objective One A smooth migration without interruption to users' day to day activities While the OS/2 LAN Server remains in operation until the completion of NT Deployment, some users have been migrated into the NT Platform gradually while others remain in the OS/2 platform until such time permits. The migration strategy is carried out in gradual processes to ensure that the users can always link back to the OS/2 environment to migrate any files from their home drives and groups across to the new NT platform.

7.1 Overview of Current LAN Layout

Figure 31:
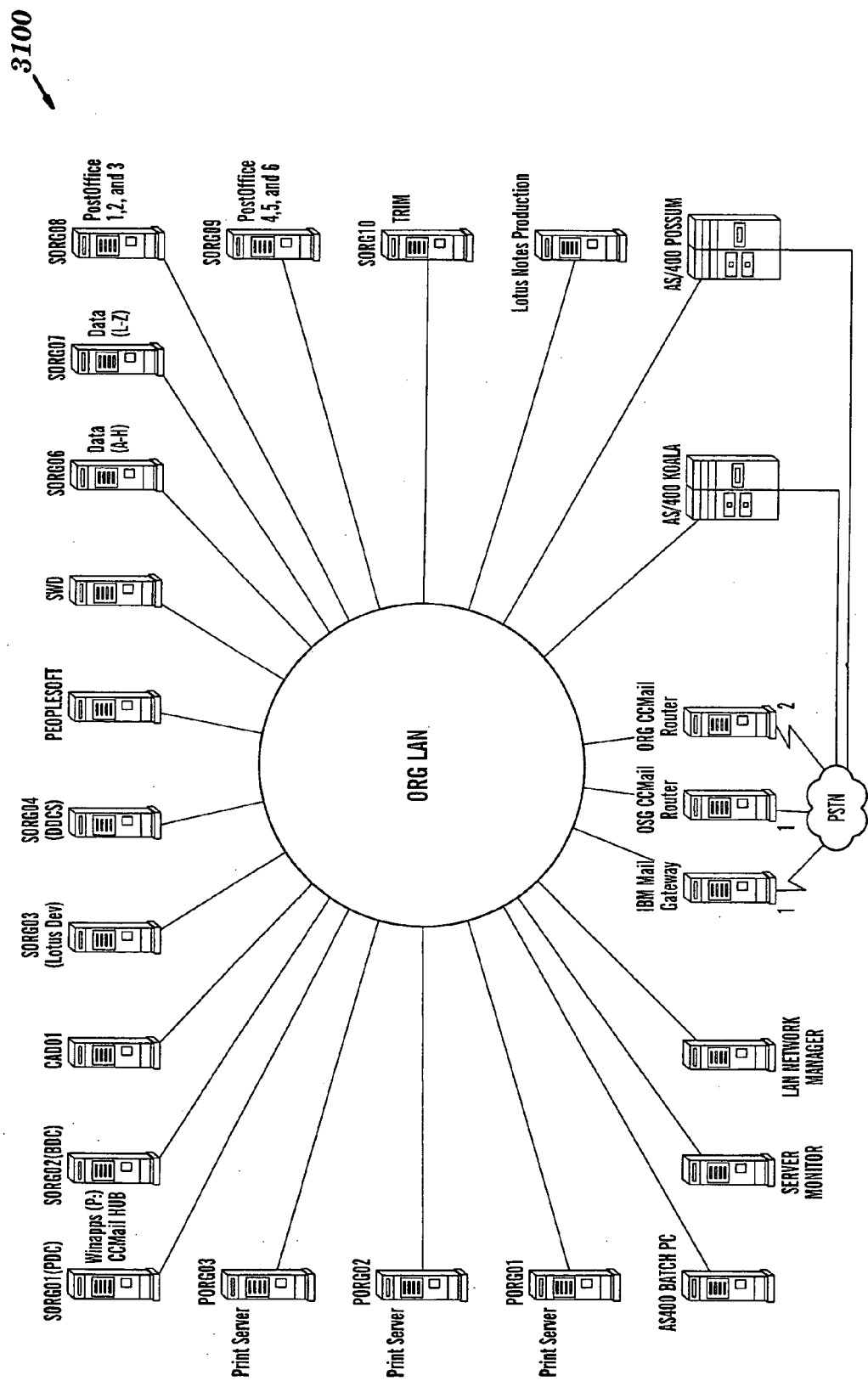
FIG. 31 is a block diagram showing the original LAN infrastructure.

The organization's original LAN infrastructure layout 3100 is displayed in FIG. 31. For the purpose of this migration process, the OS/2 Servers to be focused are shown in table 3200 of FIG. 32.

7.2 Overview of the Organization's Standard User Assignments

User Assignments

Table 15 describes resource assignments given to the organization's users once they successfully logon to the domain.

TABLE 15

| 0ALIAS NAMES | DESCRIPTION | NETWORK DRIVE |
| --- | --- | --- |
| COMMON | Common share data storage | S: |
| WINAPPS | Windows applications | P: |
| GROUP | Group share data storage | G: |
| CCMAIL | Mail Post Office | M: |
| UTILS | Utilities | U: |
| PRINTERS | Network printers | LPTx: |
| USERS | Home Directory | H: |
| OS2APPS | OS/2 Applications | Next Available |

The organization's network policy does not encourage users to store any data on local drive(s) on their PC. It is the user's responsibility to ensure that files are stored on their home drive or groups for sharing file servers.

7.3 Overview of the Organization's NT LAN Layout

Figure 33:
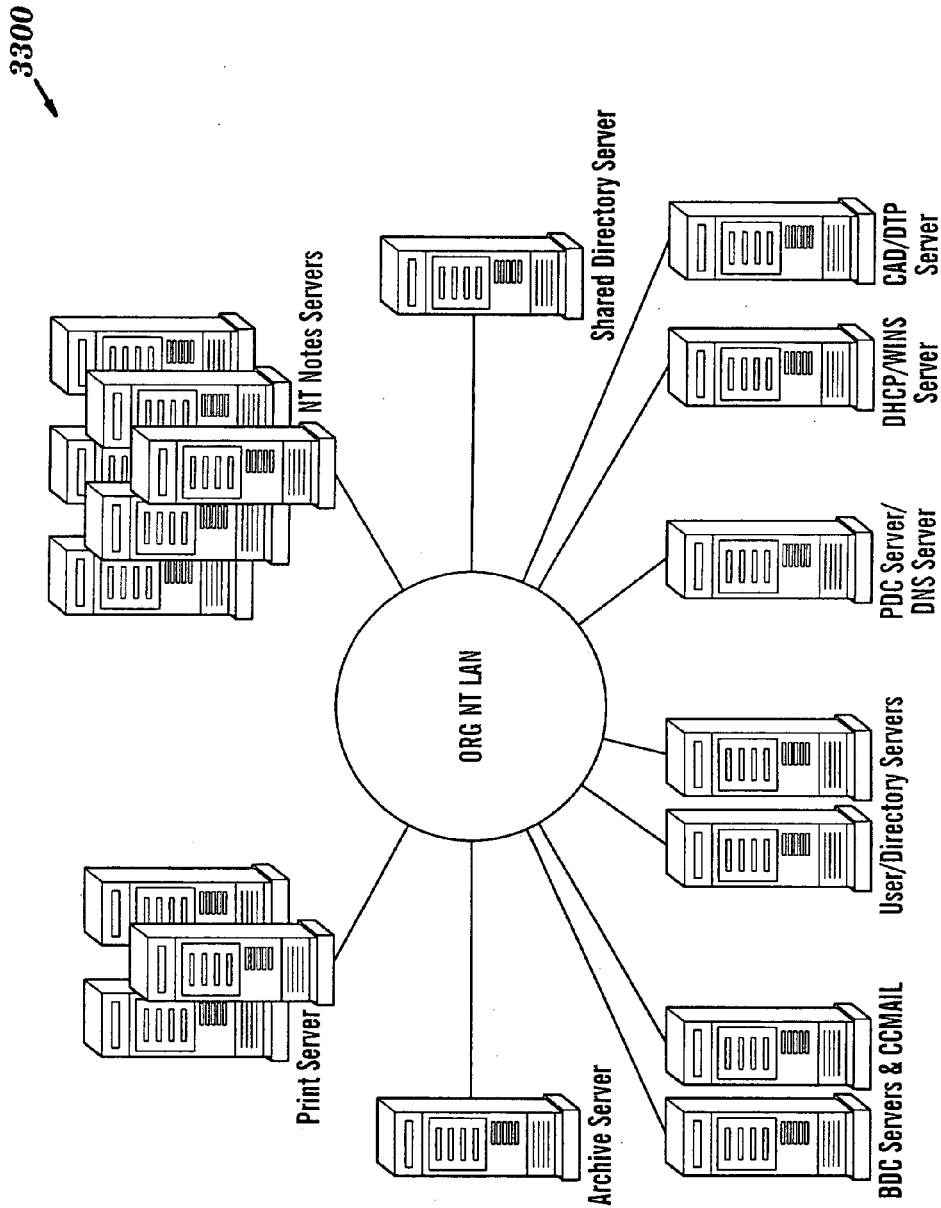
FIG. 33 is a block diagram of the NT LAN layout.

Again, the NT LAN layout 3300 is shown in FIG. 33.

New User Assignments

Table 16 describes resource assignments given to the organization's users once they successfully logon to the domain.

TABLE 16

| 0ALIAS NAMES | DESCRIPTION | NETWORK DRIVE |
| --- | --- | --- |
| SHARED | Common share data storage | T: |
| WIN16APPS | Windows 16 bit applications | P: |
| WIN32APPS | Windows 32 bit applications | W: |
| GROUP | Group share data storage | G: |
| CCMAIL | Mail Post Office | M: |
| ADMINAPPS | Administrative tools, drivers, images | U: |
| HOMEDIRS | User Home Directory | H: |
| DTPAPPS | Desktop applications | L: |
| DATAAPPS | Database applications like Accounting, Payroll | X: |

TABLE 16-continued

| 0ALIAS NAMES | DESCRIPTION | NETWORK DRIVE |
| --- | --- | --- |
| CADAPPS | CAD applications and Data | V: |
| COMMAPPS | Communication software | Z: |
| PRINTERS | Network printers | LPTx: |
| ARCHDATA | Archived files (6 months old) | R: |

New NT Naming Convention for Servers

This section describes the naming standard for Servers. The following format explains how NT Servers names are defined:

NTxxxxxxxxNN

Where:
NT: NT Operating System.
xxxxxxxx: Server function, i.e. PDC for Primary Domain Controller, BDC for Back up Domain Controller.
nn: Server Sequence, i.e. 01, 02, 03.

The table 3400 shown in FIG. 34 provides naming convention for Servers along with its role in the domain.

Data Sharing

In the NT deployment, Migration takes place in a chosen number at the time, i.e. 100 users per week. An issue to be aware of is that some applications are not backward compatible. For example, WordPro file created under Smartsuite97 package, this data file is not readable if the file is launched under Amipro—OS/2.

Actions taken include:

Save the data file as current format, i.e. AMIPRO, Lotus 123 as Smartsuite for OS/2 standard if data file is shared with other users who still use OS/2 machine.

For Smartsuite 97 users within groups, save the data file as WordPro, Lotus 123 under Smartsuite 97 format if the data files are to be shared by NT users only.

Recommendations:

User Training—Users need to be informed about those above issues.

Cheat Sheets—Instructions should be given out to all users about those complications.

NT Servers Availability

The following NT Servers must be available beforehand:
1. NTPDC—Primary Domain Controller
2. NTBDC01 and NTBDC02—Back up Domain Controllers—DHCP/WINS Servers
3. NTAPPS01—Applications Server
4. NTPRINT01 and NTPRINT02—DHCP/DDNS/Print Servers
5. NTNOTES01—NT Notes Server (Depends on Lotus Progression on Migration)

Tests must be carried out to ensure that:

All hardware components are installed and configured in all servers.

NT 4.0 Server plus Service Pack 3.0 are installed and applied to all servers.

Redundancy Tests: Back Up Domain Controller(s) perform as Primary Domain Controller in the case that the Primary Domain Controller is not available.

DHCP/WINS Servers and Clients.

Fault Tolerance Tests: RAID5 functionality/RAID 0 where applicable.

Back Up Facility: All Back Up devices are installed and tested in full or incremental.

Domain Users Access: Groups, Local Groups, Logon script, user profiles, System Policy must be defined, configured and tested.

7.5 Cut-Over Strategy

There are several components:
Component 1—Understanding the environment
Component 2—Configuration and Testing
Component 3—Providing necessary information, training, check list to users prior to migration
Component 4—Consolidation of User Information, Access Right
Component 5—Migration
Component 6—Helpdesk, Technical Support Staff
Component 7—Fall Back Procedures
Component 8—Customer approval check list Component 1—Understanding the Environment It is important to study and understand what the existing LAN environment and what impact of new environment is going to have on the users. Close attention is needed on the following things:
Users Logon Information:
Userid
User's description
User's rights, i.e. Administrators, standard users, operators
User's group
User's logon time duration
User Logon Assignments:
Network drives
Network applications
User home directory
User's groups sharing
Printer(s) connectivity
Common Data Share:
Relationship within groups
Data share within groups
In House Built Applications:
Windows 16 bit applications to be fully tested under NT where necessary
Windows 32 bit applications to be fully tested under NT where necessary
OS/2 applications
DOS applications to be fully tested under NT
HelpDesk Procedures:
Procedures to inform helpdesk personnel should problems arise
Escalation procedures to on-site technical support personnel
Information to update user on problem escalation and resolution Component 2—Configuration and Tests This component is crucial to the success of the organization's migration process.

It can be divided into two main areas:
0Servers Configuration and Testing

Resources Categorization
Server resources can be placed in eight categories:
1. Office Automation Applications
2. Development Applications
3. Critical Applications
4. Common Data
5. Secured Data
6. Project Data
7. Personal Home Directories
8. Support Resources 0User Information Design
User Name/Full Name Conventions
The User Name format is described below:

| FSURNAME | Where F: First character of surname SURNAME: Full Surname |
|---|---|

User Name and Full Name of a user are determined in the User Properties window in the User Manager for the Domain screenshot 3500 shown in FIG. 35.

It is recommended that the existing userid standard is re-used under NT environment to avoid unnecessary confusion to users who are new to NT environment. Under NT environment, the userid is not case sensitive. Therefore, the NT Lan Administrator(s) should pay attention to create the Userids properly to avoid security problems.

User Description Conventions
The user's description should be:
User Full name—Group—Department.
Individual Password Policies The robustness of the password is the most important mechanism available to protect systems. The password rules identified in this section are applicable to all system logon passwords.

Figure 36:
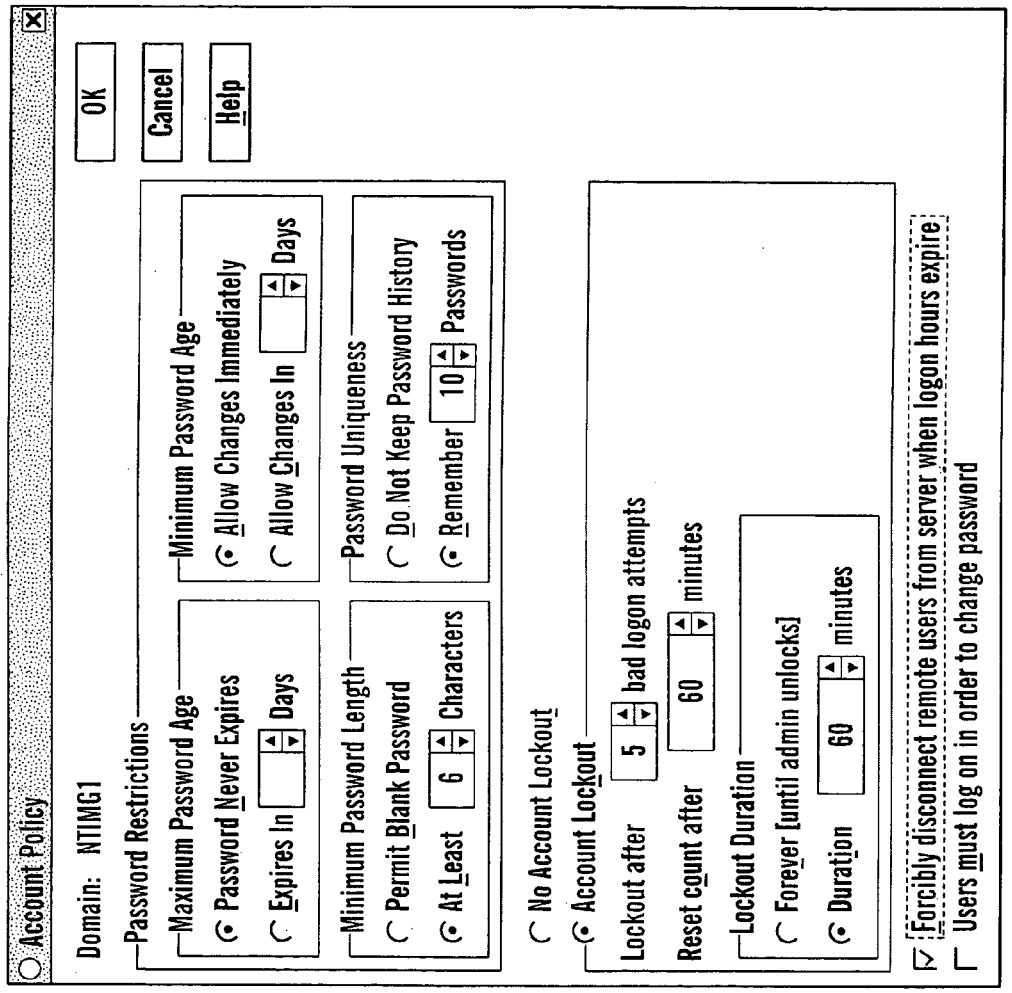
FIG. 36 is a screenshot of the Account Policy for input of parameter values.

FIG. 36 is a screenshot 3600 of the Account Policy for passwords. The following procedures must be implemented for passwords:

A security violation is recorded for each invalid password entered. Where an invalid password is entered five times in a row, the access right for the associated userid identification is automatically revoked.

User must change the password after first time logging on. The NT password must be the same with the one that is currently used in OS/2 environment.

FIG. 36 is a diagram illustrating a screen shot of the Account Policy for Inputting Parameter Values.

| 0Parameter | Value |
|---|---|
| Maximum Password Age | Password never expired (during the migration). Once the migration completes, all userids access should be set to expire after 90 days. |
| Minimum Password Age | Immediately |
| Minimum Password Length | 6 characters |
| Password Uniqueness | 10 |
| Lockout After | 5 |
| Lockout Duration | 60 minutes |

Figure 37:
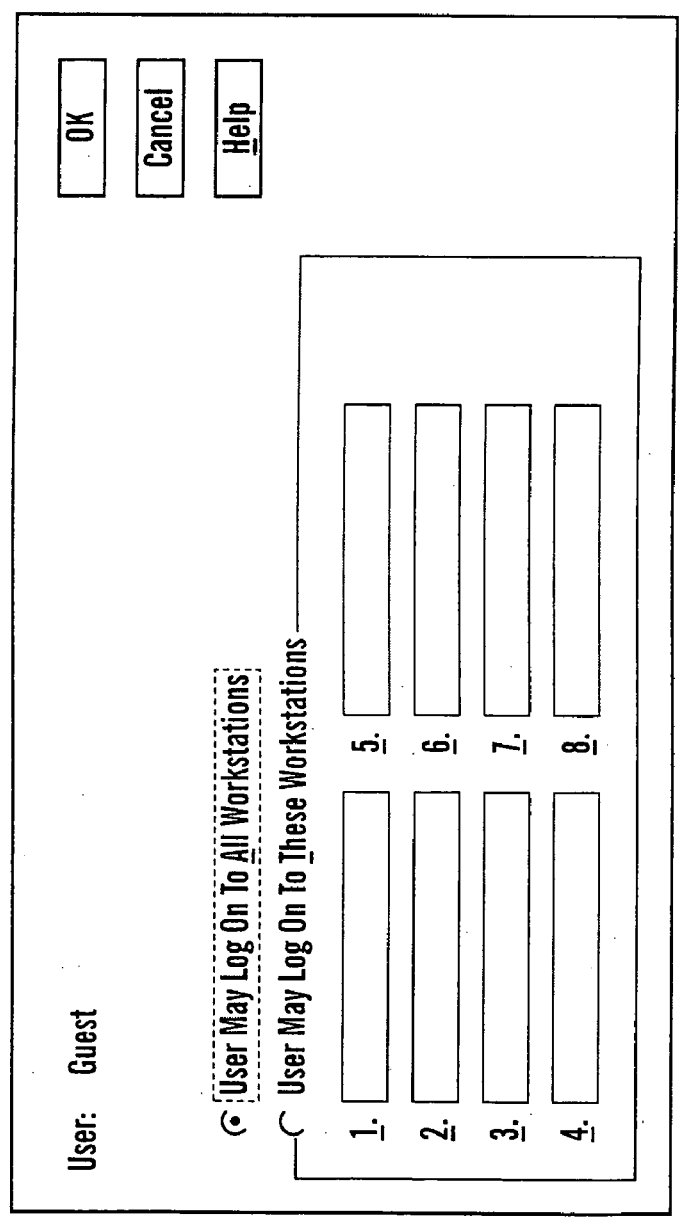
FIG. 37 is a screenshot of the interface for controlling user logons to workstations.

User must be defined to be able to logon to ALL workstations. This is done by Workstation Restriction in the User Manager for Domains 3700 as shown in FIG. 37.

Figure 38:
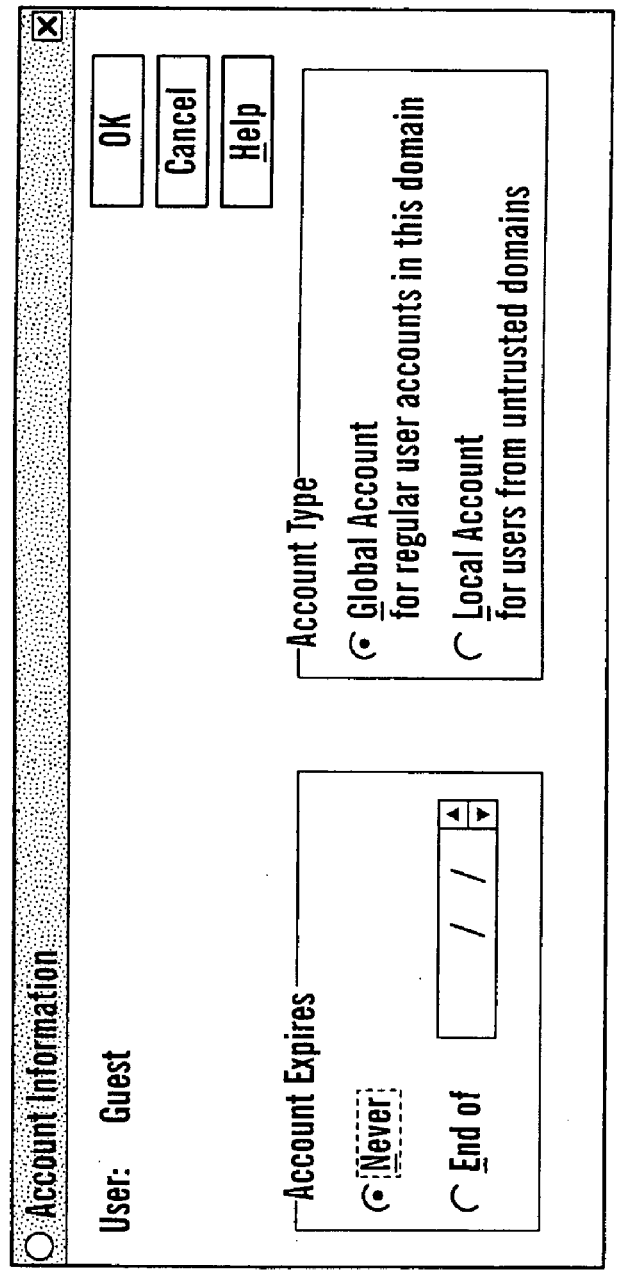
FIG. 38 is a screenshot of the interface for setting a user's password to not expire.

The user's account must be set to Never Expire. Account type is Global Account for regular account in this domain. It is done as the screen display 3800 in FIG. 38.

Group Membership

Groups must be defined to match with current OS/2 environments to avoid confusion within users and to provide ease of support for Technical Personnel.

Logon Scripts

Logon scripts are written in such a way that allows users to be able to have access to the OS/2 Domain resources such as Share, Groups, printers during transition period. This information can be easily updated or removed at the final stage of migration.

Home Directories

All users are given access to their new Home Directories under NT environments. Home user capacity are set to be the same with the current OS/2 standard.

Logon Hours

Figure 39:
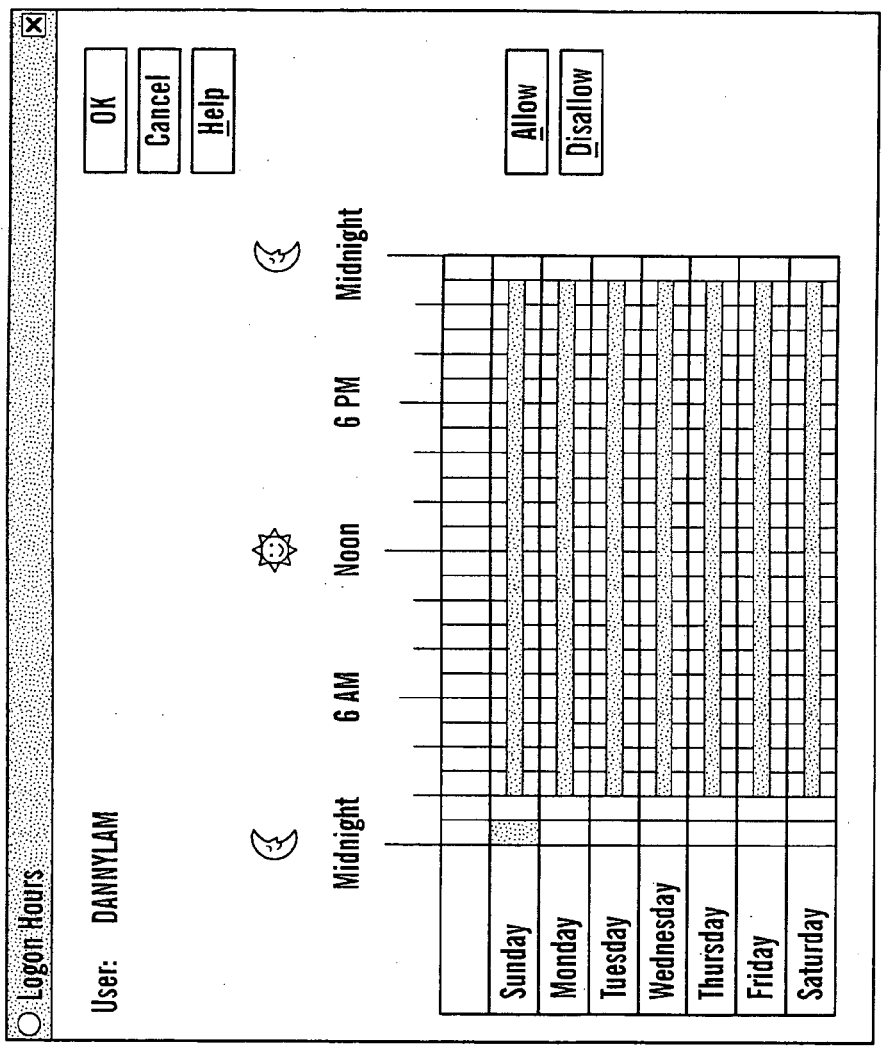
FIG. 39 is a screenshot of the interface for setting logon hours.

Standard users should have the ability to logon 7 days a week from 6:00 am to 11:00 pm and between 2:00 am to 6:00 am as shown in the screenshot 3900 of FIG. 39. Between 11:00 pm to 2:00 am, users should not be able to logon to the domain to allow data back up to complete. If needs arise, each individual user should apply the special permission to NT LAN administrator to arrange logon access to the domain during this time.

The Backup Operators should have access 24 Hours—7 Days a week.

Administrators should have 24 Hours—7 Days a week access to domain.

User Profiles And System Policy

This step should be considered in great detail. Most users get a common standard User Profile. There are some exceptional cases whereby certain groups may require to have settings specifically designed for their applications. These cases are treated separately.

System Security Policy is defined to determine user access to network and their PC. Users are not able to change/remove any settings on the PCs.

In the foregoing manner, a locked down environment, a computer functional architecture, and an assets logistics process have been described. Only a small number of embodiments have been described. Modifications can be readily made thereto in view of this disclosure by those skilled in the art without departing from the scope and spirit of the invention.

I claim:

1. A method of providing a lockeddown client environment in a client-server architecture of a computer network, said method including the steps of:

checking an asset database accessible via said computer network using a personal computer capable of connecting to said computer network and booted using a personalized network boot disk for a user to validate settings for configuration of said personal computer, said asset database containing information about the configuration of one or more personal computers, said personal computer being personal to only the user and being permanently assigned to only the user;

if said settings are validated, creating a lockeddown build for said personal computer, said creating step including the sub-steps of:

initializing said personal computer for installation of a user environment dependent upon said personalized network boot disk;

installing an operating system and hardware drivers on said personal computer via said computer network dependent upon said asset database, said operating system adapted to enable security of installed software on said personal computer against unauthorised modification and to prevent bypassing said operating system;

creating a computer account for said personal computer in said computer network;

pre-writing preference files onto the personal computer and then locking down the preference files on a local storage device of the personal computer;

installing preconfigured application software on said personal computer from a repository in said computer network dependent upon said asset database, said personal computer being configured so that the preference files on the local storage device compel the user to store all user data used by said application software only remotely at a network server via said computer network and no user data used by said application software application can be stored on any local storage device of the personal computer, said application software adapted to be updated over the computer network using remote management software; and updating a master logfile at said server accessible via said computer network to record said personal computer configuration.

2. The method according to claim 1, further including the step of creating a personalised network boot disk.

3. The method according to claim 1, further including the step of remotely interrogating said personal computer via said computer network and comparing said interrogation results with said asset database.

4. The method according to claim 3, further including the step of determining if said personal computer satisfies software licensing requirements dependent upon said comparison results.

5. The method according to claim 1, further including the step of remotely performing diagnostic testing of said personal computer.

6. The method according to claim 1, further including the step of maintaining a security access profile for each user to enable virtual login from any personal computer connected to said computer network.

7. The method according to claim 1, wherein at least two personal computers are capable of accessing said computer network, said personal computers having similar hardware and software configurations.

8. The method according to claim 1, further including the step of providing centralized login scripts via said computer network to said personal computer from said server.

9. The method according to claim 1, further including the step of providing a security profile for said user to enable said security.

10. The method according to claim 9, further including the step of providing scripts to provide said security profile and to map one or more remote storage drives to be accessible via said computer network by said personal computer.

11. The method according to claim 1, wherein said settings are validated if an asset number provided by said personalized network boot disk.

12. The method according to claim 1, wherein said asset database contains information about the hardware and software configuration of said one or more personal computers.

13. The method according to claim 1, wherein said personalized network boot disk contains a unique identification name.

14. The method according to claim 13, further including the step of validating said personalized network boot disk dependent upon a password of said user when said personalized network boot disk is first used.

15. The method according to claim 1, further including the step of updating an individual log file.

16. An apparatus for providing a lockeddown client environment in a client-server architecture of a computer network, said apparatus including:

means for checking an asset database accessible via said computer network using a personal computer capable of connecting to said computer network and booted using a personalized network boot disk for a user to validate settings for configuration of said personal computer, said asset database containing information about the configuration of one or more personal computers, said personal computer being personal to only the user and being permanently assigned to only the user;

means for, if said settings are validated, creating a lockeddown build for said personal computer, said creating means further including:

means for initializing said personal computer for installation of a user environment dependent upon said personalized network boot disk;

means for installing an operating system and hardware drivers on said personal computer via said computer network dependent upon said asset database, said operating system adapted to enable security of installed software on said personal computer against unauthorised modification and to prevent bypassing said operating system;

means for creating a computer account for said personal computer in said computer network;

means for pre-writing preference files onto the personal computer and then locking down the preference files on a local storage device of the personal computer;

means for installing preconfigured application software on said personal computer from a repository in said computer network dependent upon said asset database, said personal computer being configured so that the preference files on the local storage device compel the user to store all user data used by said application software only remotely at a network server via said computer network and no user data used by said application software application can be stored on any local storage device of the personal computer, said application software adapted to be updated over the computer network using remote management software; and means for updating a master logfile at said server accessible via said computer network to record said personal computer configuration.

17. The apparatus according to claim 16, further including means for creating a personalised network boot disk.

18. The apparatus according to claim 16, further including means for remotely interrogating said personal computer via said computer network and comparing said interrogation results with said asset database.

19. The apparatus according to claim 18, further including means for determining if said personal computer satisfies software licensing requirements dependent upon said comparison results.

20. The apparatus according to claim 16, further including means for remotely performing diagnostic testing of said personal computer.

21. The apparatus according to claim 16, further including means for maintaining a security access profile for each user to enable virtual login from any personal computer connected to said computer network.

22. The apparatus according to claim 16, wherein at least two personal computers are capable of accessing said computer network, said personal computers having similar hardware and software configurations.

23. The apparatus according to claim 16, further including means for providing centralized login scripts via said computer network to said personal computer from said server.

24. The apparatus according to claim 16, further including means for providing a security profile for said user to enable said security.

25. The apparatus according to claim 24, further including means for providing scripts to provide said security profile and to map one or more remote storage drives to be accessible via said computer network by said personal computer.

26. The apparatus according to claim 16, wherein said settings are validated if an asset number provided by said personalized network boot disk.

27. The apparatus according to claim 16, wherein said asset database contains information about the hardware and software configuration of said one or more personal computers.

28. The apparatus according to claim 16, wherein said personalized network boot disk contains a unique identification name.

29. The apparatus according to claim 28, further including means for validating said personalized network boot disk dependent upon a password of said user when said personalized network boot disk is first used.

30. The apparatus according to claim 16, further including means for updating an individual log file.

31. A computer program product having a computer readable medium having a computer program recorded therein for providing a lockeddown client environment in a client-server architecture of a computer network, said computer program product including:

computer program code means for checking an asset database accessible via said computer network using a personal computer capable of connecting to said computer network and booted using a personalized network boot disk for a user to validate settings for configuration of said personal computer, said asset database containing information about the configuration of one or more personal computers, said personal computer being personal to only the user and being permanently assigned to only the user;

computer program code means for, if said settings are validated, creating a lockeddown build for said personal computer, said computer program code means for creating further including:

computer program code means for initializing said personal computer for installation of a user environment dependent upon said personalized network boot disk;

computer program code means for installing an operating system and hardware drivers on said personal computer via said computer network dependent upon said asset database, said operating system adapted to enable security of installed software on said personal computer against unauthorised modification and to prevent bypassing said operating system;

computer program code means for creating a computer account for said personal computer in said computer network;

computer program code means for pre-writing preference files onto the personal computer and then locking down the preference files on a local storage device of the personal computer;

computer program code means for installing preconfigured application software on said personal computer from a repository in said computer network dependent upon said asset database, said personal computer being configured so that the preference files on the local storage device compel the user to store all user data used by said application software only remotely at a network server via said computer network and no user data used by said application software application can be stored on any local storage device of the personal computer, said application software adapted to be updated over the computer network using remote management software; and computer program code means for updating a master logfile at said server accessible via said computer network to record said personal computer configuration.

32. The computer program product according to claim 31, further including computer program code means for creating a personalised network boot disk.

33. The computer program product according to claim 31, further including computer program code means for remotely interrogating said personal computer via said computer network and comparing said interrogation results with said asset database.

34. The computer program product according to claim 33, further including computer program code means for determining if said personal computer satisfies software licensing requirements dependent upon said comparison results.

35. The computer program product according to claim 31, further including computer program code means for remotely performing diagnostic testing of said personal computer.

36. The computer program product according to claim 31, further including computer program code means for maintaining a security access profile for each user to enable virtual login from any personal computer connected to said computer network.

37. The computer program product according to claim 31, wherein at least two personal computers are capable of accessing said computer network, said personal computers having similar hardware and software configurations.

38. The computer program product according to claim 31, further including computer program code means for providing centralized login scripts via said computer network to said personal computer from said server.

39. The computer program product according to claim 31, further including computer program code means for providing a security profile for said user to enable said security.

40. The computer program product according to claim 39, further including computer program code means for providing scripts to provide said security profile and to map one or more remote storage drives to be accessible via said computer network by said personal computer.

41. The computer program product according to claim 31, wherein said settings are validated if an asset number provided by said personalized network boot disk.

42. The computer program product according to claim 31, wherein said asset database contains information about the hardware and software configuration of said one or more personal computers.

43. The computer program product according to claim 31, wherein said personalized network boot disk contains a unique identification name.

44. The computer program product according to claim 43, further including computer program code means for validating said personalized network boot disk dependent upon a password of said user when said personalized network boot disk is first used.

45. The computer program product according to claim 31, further including computer program code means for updating an individual log file.

46. A method of locking down a client environment of a personal computer in a computer network, said method including the steps of:

providing an asset database via said computer network that can be accessed by said personal computer, said asset database containing information about the configuration of one or more personal computers, said personal computer being personal to only a user and being permanently assigned to only the user;

pre-writing preference files onto the personal computer and then locking down the preference files on a local storage device of the personal computer;

booting said personal computer capable of connecting to said computer network and having installed therein an operating system and hardware drivers dependent upon said asset database, said operating system adapted to enable security of installed software on said personal computer against unauthorised modification and to prevent bypassing said operating system, said personal computer further having preconfigured application software installed on said personal computer dependent upon said asset database, said personal computer being configured so that the preference files on the local storage device compel the user to store all user data used by said application software only remotely at a network server via said computer network and no user data used by said application software application can be stored on any local storage device of the personal computer, said application software adapted to be updated over the computer network using remote management software;

logging onto said personal computer and said computer network using a centralized logon script enabling asset tracking of said personal computer;

checking said asset database accessible via said computer network dependent upon a unique identifier for said personal computer and information about said user to validate settings for configuration of said personal computer; and if said settings are validated, configuring said personal computer according to a locked down build for said user and said personal computer, said personal computer being configured so that user data can only be stored remotely at a server via said computer network.

47. The method according to claim 46, wherein said asset database contains information about the hardware and software configuration of said one or more personal computers.

48. The method according to claim 46, further including the step of remotely interrogating said personal computer via said computer network and comparing said interrogation results with said asset database.

49. The method according to claim 48, further including the step of determining if said personal computer satisfies software licensing requirements dependent upon said comparison results.

50. The method according to claim 46, further including the step of maintaining a security access profile for each user to enable virtual login from any personal computer connected to said computer network.

51. The method according to claim 46, further including the step of providing a security profile for said user to enable said security.

52. The method according to claim 51, further including the step of providing scripts to provide said security profile and to map one or more remote storage drives to be accessible via said computer network by said personal computer.

53. An apparatus for locking down a client environment of a personal computer in a computer network, said apparatus including:

means for providing an asset database via said computer network that can be accessed by said personal computer, said asset database containing information about the configuration of one or more personal computers, said personal computer being personal to only a user and being permanently assigned to only the user;

means for pre-writing preference files onto the personal computer and then locking down the preference files on a local storage device of the personal computer;

means for booting said personal computer capable of connecting to said computer network and having installed therein an operating system and hardware drivers dependent upon said asset database, said operating system adapted to enable security of installed software on said personal computer against unauthorised modification and to prevent bypassing said operating system, said personal computer further having preconfigured application software installed on said personal computer dependent upon said asset database, said personal computer being configured so that the preference files on the local storage device compel the user to store all user data used by said application software only remotely at a network server via said computer network and no user data used by said application software application can be stored on any local storage device of the personal computer, said application software adapted to be updated over the computer network using remote management software;

means for logging onto said personal computer and said computer network using a centralized logon script enabling asset tracking of said personal computer;

means for checking said asset database accessible via said computer network dependent upon a unique identifier for said personal computer and information about said user to validate settings for configuration of said personal computer; and means for, if said settings are validated, configuring said personal computer according to a locked down build for said user and said personal computer, said personal computer being configured so that user data can only be stored remotely at a server via said computer network.

54. The apparatus according to claim 53, wherein said asset database contains information about the hardware and software configuration of said one or more personal computers.

55. The apparatus according to claim 53, further including means for remotely interrogating said personal computer via said computer network and comparing said interrogation results with said asset database.

56. The apparatus according to claim 55, further including means for determining if said personal computer satisfies software licensing requirements dependent upon said comparison results.

57. The apparatus according to claim 53, further including means for maintaining a security access profile for each user to enable virtual login from any personal computer connected to said computer network.

58. The apparatus according to claim 53, further including means for providing a security profile for said user to enable said security.

59. The apparatus according to claim 58, further including means for providing scripts to provide said security profile and to map one or more remote storage drives to be accessible via said computer network by said personal computer.

60. A computer program product having a computer readable medium having a computer program recorded therein for locking down a client environment of a personal computer in a computer network, said computer program product including:

computer program code means for providing an asset database via said computer network that can be accessed by said personal computer, said asset database containing information about the configuration of one or more personal computers, said personal computer being personal to only a user and being permanently assigned to only the user;

computer program code means for pre-writing preference files onto the personal computer and then locking down the preference files on a local storage device of the personal computer;

computer program code means for booting said personal computer capable of connecting to said computer network and having installed therein an operating system and hardware drivers dependent upon said asset database, said operating system adapted to enable security of installed software on said personal computer against unauthorised modification and to prevent bypassing said operating system, said personal computer further having preconfigured application software installed on said personal computer dependent upon said asset database, said personal computer being configured so that the preference files on the local storage device compel the user to store all user data used by said application software only remotely at a network server via said computer network and no user data used by said application software application can be stored on any local storage device of the personal computer, said application software adapted to be updated over the computer network using remote management software;

computer program code means for logging onto said personal computer and said computer network using a centralized logon script enabling asset tracking of said personal computer;

computer program code means for checking said asset database accessible via said computer network dependent upon a unique identifier for said personal computer and information about said user to validate settings for configuration of said personal computer; and computer program code means for, if said settings are validated, configuring said personal computer according to a locked down build for said user and said personal computer, said personal computer being configured so that user data can only be stored remotely at a server via said computer network.

61. The computer program product according to claim 60, wherein said asset database contains information about the hardware and software configuration of said one or more personal computers.

62. The computer program product according to claim 60, further including computer program code means for remotely interrogating said personal computer via said computer network and comparing said interrogation results with said asset database.

63. The computer program product according to claim 62, further including computer program code means for determining if said personal computer satisfies software licensing requirements dependent upon said comparison results.

64. The computer program product according to claim 60, further including computer program code means for maintaining a security access profile for each user to enable virtual login from any personal computer connected to said computer network.

65. The computer program product according to claim 60, further including computer program code means for providing a security profile for said user to enable said security.

66. The computer program product according to claim 65, further including computer program code means for providing scripts to provide said security profile and to map one or more remote storage drives to be accessible via said computer network by said personal computer.

67. A method of providing a locked-down client environment in a client-server architecture of a computer network, said method including the steps of:

checking as asset database accessible via said computer network, said asset database containing information about the configuration of one or more personal computers;

if said settings are validated, creating a locked-down build for at least one of said personal computers, said at least one of said personal computers each being personal to only a user and being permanently assigned to only the user, said step of creating including the sub-steps of:

initializing said at least one of said personal computers for installation of a user environment dependent upon said personalized network boot disk;

installing an operating system and hardware drivers on said at least one of said personal computers via said computer network dependent upon said asset database;

creating a computer account for said at least one of said personal computers in said computer network;

pre-writing preference files onto the personal computer and then locking down the preference files on a local storage device of the personal computer;

installing preconfigured application software on said at least one of said personal computers from a repository in said computer network dependent upon said asset database, said personal computer being configured so that the preference files on the local storage device compel the user to store all user data used by said application software only remotely at a network server via said computer network and no user data used by said application software application can be stored on any local storage device of the personal computer, said application software adapted to be updated over the computer network using remote management software; and updating a master logfile at said server accessible via said computer network to record said at least one of said personal computers configuration.

68. The method according to claim 67, wherein the step of checking includes using a personal computer connected to said computer network and said personal computer being booted using a personalized network boot disk for a user to validate settings for configuration of said personal computer.

69. The method according to claim 68, further including the step of creating said personalized network boot disk.

70. The method according to claim 67, wherein said operating system being adapted to enable security of installed software on said at least one of said personal computers against unauthorized modification and to prevent by-passing said operating system.

71. The method according to claim 67, further comprising configuring said at least one of said personal computers so that user data can only be stored remotely at a server via said computer network.

72. An article of manufacture comprising a computer usable medium having computer readable program code means embodied therein for causing provision of a locked-down client environment in a client-server architecture of a computer network, the computer readable program code means in said article of manufacture comprising computer readable program code means for causing a computer to effect the steps of claim 67.

* * * * *